US012286230B2

(12) United States Patent
Kohl et al.

(10) Patent No.: US 12,286,230 B2
(45) Date of Patent: Apr. 29, 2025

(54) ENHANCED COUNTERMEASURE DISPENSING SYSTEM WITH INCREASED PAYLOAD CAPABILITY

(71) Applicant: BAE Systems Information and Electronic Systems Integration Inc., Nashua, NH (US)

(72) Inventors: Christopher E. Kohl, Austin, TX (US); Jeffrey A. Gensler, Austin, TX (US); Parker T. Hyink, Austin, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 183 days.

(21) Appl. No.: 18/045,194

(22) Filed: Oct. 10, 2022

(65) Prior Publication Data

US 2024/0116631 A1   Apr. 11, 2024

(51) Int. Cl.
*B64D 1/02* (2006.01)
*B64D 7/02* (2006.01)
*F42B 12/70* (2006.01)

(52) U.S. Cl.
CPC ............... *B64D 1/02* (2013.01); *B64D 7/02* (2013.01); *F42B 12/70* (2013.01)

(58) Field of Classification Search
CPC .................................. F42B 5/15; F42B 12/70
See application file for complete search history.

(56) References Cited

U.S. PATENT DOCUMENTS 3,808,940 A * 5/1974 Schillreff ................ F41F 3/042
89/1.51
4,063,485 A * 12/1977 Carter ....................... F41F 3/04
89/1.51

(Continued)

FOREIGN PATENT DOCUMENTS

EP       0442822 A1 *  8/1991
EP       0538105 A1 *  4/1993

(Continued)

OTHER PUBLICATIONS

International Search Report, PCT/US23/34278, mailed Jan. 29, 2024, 12 pages.

*Primary Examiner* — Gabriel J. Klein
(74) *Attorney, Agent, or Firm* — Sand, Sebolt & Wernow LPA; Gary McFaline

(57) ABSTRACT

Various countermeasure dispensing systems (or CMDSs) and method of use are described herein. CMDS may include a dispenser assembly operably engaged with a platform where at least one electrical connection provides electrical communication between the dispenser assembly and a sequencer. CMDS may also include a magazine assembly operably engaged with the dispenser assembly, wherein the magazine assembly comprises a magazine configured to hold at least two countermeasure expendables. CMDS may also include a breechplate assembly operably engaged with the magazine assembly and adapted to dispense the at least two countermeasure expendables. CMDS may also include at least one magazine identification switch (MIS) operably engaged with the magazine assembly and the breechplate assembly. CMDS may also include that the at least one MIS is configured to enable the sequencer and the breechplate (Continued)

assembly to selectively dispense at least one countermeasure expendable from the at least two countermeasure expendables.

13 Claims, 35 Drawing Sheets

(56) References Cited

U.S. PATENT DOCUMENTS

| | | | | |
|---|---|---|---|---|
| 4,135,455 | A * | 1/1979 | Wallace | F42B 5/035 |
| | | | | 102/505 |
| 5,198,612 | A | 3/1993 | Myers | |
| 5,269,214 | A * | 12/1993 | Badura | F41F 1/08 |
| | | | | 42/105 |
| 5,413,024 | A * | 5/1995 | Plummer | F41F 3/065 |
| | | | | 89/1.816 |
| 5,461,960 | A * | 10/1995 | Marks | H01R 31/06 |
| | | | | 89/1.51 |
| 5,554,815 | A * | 9/1996 | Authie | F42B 5/15 |
| | | | | 89/1.51 |
| 7,600,477 | B2 | 10/2009 | Zatterqvist | |
| 7,614,334 | B2 * | 11/2009 | Bellino | F41H 11/02 |
| | | | | 89/1.51 |
| 7,866,246 | B2 * | 1/2011 | Bellino | F41H 11/02 |
| | | | | 89/1.51 |
| 7,987,788 | B2 | 8/2011 | Zachrisson | |
| 8,033,225 | B2 | 10/2011 | Friede et al. | |
| 8,596,184 | B2 | 12/2013 | Lindskog | |
| 8,607,682 | B2 | 12/2013 | Zatterqvist | |
| 9,003,944 | B2 * | 4/2015 | Zatterqvist | B64D 7/00 |
| | | | | 89/1.51 |
| 9,045,228 | B2 | 6/2015 | Melin | |
| 9,811,079 | B2 * | 11/2017 | Theiss | H04B 17/20 |
| 10,495,424 | B2 | 12/2019 | Zaetterqvist | |
| 10,683,092 | B2 | 6/2020 | Zaetterqvist | |
| 10,684,099 | B2 * | 6/2020 | Zaetterqvist | G01S 17/66 |
| 10,696,401 | B2 | 6/2020 | Zaetterqvist | |
| 10,871,348 | B2 | 12/2020 | Zaetterqvist | |
| 10,940,814 | B2 * | 3/2021 | Mullins | H03K 19/20 |
| 2010/0326262 | A1 | 12/2010 | Galanti et al. | |
| 2012/0210855 | A1 | 8/2012 | Clark et al. | |
| 2015/0331417 | A1 * | 11/2015 | Theiss | H04B 17/10 |
| | | | | 702/122 |
| 2019/0234718 | A1 * | 8/2019 | Dube | F42B 5/15 |
| 2021/0376832 | A1 | 12/2021 | Branch et al. | |
| 2021/0404783 | A1 | 12/2021 | Branch et al. | |
| 2023/0044326 | A1 * | 2/2023 | Zätterqvist | F42B 5/15 |

FOREIGN PATENT DOCUMENTS

| | | |
|---|---|---|
| EP | 2916098 A1 | 9/2015 |
| GB | 2138546 A | 10/1984 |
| GB | 2519785 A | 5/2015 |
| WO | 2011101692 A1 | 8/2011 |

* cited by examiner

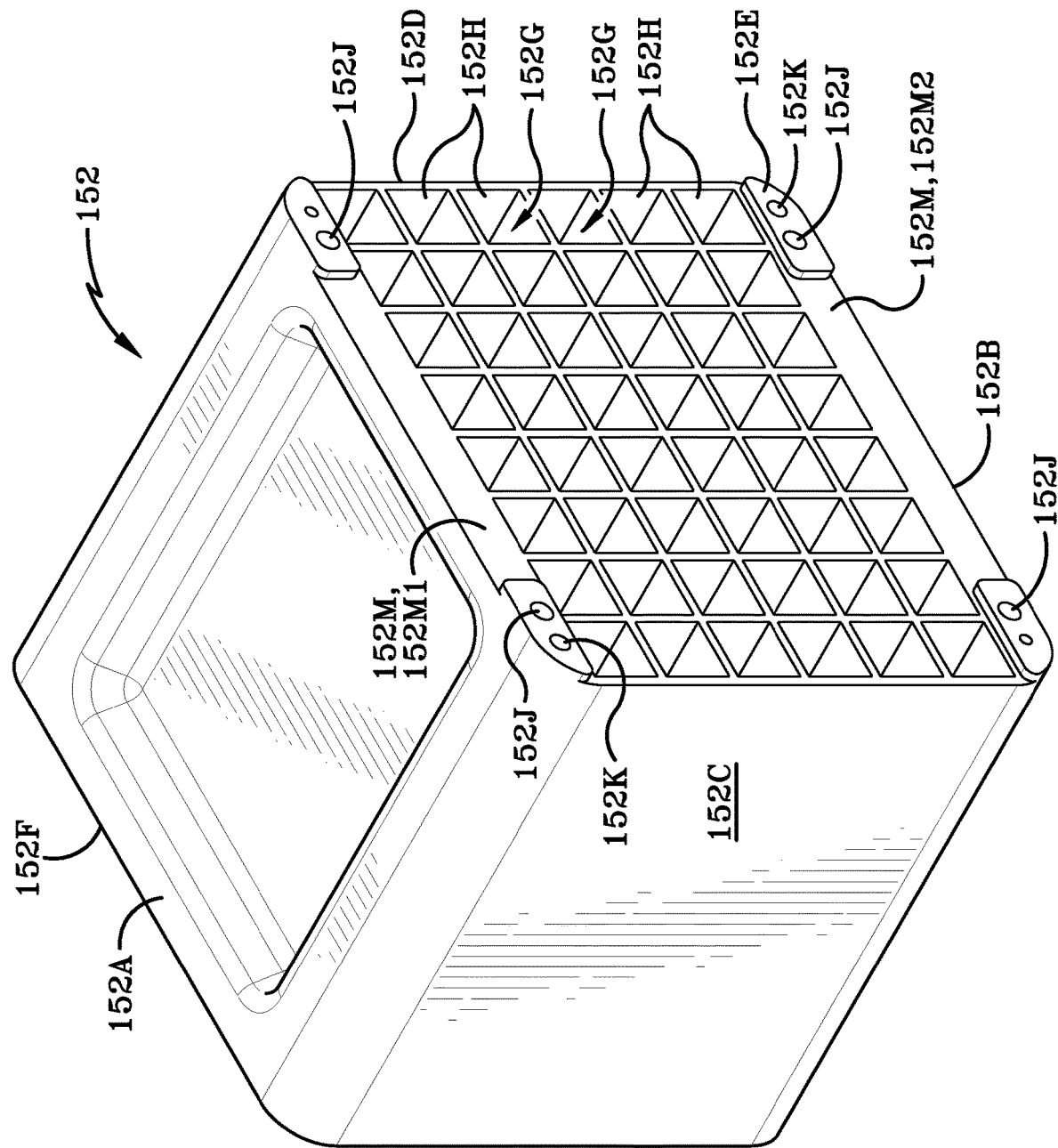

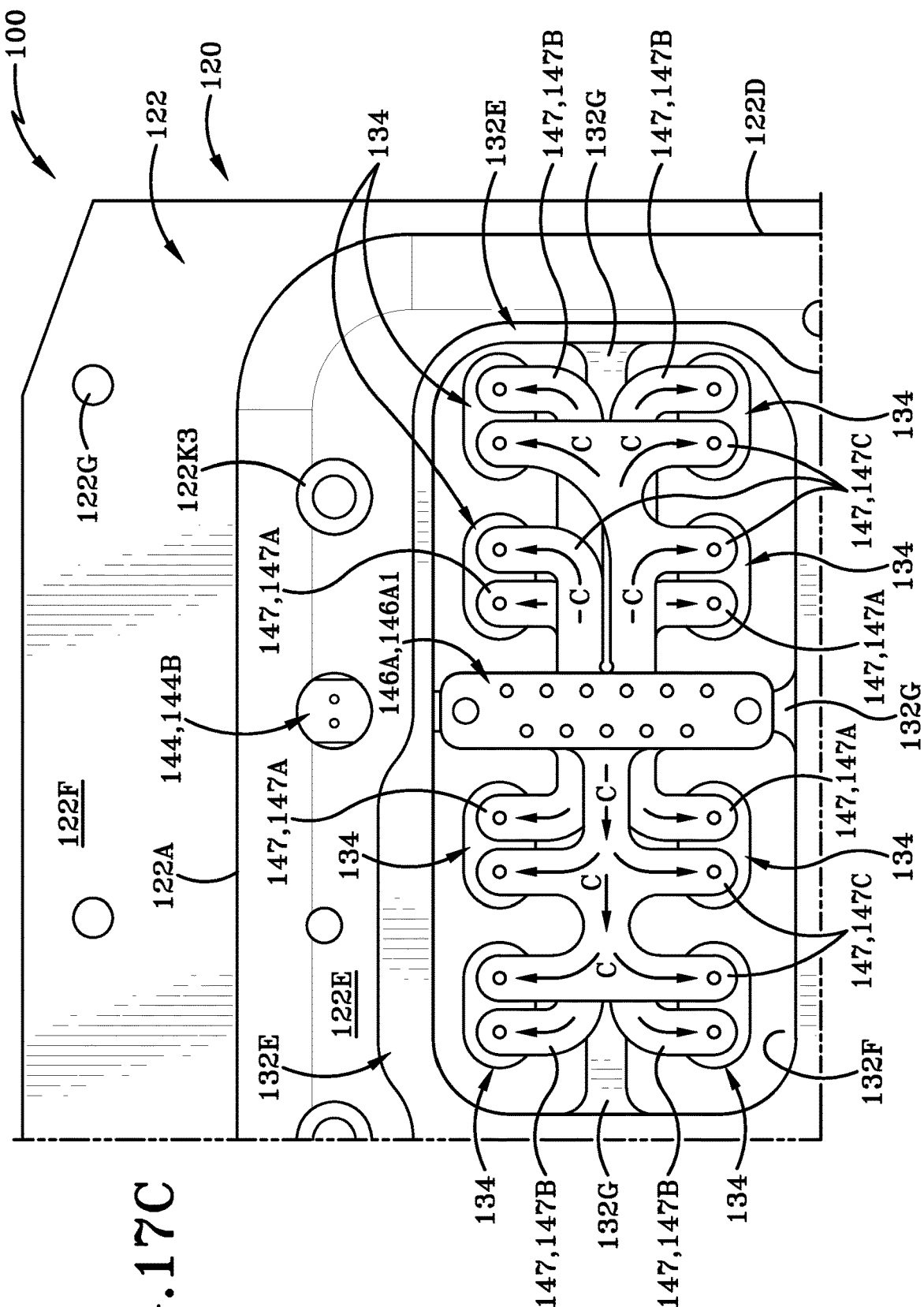

ENHANCED COUNTERMEASURE DISPENSING SYSTEM WITH INCREASED PAYLOAD CAPABILITY

TECHNICAL FIELD

The present disclosure relates to systems and methods for increasing payload capacity in a countermeasure dispensing system (CMDS).

BACKGROUND

In current military technologies, military platforms, such as a military aircraft, include at least one CMDS. The CMDS dispenses expendables (i.e., chaff material or flares) from the platform in order to counter a detected incoming threat, such as a missile, and redirect such incoming threat away from the platform. In a conventional CMDS, such as the AN/ALE-47 CMDS used on an aircraft, a CMDS generally comprises a cockpit control unit that provides an interface with the operator of the military platform, sequencer units that control countermeasure dispensers, and a programmer that may provide additional features and characteristics for a CMDS. Each countermeasure dispenser in a CMDS is electrically connected to a sequencer unit for dispensing the expendables. However, the traditional countermeasure dispenser in a CMDS is limited to only carrying, for example, thirty (30) expendables with a corresponding sequencer having thirty (30) firing lines to dispense said expendables. Such limit of expendables and firing lines in the CMDS may cause issues during military operation when many expendables must be dispensed from the CMDS in critical situations. The countermeasure dispenser and the sequencer in a CMDS also limits the capability of expanding the amount of expendables that may be provided on a military platform without removing and replacing the existing countermeasure dispenser and sequencer unit.

SUMMARY

In one aspect, an exemplary embodiment of the present disclosure may provide a countermeasure dispensing system. The countermeasure dispensing system may include a dispenser assembly configured to operably engage with a platform. The countermeasure dispensing system may also include at least one electrical connection that is adapted to provide electrical communication between the dispenser assembly and a sequencer. The countermeasure dispensing system may also include a magazine assembly that operably engages with the dispenser assembly, wherein the magazine assembly comprises a magazine configured to hold at least two countermeasure expendables. The countermeasure dispensing system may also include a breechplate assembly that operably engages with the magazine assembly and adapted to dispense the at least two countermeasure expendables. The countermeasure dispensing system may also include at least one magazine identification switch (MIS) that operably engages with the magazine assembly and the breechplate assembly; wherein the at least one MIS is configured to enable the sequencer and the breechplate assembly to selectively dispense at least one countermeasure expendable from the at least two countermeasure expendables.

This exemplary embodiment or another exemplary embodiment may further include a faceplate of the breechplate assembly operably engaged with the magazine; a set of fire pin mechanisms of the breechplate assembly operably engaged with the faceplate; a controller assembly operably engaged with the faceplate and the set of fire pin mechanisms; and at least one set of magazine identification buttons (MIB) of the breechplate assembly in electrical communication with the at least one MIS to enable the sequencer and the breechplate assembly to selectively dispense the at least one countermeasure expendable from the at least two countermeasure expendables. This exemplary embodiment or another exemplary embodiment may further include that the faceplate, the set of fire pin mechanisms, the controller assembly, the at least one set of MIB, and the magazine are collectively positioned inside a chamber of a legacy countermeasure dispensing system. This exemplary embodiment or another exemplary embodiment may further include a rear wall of the magazine; a front wall of the magazine longitudinally opposite to the rear wall; and a side chamber defined in the magazine extending from the rear wall of the magazine towards the front wall of the magazine; wherein the side chamber is configured to house the controller assembly, the at least one MIS, and the at least one set of MIB. This exemplary embodiment or another exemplary embodiment may further include that the at least one MIS comprises: a knob operably engaged with the magazine; a shaft operably engaged with the knob; and an engagement plate operably engaged with the knob via the shaft having a set of engagement portions configured to engage the at least one set of MIB; wherein each engagement portion of the set of engagement portions is configured to actuate the at least one set of MIB in a preconfigured arrangement to enable the sequencer and the breechplate assembly to selectively dispense the at least one countermeasure expendable from the at least two countermeasure expendables. This exemplary embodiment or another exemplary embodiment may further include a set of standoffs provided in the dispenser; a set of attachment mounts defined in the magazine and aligned with the set of standoffs; and a set of through-holes defined in the faceplate and aligned with the set of set of standoffs and the set of attachment mounts. This exemplary embodiment or another exemplary embodiment may further include that the controller assembly is positioned exterior to the chamber and positioned remote from the magazine. This exemplary embodiment or another exemplary embodiment may further include that the controller assembly is positioned interior to the chamber and positioned between the magazine and the dispenser. This exemplary embodiment or another exemplary embodiment may further include that each of the faceplate and the dispenser are separate and independent from one another. This exemplary embodiment or another exemplary embodiment may further include that each of the faceplate and the dispenser form a single monolithic member. This exemplary embodiment or another exemplary embodiment may further include a retaining plate of the breechplate assembly operably engaged with the magazine and the faceplate and positioned intermediate of the magazine and the faceplate; wherein the retaining plate is configured to retain the set of countermeasure expendables inside of the magazine and engage with the at least one MIS. This exemplary embodiment or another exemplary embodiment may further include that the retaining plate comprises: at least one recessed portion formed at one of an upper edge of the retaining plate and a lower edge of the retaining plate; a first depression formed at one of the upper edge and the lower edge inside of the at least one recessed portion for securing the at least one MIS at a first position; and a second depression formed at one of the upper edge and the lower edge inside of the at least one recessed portion for securing the at least one MIS at a second position different than the first position. This exemplary embodiment or another exemplary embodiment may further include that when the at least one MIS is secured at the first position, the at least one MIS actuates a first MIB of the at least one set of MIB; and wherein when the at least one MIS is secured at the second position, the at least one MIS prevents actuation of the first MIB of the at least one set of MIB.

In another aspect, an exemplary embodiment of the present disclosure may provide a method. The method may comprise steps of providing a magazine assembly; effecting at least two countermeasure expendables to be loaded into a magazine of the magazine assembly; effecting at least one magazine identification switch (MIS) to be toggled to a desired position; effecting the at least one set of magazine identification buttons (MIB), via the at least one MIS, to be actuated to a desired arrangement; effecting the magazine assembly to be operably engaged with a dispenser assembly on a platform; effecting a sequencer to select at least countermeasure expendables from the at least two countermeasure expendables based on the desired arrangement of the at least one MIB; and effecting the selected at least one countermeasure expendables from the at least two countermeasure expendables to dispense from the magazine.

This exemplary embodiment or another exemplary embodiment may further include that the step of effecting the magazine assembly to be operably engaged with the dispenser assembly further comprises: engaging a breechplate assembly of the magazine assembly with a dispenser of the dispenser assembly; and engaging the magazine with the breechplate assembly and the dispenser, wherein the breechplate assembly is positioned between the magazine and the dispenser. This exemplary embodiment or another exemplary embodiment may further include that the step of effecting the magazine assembly to be operably engaged with the dispenser assembly further comprises: engaging the magazine with a breechplate assembly and the dispenser. This exemplary embodiment or another exemplary embodiment may further include a step of positioning a controller assembly outside a chamber defined by a dispenser of the dispenser assembly and remote from the magazine or inside the chamber defined by the dispenser; wherein when the controller assembly is positioned inside of the chamber, the controller assembly is positioned between of the dispenser and the magazine.

In yet another aspect, an exemplary embodiment of the present disclosure may provide a countermeasure dispensing system. The countermeasure dispensing system may include a dispenser assembly configured to operably engage with a platform. The countermeasure dispensing system may also include at least one electrical connection that is adapted to provide electrical communication between the dispenser assembly and a sequencer. The countermeasure dispensing system may also include a magazine assembly that operably engages with the dispenser assembly, wherein the magazine assembly comprises a magazine configured to hold at least two countermeasure expendables. The countermeasure dispensing system may also include a breechplate assembly that operably engages with the magazine assembly and adapted to dispense the at least two countermeasure expendables. The countermeasure dispensing system may also include at least one magazine identification switch (MIS) that operably engages with the magazine assembly and the breechplate assembly. The at least one MIS is configured to enable the sequencer and the breechplate assembly to selectively dispense at least one countermeasure expendable from the at least two countermeasure expendables. The dispensing assembly and the breechplate assembly are one of integrally formed together and distinct from one another.

This exemplary embodiment or another exemplary embodiment may further include a faceplate of the breechplate assembly operably engaged with the magazine; a set of fire pin mechanisms of the breechplate assembly operably engaged with the faceplate; a controller assembly in electrical communication with the faceplate and the set of fire pin mechanisms; and at least one set of magazine identification buttons (MIB) of the breechplate assembly operably engaged with the at least one MIS to enable the sequencer and the breechplate assembly to selectively dispense the at least one countermeasure expendable from the at least two countermeasure expendables. This exemplary embodiment or another exemplary embodiment may further include that the faceplate, the set of fire pin mechanisms, the at least one set of MIB, and the magazine are positioned inside a chamber of a legacy countermeasure dispensing system.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 14 is a rear, top, first side isometric perspective view of a magazine of the magazine assembly of CMDS shown in FIG. 12.

FIG. 17C is an operational view similar to FIG. 17B, but the second signal is directed from the set of terminal blocks to a selected group of fire pin mechanisms from a set of fire pin mechanisms.

Similar numbers refer to similar parts throughout the drawings.

DETAILED DESCRIPTION

Figure 1:
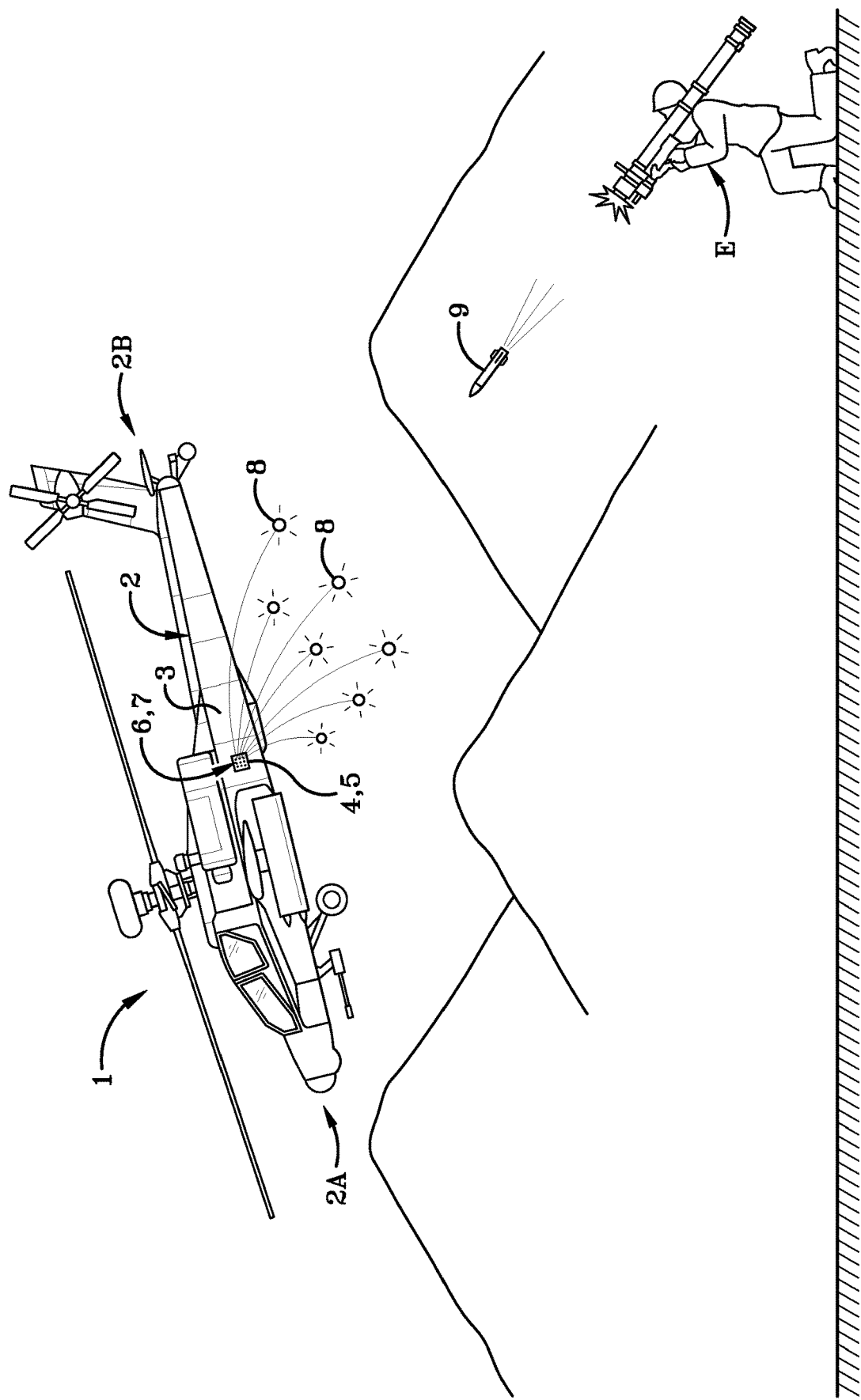
FIG. 1 is a schematic view showing an aircraft having a CMDS used subsequent to detecting an incoming enemy threat.

FIG. 1 illustrates a platform 1 such as a vehicle, ship or aircraft, which may be manned or unmanned, that includes a main body 2. As used herein, aircraft refers to fixed and rotary wing aircraft as well as UAVs and satellites. The main body 2 has a front end 2A and a rear end 2B longitudinally opposite to the front end 2A. It should be understood that the directions of "front," "rear," "top," "bottom," "right," and "left" are only used as a directional reference for the main body 2 and its associated components and/or parts described herein and illustrated in FIG. 1.

The platform 1 in this example is an aircraft and includes a sidewall 3 that extends longitudinally between the front end 2A of the main body 2 and the rear end 2B of the main body 2. The sidewall 3 defines an opening 4 that is disposed between the front and rear ends 2A, 2B of the main body 2 providing access to a chamber 5. The opening 4 and the chamber 5 defined by the sidewall 3 is sized and configured to receive a countermeasure dispensing system 6 ("CMDS"). The CMDS 6 operably engages the sidewall 3 of the main body 2 to mechanically fix the CMDS 6 to the aircraft 1. As illustrated in FIG. 1, the CMDS 6 is in line with the sidewall 3 of the main body 2 such that the CMDS 6 is even with the mold line of the aircraft 1 for aerodynamic purposes. Upon mounting the CMDS 6, the CMDS 6 is electrically connected to a legacy wiring harness (not illustrated) that is provided in the aircraft 1 to provide power and communication to some or all electrical components in the CMDS 6, which is described in more detail below.

Prior to military operation or an aerial mission of the aircraft 1, the CMDS is pre-loaded with a plurality of expendables 7. Each expendable of the plurality of expendables 7 is loaded with flare and/or chaff material 8 for countermeasure purposes. In addition, each expendable of the plurality of expendables 7 includes an impulse cartridge (not illustrated) for detonating and dispensing the expendable from the aircraft 1. During military operation, the flare and/or chaff material 8 provides a distraction to an incoming enemy threat 9, initiated by an enemy "E", where the incoming enemy threat 9 is diverted to the flare and/or chaff material 8 while allowing the aircraft 1 to remain unscathed. During military operation or an aerial mission, the aircraft 1 may receive a warning from an on-board electronic warfare (EW) system regarding the incoming enemy threat 9 approaching the aircraft 1. Upon a determination made by the on-board EW system and/or an operator, the CMDS 6 dispenses a calculated amount of expendables of the plurality of expendables 7 that are disposed underneath, behind, or to the side of the aircraft 1. In addition, the CMDS 6 may also be provided along any suitable location of the aircraft 1 other than sidewall 3 of the main body 2. In one exemplary embodiment, a CMDS may be provided within a wing of an aircraft. In another exemplary embodiment, a CMDS may be provided in a fuselage or a pod disposed on an aircraft.

It should be understood that the CMDS 6 is logically powered and controlled by an on-board system. The system may include suitable devices and apparatuses that are operably engaged with one another to logically control and power the CMDSs (such as CMDS 6) described and illustrated herein. In the illustrated embodiments, CMDSs described and illustrated herein may be logically powered and controlled by a legacy on-board system retaining a majority of legacy devices and apparatuses that are operably engaged with and in communication with one another. Examples of legacy devices and apparatuses that may be provided in this system include, but not limited to, a cockpit interface, discrete components, serial buses, a programmer, and data links. In another instance, a CMDS described and illustrated herein may be logically powered and controlled by a new on-board system having new devices and apparatuses that are operably engaged with one another.

Moreover, it will be understood that the on-board system may also retain and use legacy components of legacy CMDSs currently available. In one instance, a CMDS described and illustrated herein may maintain a legacy dispenser along with a legacy wiring harness operably engaging the CMDS with the legacy on-board system. In another instance, a CMDS described and illustrated herein may only maintain a legacy wiring harness operably engaging the CMDS with the legacy on-board system. Furthermore, it will be understood that CMDSs described and illustrated herein may also use new components that are not legacy to an aircraft nor a legacy on-board system provided on the aircraft. Such use of legacy and/or new components of CMDSs are described in further details below.

Figure 2:
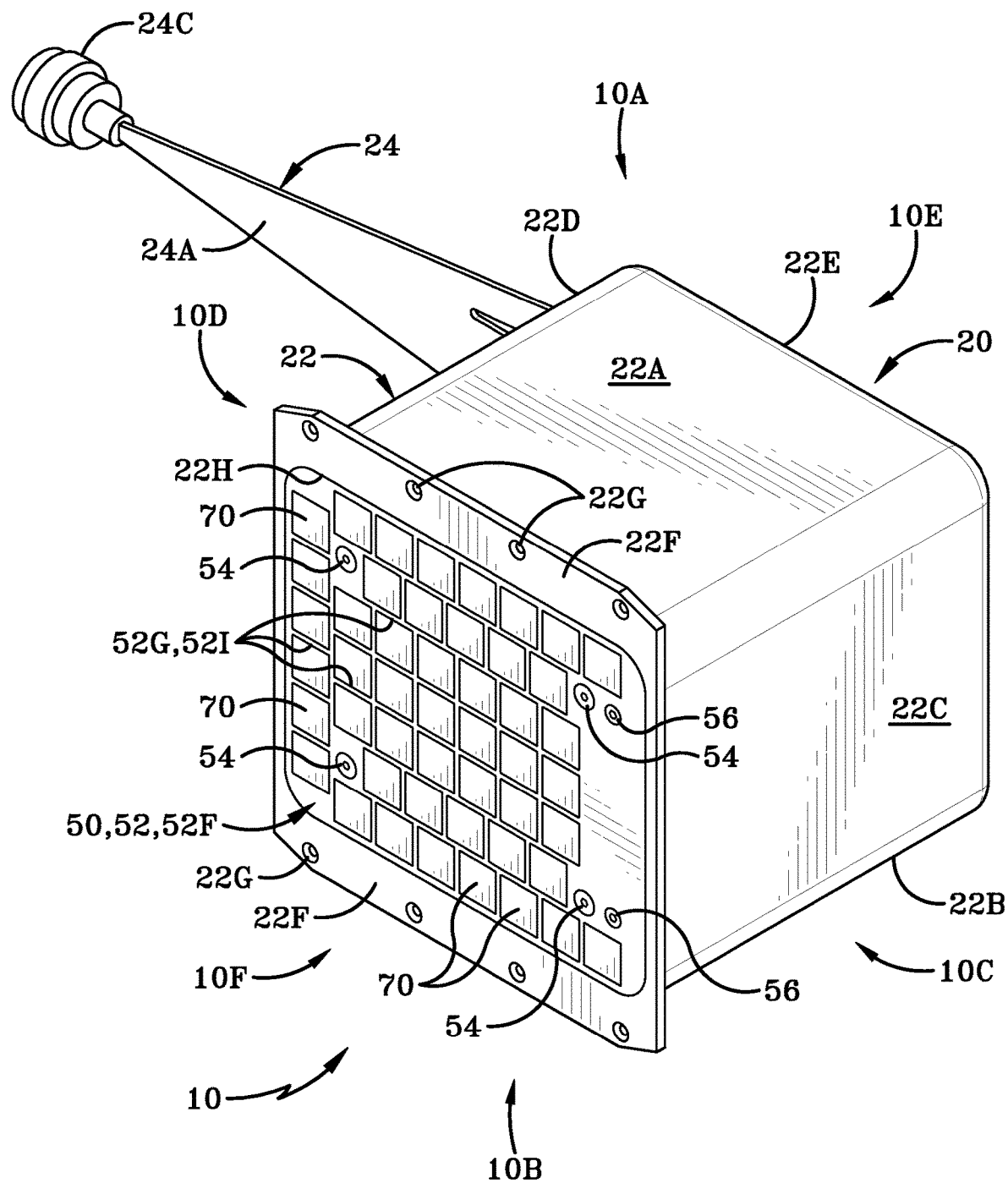
FIG. 2 is a front, top, first side isometric perspective view of a CMDS in accordance with the present disclosure.

Referring to FIGS. 2-11B, a CMDS 10 according to one embodiment is illustrated with its associated assemblies, components, and/or parts, which are described in more detail below. As best illustrated in FIG. 2, CMDS 10 includes a top or first end 10A, a bottom or second end 10B vertically opposite to the top end 10A, and a vertical axis defined therebetween. CMDS 10 also includes a first side 10C positioned between the top end 10A and the bottom end 10B, a second side 10D positioned between the top end 10A and the bottom end 10B and transversely opposite to the first side 10C, and a transverse axis defined therebetween. CMDS 10 also includes a rear end 10E positioned between the top end 10A and the bottom end 10B, a front end 10F positioned between the top end 10A and the bottom end 10B and longitudinally opposite to the rear end 10E, and a longitudinal axis defined therebetween. In the illustrated embodiment, each of the top end 10A, the bottom end 10B, the first side 10C, the second side 10D, the rear end 10E, and the front end 10F may be disposed inside of the chamber 5 defined in the sidewall 3. The front end 10F is also facing outwardly from the aircraft 1 and is aligned with the opening 4 to enable ejection of the plurality of expendables 7.

Figure 3A:
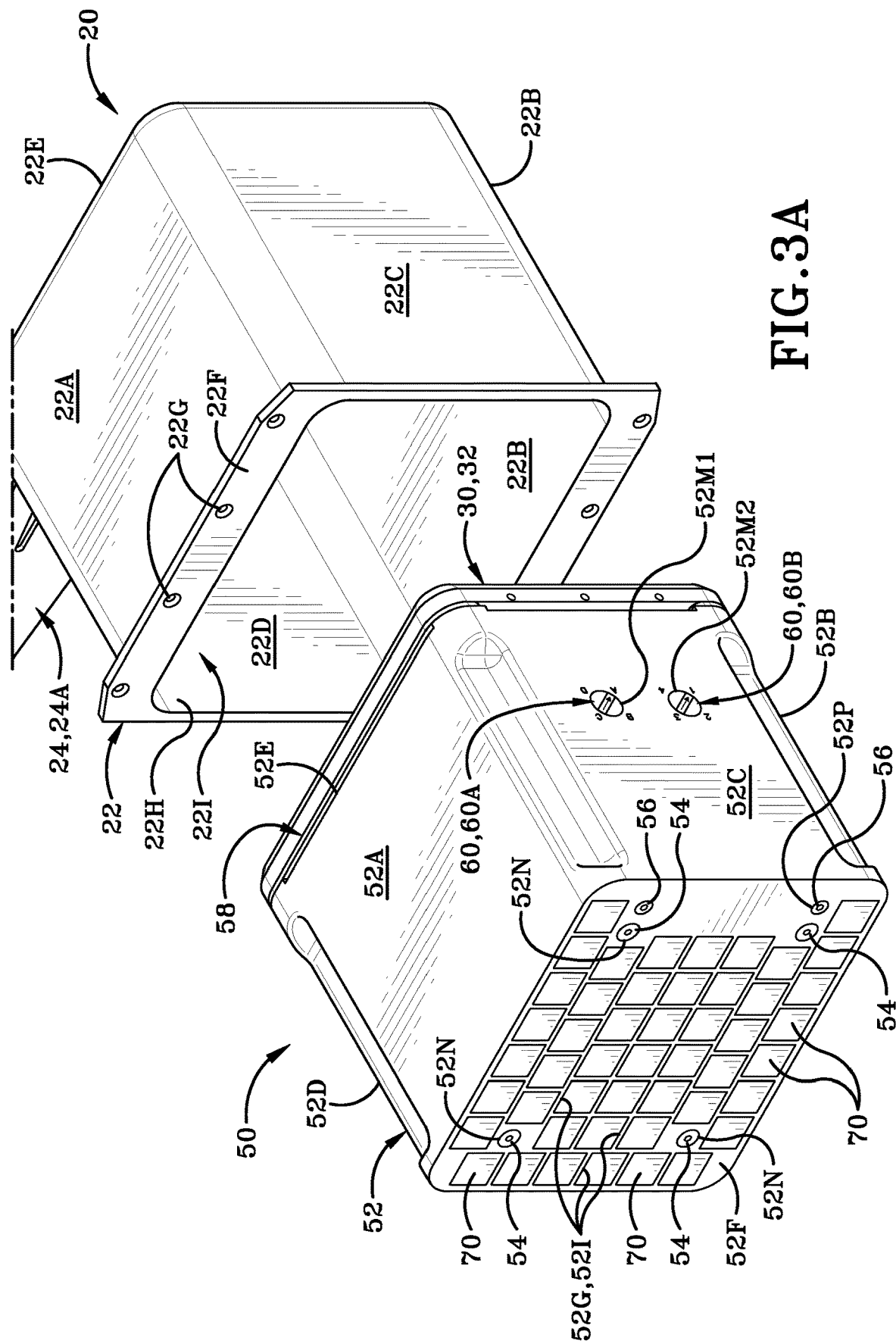
FIG. 3A is an exploded view of a breechplate assembly and a magazine assembly of CMDS shown in FIG. 2 exploded away from a dispenser assembly of CMDS shown in FIG. 2.

As best seen in FIG. 3A, CMDS 10 includes a dispenser 22 that operably engages with the aircraft 1 inside of the chamber 5 defined in the sidewall 3. In the illustrated embodiment, the dispenser 22 is a legacy AN/ALE-47 dispenser used in a standard AN/ALE-47 CMDS. The dispenser 22 includes a top wall 22A, a bottom wall 22B vertically opposite to the top wall 22A, and a vertical axis defined therebetween. The dispenser 22 also includes a pair of side walls (first side wall 22C and second side wall 22D) that are transversely opposite to the one another and defines a transverse axis therebetween. The dispenser 22 also includes a rear wall 22E that is longitudinally behind the top wall 22A, the bottom wall 22B, the first side wall 22C, and the second side wall 22D and a flange 22F that is longitudinally opposite to the rear wall 22E. As illustrated in FIG. 3A, the flange 22F is also operably engaged with each of the top wall 22A, the bottom wall 22B, the first side wall 22C, and the second side wall 22D and extends away from top wall 22A, the bottom wall 22B, the first side wall 22C, and the second side wall 22D. The flange 22F also defines a plurality of apertures 22G that extends entirely through the flange 22F. While not illustrated herein, the plurality of apertures 22G enables connectors (not illustrated) to operably engage the dispenser 22 with the aircraft 1 for maintaining the CMDS 10 with the aircraft 1; such engagement of the dispenser 22 with the aircraft 1 may be conventional means currently used in the art. In other exemplary embodiments, connectors described previously may be any suitable components that are configured to operably engage a dispenser with an aircraft for maintaining a CMDS with the aircraft (e.g., fasteners and other similar components of the like)

Still referring to FIG. 3A, the dispenser 22 also defines an opening 22H providing access into a chamber 22I. Specifically, the top wall 22A, the bottom wall 22B, the first side wall 22C, the second side wall 22D, and the rear wall 22E collectively define the opening 22H and the chamber 22I. Such use and purpose of the opening 22H and the chamber 22I are described in more detail below.

Figure 4:
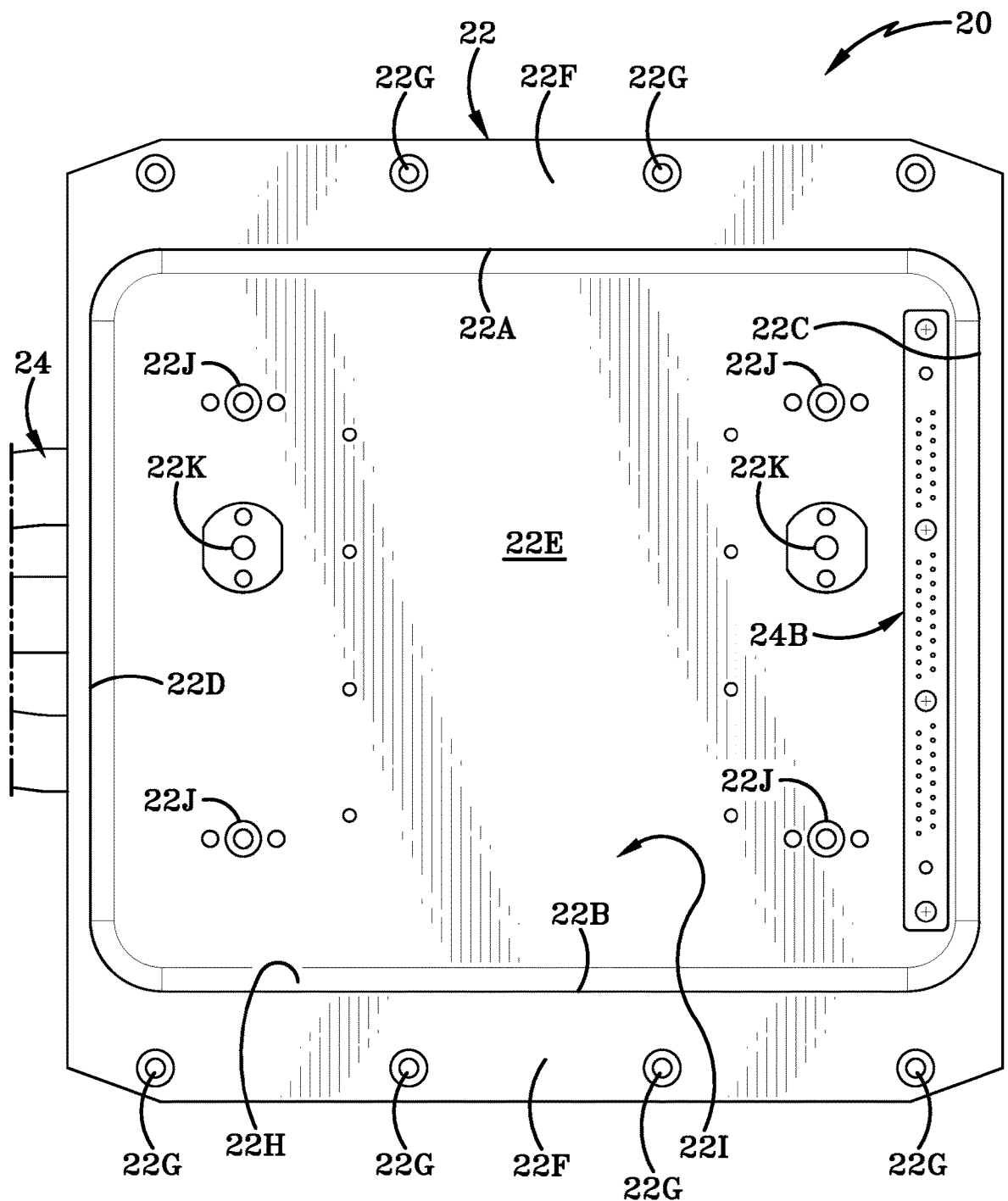
FIG. 4 is a front elevation view of a dispenser of the dispenser assembly shown of CMDS shown in FIG. 2.

Referring to FIG. 4, the dispenser 22 also includes a set of standoffs 22J and a set of alignment pins 22K. In the illustrated embodiment, each standoff of the set of standoffs 22J is operably engaged with the rear wall 22E of the dispenser 22 inside of the chamber 22I. Similarly, each alignment pin of the set of alignment pins 22K is also operably engaged with the rear wall 22E of the dispenser 22 inside of the chamber 22I. The use and purpose of the set of standoffs 22J and the set of alignment pins 22K are described in more detail below.

Referring to FIG. 3A, the dispenser assembly 20 also includes a legacy A-Kit wiring 24 that operably engaged with the dispenser 22. The A-Kit wiring 24 is configured to provide an electrical connection between the dispenser 22 and a sequencer provided on the platform 1 in order to enable logic communication between each of the dispenser 22 and the sequencer for dispensing and/or ejecting expendables from the CMDS 10. The A-Kit wiring harness 24A includes a wiring harness 24A that is electrically connected with a socket 24B and a plug 24C. As illustrated, the socket 24B is engaged with the rear wall 22E of the dispenser 22 and is housed inside of the chamber 22I. As shown in FIGS. 3A and 4, the socket 24B is configured to electrically connect with a controller assembly of the CMDS 10 to provide communication between the controller assembly and the sequencer of the platform 1. The plug 24C is positioned remote from the dispenser 22 and free from engaging the dispenser 22. The plug 24C is configured to electrically connected with a socket provided on the platform 1 (not illustrated) to electrically connect with a sequencer provided on the platform 1.

Figure 3B:
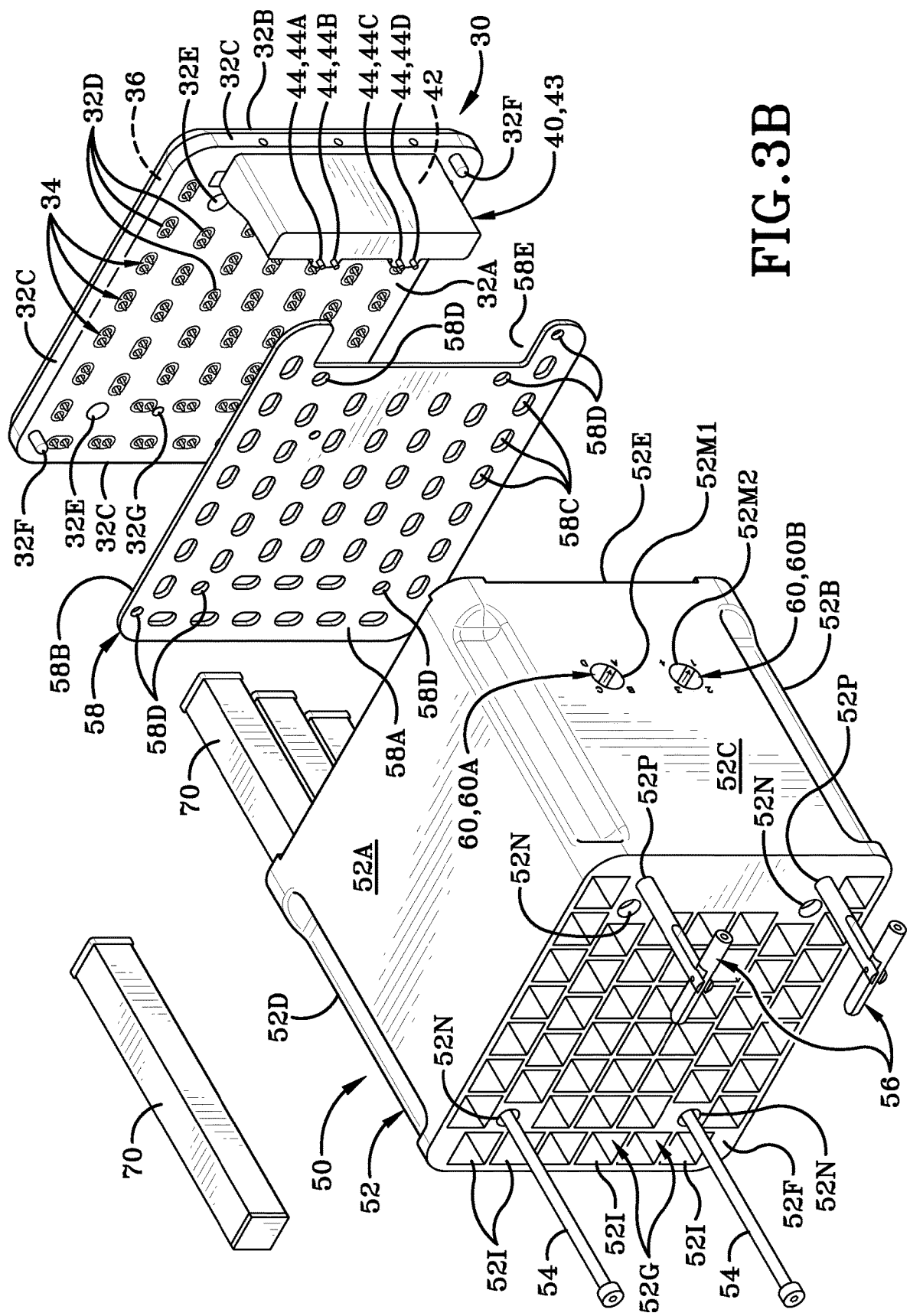
FIG. 3B is an exploded view of the breechplate assembly and the magazine assembly of CMDS shown in FIG. 2.

Referring to FIG. 3B, CMDS 10 also includes a breechplate assembly 30 that operably engages with the dispenser assembly 20, particularly with the dispenser 22 of the dispenser assembly 20. Upon assembly, the entire breechplate assembly 30 is housed inside of the dispenser 22 and provides forty-eight firing lines as compared to the legacy thirty fires lines provided in legacy CMDS. The component and parts of the breechplate assembly 30 are described in greater detail below.

Figure 9A:
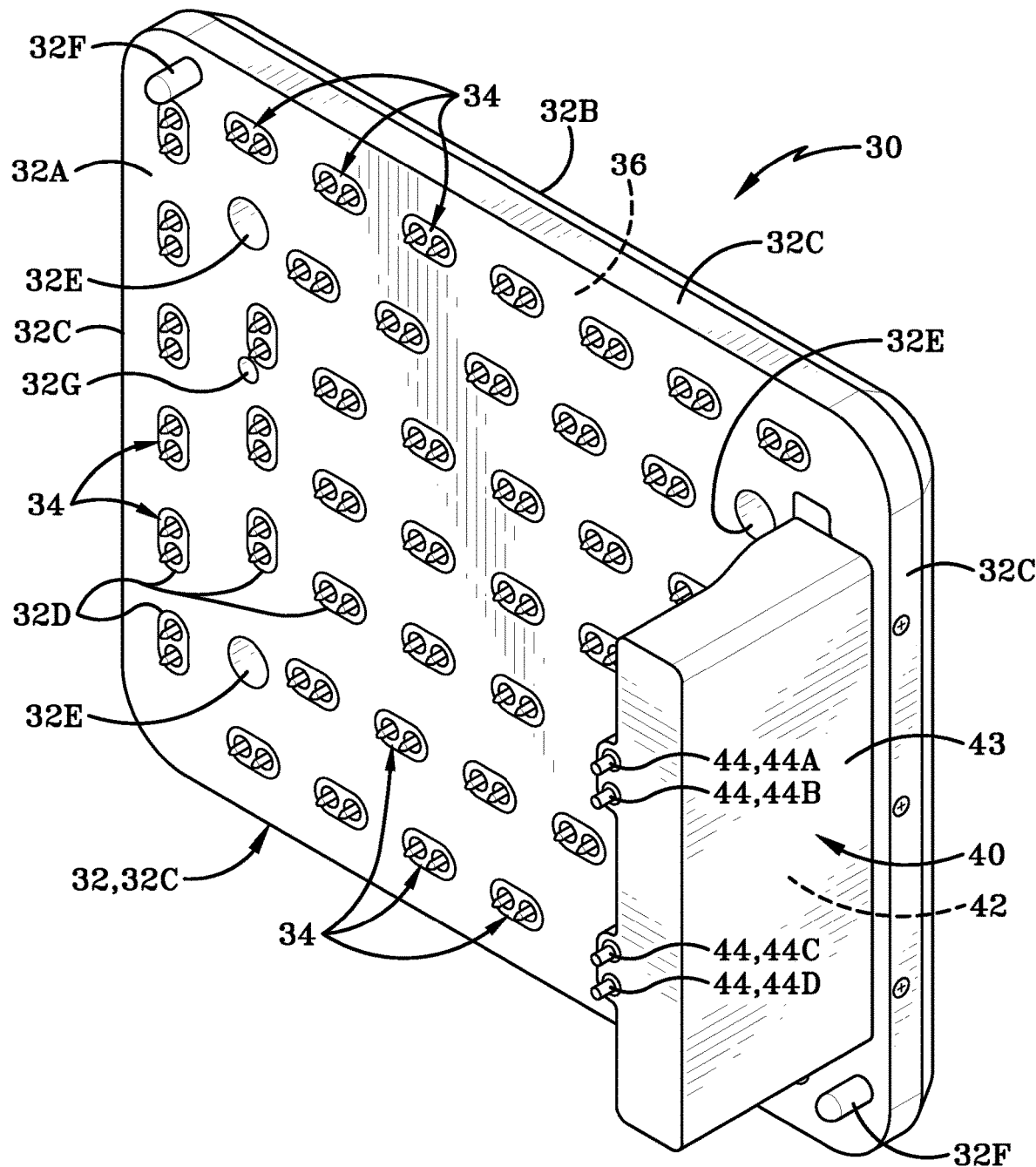
FIG. 9A is a front, top, first side isometric perspective view of the breechplate assembly and a controller assembly of CMDS shown in FIG. 2.

Referring to FIG. 9A, the breechplate assembly 30 includes a faceplate 32 that operably engages with the dispenser 22 inside of the chamber 22I. The faceplate 32 includes a front or first surface 32A, a rear or second surface 32B opposite to the front surface 32A and facing away from the front surface 32A, and a circumferential wall 32C intermediate to the front surface 32A and the second surface 32B. The faceplate 32 also defines a first set of through-holes 32D that extends entirely through the faceplate 32 from the front surface 32A to the rear surface 32B in which the front surface 32A and the rear surface 32B are in fluid communication with one another; such use and purpose of the first set of through-holes 32D is described in more detail below. Similarly, the faceplate 32 also defines a second set of through-holes 32E that extends entirely through the faceplate 32 from the front surface 32A to the rear surface 32B in which the front surface 32A and the rear surface 32B are in fluid communication with one another; such use and purpose of the set of through-holes 32D is described in more detail below. It should be understood that the first set of through-holes 32D and the second set of through-holes 32E are separate and spaced apart from one another on the faceplate 32.

Referring to FIGS. 3B and 9A, the faceplate 32 also includes a set of magazines pins 32F that are operably engaged with the faceplate 32. Each magazine pin of the set of magazine pins 32F extends away from the front surface 32A and away from the faceplate 32. As described in more detail below, the set of magazine pins 32F enables a magazine of CMDS 10 to centrally align with the faceplate 32 upon assembly of the CMDS 10. As such, the set of magazine pins 32F provides alignment assistance when assembling the CMDS 10 into the platform 1.

Figure 9B:
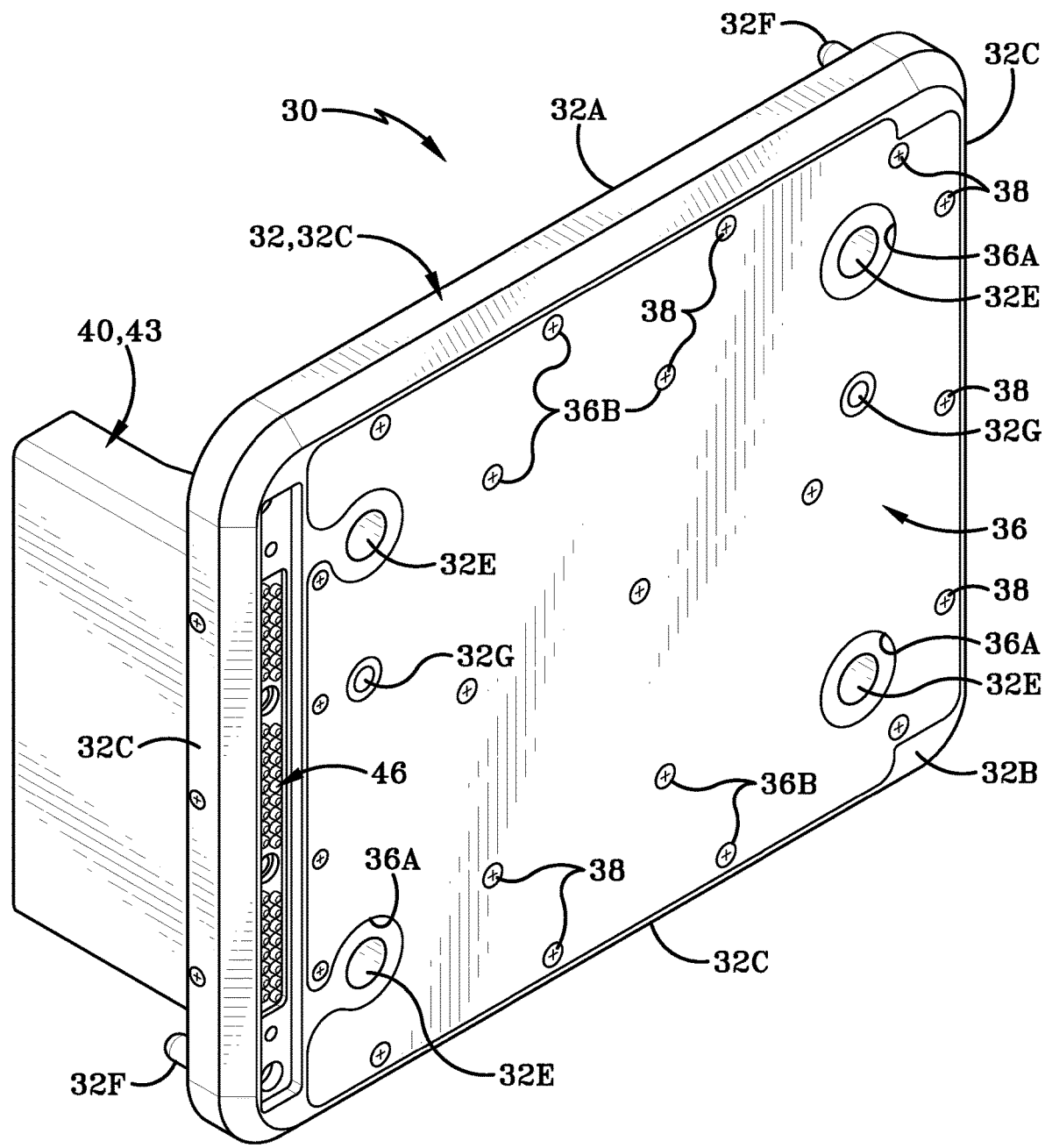
FIG. 9B is a rear, top, first side isometric perspective view of the breechplate assembly and a controller assembly of CMDS shown in FIG. 2.

Referring to FIG. 9B, the faceplate 32 also defines a third set of through-holes 32G. Each through-hole of the third set of through-holes 32G extends entirely through the faceplate 32 between the front surface 32A and the rear surface 32B where the front surface 32A and the rear surface 32B are in fluid communication with one another at each through-hole of the third set of through-holes 32G. Each through-hole of the third set of through-holes 32G is also configured to enable a standoff of the set of standoffs 22J to pass through the faceplate 32 upon assembly.

Referring to FIG. 9, the breechplate assembly 30 also includes a set of fire pin mechanisms 34 that operably engages with the faceplate 32. In the illustrated embodiment, the set of fire pin mechanisms 34 is configured to operably engage with a set of countermeasure expendables (e.g., countermeasure expendables 7) once loaded into the CMDS 10, which is described in more detail below. The set of fire pin mechanisms 34 may be any suitable fire pin mechanisms 34 that are capable of initiating impulse cartridges to dispense countermeasure material from countermeasure expendables known in the art. In one exemplary embodiment, a set of fire pin mechanisms that may be used include fire pin mechanisms described and illustrated in U.S. patent application Ser. No. 17/345,551. While not illustrated herein, the faceplate 32 may be configured to house any suitable electrical connections and/or electrical wiring that operably engages with each fire pin mechanism of the set of fire pin mechanisms. In one exemplary embodiment, the faceplate 32 described and illustrated herein may define cavities and/or recesses in the rear surface 32B of the faceplate 32 to accommodate and/or house any suitable electrical connections and/or electrical wiring that operably engages with each fire pin mechanism of the set of fire pin mechanisms.

Referring to FIG. 9B, the breechplate assembly 30 includes a rear cover plate 36 that is operably engaged with the faceplate 32 via connectors 38. In other exemplary embodiments, connectors 38 described previously may be any suitable components that are configured to operably engage a rear cover plate with a faceplate of a breechplate assembly (e.g., fasteners and other similar components of the like). The rear cover plate 36 is configured to cover and protect the rear surface 32B of the faceplate 32 along with any electrical connections and/or wires that electrically connect to the set of fire pin mechanisms 34. As best seen in FIG. 9B, the rear cover plate 36 defines a first set of through-holes 36A that extends entirely through the rear cover plate 36. Upon assembly of the breechplate assembly 30, the first set of through-holes 36A of the rear cover plate 36 is aligned with the second set of through-holes 32E of the faceplate 32. The rear cover plate 36 also defines a second set of through-holes 36B that extends entirely through the rear cover plate 36. Upon assembly of the breechplate assembly 30, the connectors 38 pass through the second set of through-holes 36B to threadably engage with the faceplate 32 to operably engage the rear cover plate 36 at the rear surface 32B of the faceplate 32.

Referring to FIG. 9A, CMDS 10 also includes a controller assembly or embedded fire select multiplexer assembly (EFSM) 40 that operably engages with the breechplate assembly 30. More particularly, the controller assembly 40 operably engages with the faceplate 32 at the front surface 32A of the faceplate 32 and electrically connects with each firing pin mechanism of the set of fire pin mechanisms 34. Such components and parts that make up the controller assembly 40 are described in greater detail below.

In the illustrated embodiment, the controller assembly 40 includes a circuit card 42 or circuit board that is protected by a cover 43 operably engaged with the faceplate 32. The circuit card 42 is operably engages with the faceplate 32 at the front surface 32A of the faceplate 32 and electrically connects with each firing pin mechanism of the set of fire pin mechanisms 34. The combination of the firing pin mechanisms 34 along with the circuitry of the circuit card 42 of the controller assembly 40 expands the number of countermeasure expendables from thirty countermeasure expendables in legacy CMDSs (e.g., AN/ALE-47 systems) up to forty-eight countermeasure expendables while using legacy hardware and components (i.e., the dispenser assembly 20 and legacy on-board countermeasure systems provided on the platform 1). In one example, the circuit card 42 may be the circuit card described and illustrated in U.S. patent application Ser. No. 17/345,551 for expanding the number of countermeasure expendables from thirty countermeasure expendables in legacy CMDSs (e.g., AN/ALE-47 systems) up to forty-eight countermeasure expendables while using legacy hardware and components. In this example, the controller assembly 40 may include substantially similar electrical components and devices needed to expand the number of countermeasure expendables from thirty countermeasure expendables in legacy CMDSs (e.g., AN/ALE-47 systems) up to at least forty-eight countermeasure expendables while using legacy hardware and components. In another example, any suitable controller assembly and/or EFSM may be used herein to expand the number of countermeasure expendables from thirty countermeasure expendables in legacy CMDSs (e.g., AN/ALE-47 systems) up to forty-eight countermeasure expendables while using legacy hardware and components.

During operation, any number of fire pin mechanisms 34 may be initiated by the controller assembly 40 to dispense any number of countermeasure expendables loaded into CMDS 10. In one example, at least one group of fire pin mechanisms from the fire pin mechanisms 34 that is less than the entire number of fire pin mechanisms 34 (e.g., between one fire pin mechanism up to forty-seven fire pin mechanisms) may be initiated by the controller assembly 40 to dispense at least one group of countermeasure expendables that is less than the entire number of countermeasure expendables (e.g., between one countermeasure expendable up to forty-seven countermeasure expendables). In another example, at least one group of fire pin mechanisms from the fire pin mechanisms 34 that is less than the entire number of fire pin mechanisms 34 (e.g., between one fire pin mechanism up to forty-seven fire pin mechanisms) may be initiated by the controller assembly 40 to dispense at least one group of countermeasure expendables that is less than the entire number of countermeasure expendables (e.g., between one countermeasure expendable up to forty-seven countermeasure expendables), and at least another group of fire pin mechanism from the fire pin mechanisms 34 that is less than the entire number of fire pin mechanisms 34 (e.g., between one fire pin mechanism up to forty-seven fire pin mechanisms) may be initiated by the controller assembly 40 to dispense at least another group of countermeasure expendables that is less than the entire number of countermeasure expendables (e.g., between one countermeasure expendable up to forty-seven countermeasure expendables). In this example, the at least one group of fire pin mechanisms and the at least another group of fire pin mechanisms may include an equal number of fire pin mechanism in each group. In this example, the at least one group of fire pin mechanisms and the at least another group of fire pin mechanisms may include different number of fire pin mechanisms in each group.

Referring to FIG. 9A, the controller assembly 40 may also include at least one set of magazine identification buttons (hereinafter "MIBs") generally referred to as 44 operably engaged with the circuit card 42. The at least one set of MIBs 44 may also be operably engaged with a sequencer provided on the platform 1 for communicating with the sequencer during military operations, which is described in more detail below. As illustrated, the controller assembly 40 includes a single set of MIBs 44 having a first MIB 44A, a second MIB 44B, a third MIB 44C, and a fourth MIB 44D operably engaged with circuit card 42 and a sequencer provided on the platform 1. As illustrated, the first MIB 44A and the second MIB 44B are grouped with one another and are positioned adjacent to one another on the circuit card 42 and the cover 43. Similarly, the third MIB 44C and the fourth MIB 44D are also grouped with one another and are positioned adjacent to one another on the circuit card 42 and the cover 43. In the illustrated embodiment, the first MIB 44A and the second MIB 44B are positioned vertically above the third MIB 44C and the fourth MIB 44D. During operation, each of the first MIB 44A, the second MIB 44B, the third MIB 44C, and the fourth MIB 44D may be actuated separately and independent from one another by components provided in the CMDS 10, which is described in more detail below.

The controller assembly 40 also includes a connection socket 46 that operably engages the circuit card 42 and the set of MIBs 44 with the dispenser assembly 20 (see FIG. 96). Specifically, the connection socket 46 is configured to electrically connect with the socket 24B of the A-Kit wiring 24 to provide communication between a sequencer of the platform 1 and the circuit card 42 during operation. It is understood that the connection socket 46 is configured to match the legacy construction of the socket 24B to enable the controller assembly 40 to communicate with a legacy sequencer during military operations.

Referring to FIG. 3B, CMDS 10 also includes a magazine assembly 50 that operably engages with the dispenser assembly 20, the breechplate assembly 30, and the controller assembly 40. More particularly, the magazine assembly 50 is configured to be attached with the breechplate assembly 30 and configured to house the controller assembly 40, which is described in more detail below. Once assembled, the breechplate assembly 30, the controller assembly 40, and the magazine assembly 50 are operably engaged with the dispenser 22 and housed inside of the chamber 221 defined by the dispenser 22. Such components and parts that make up the magazine assembly 50 are described in more detail below.

Figure 5:
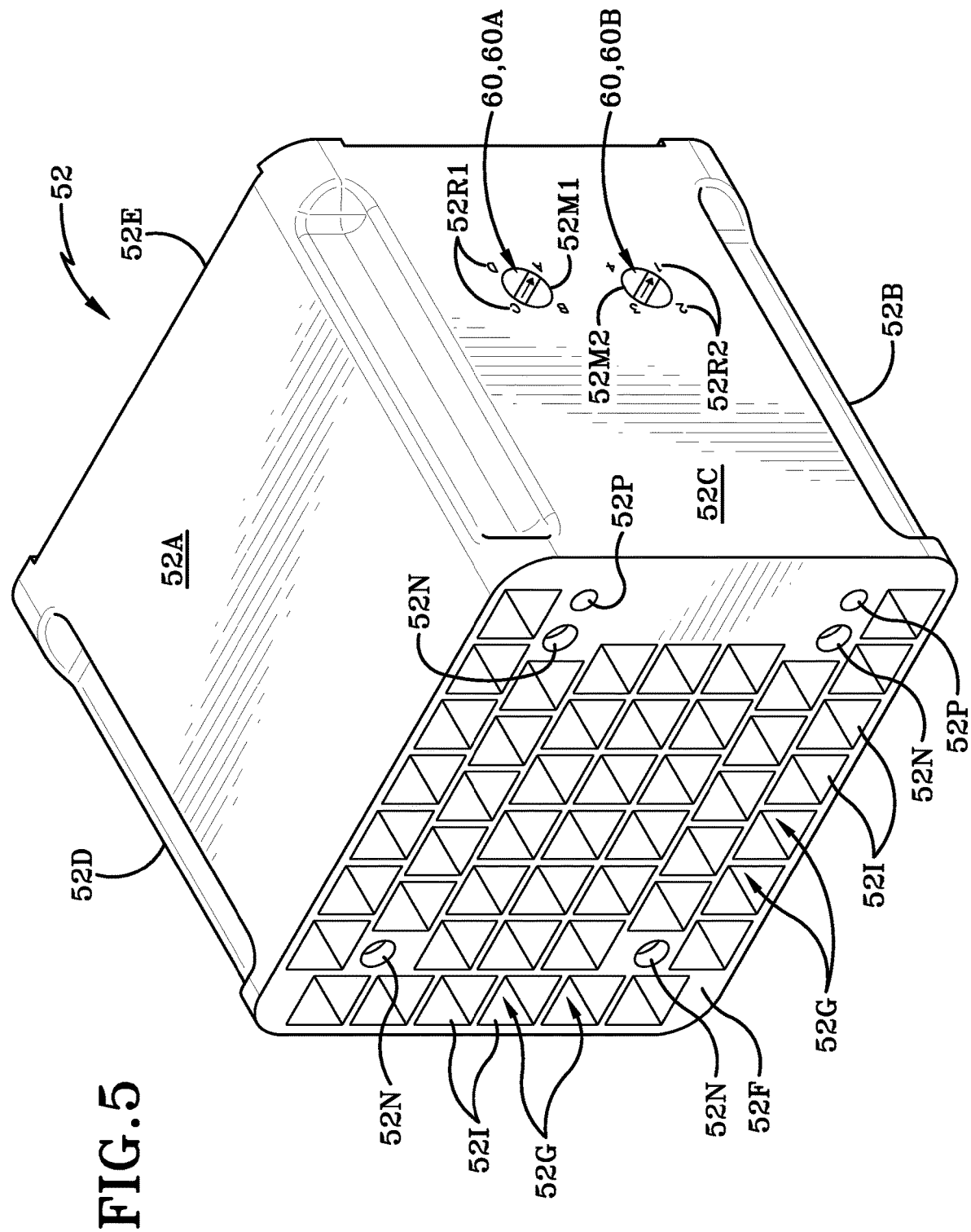
FIG. 5 is a front, top, first side isometric perspective view of a magazine of the magazine assembly of CMDS shown in FIG. 2.

Referring to FIG. 5, the magazine assembly 50 includes a magazine 52. The magazine 52 includes a top wall 52A, a bottom wall 52B vertically opposite to the top wall 52A, and a vertical axis defined therebetween. The magazine 52 also includes a first side wall 52C positioned between the top wall 52A and the bottom wall 52B, a second side wall 52D positioned between the top wall 52A and the bottom wall 52B and transversely opposite to the first side wall 52C, and a transverse axis defined therebetween. The magazine 52 also includes a rear wall 52E that is longitudinally behind the top wall 52A, the bottom wall 52B, the first side wall 52C, and the second side wall 52D, a front wall 52F that is longitudinally ahead of the top wall 52A, the bottom wall 52B, the first side wall 52C, and the second side wall 52D and longitudinally opposite to the rear wall 52E, and a longitudinal axis defined therebetween.

Still referring to FIG. 5, the magazine 52 defines a set of passageways 52G that extends longitudinally between the rear wall 52E and the front wall 52F. As such, the rear wall 52E of the magazine 52 and the front wall 52F of the magazine 52 are in fluid communication with one another at each passageway of the set of passageways 52G. In the illustrated embodiment, the magazine 52 defines forty-eight passageways 52G to load and house forty-eight countermeasure expendables for CMDS 10. As described above, the breechplate assembly 30 and the controller assembly 40 enables CMDS 10 to accommodate and dispense forty-eight countermeasure expendables as compared to thirty countermeasure expendables currently allowed in conventional AN/ALE-47 CMDS. The set of passageways 52G are accessible via a rear set of apertures 52H defined at the rear wall 52E of the magazine 52 (see FIG. 7) and a front set of apertures 52I defined at the front wall 52F of the magazine 52. With such structural configuration of the magazine 52, an operator is enabled to load each countermeasure expendable into the set of passageways 52G at the rear set of apertures 52H while the front set of apertures 52I enables each countermeasure expendable to dispense countermeasure material (e.g., flare material, chaff material, and other countermeasure material of the like) from the magazine 52.

Figure 7:
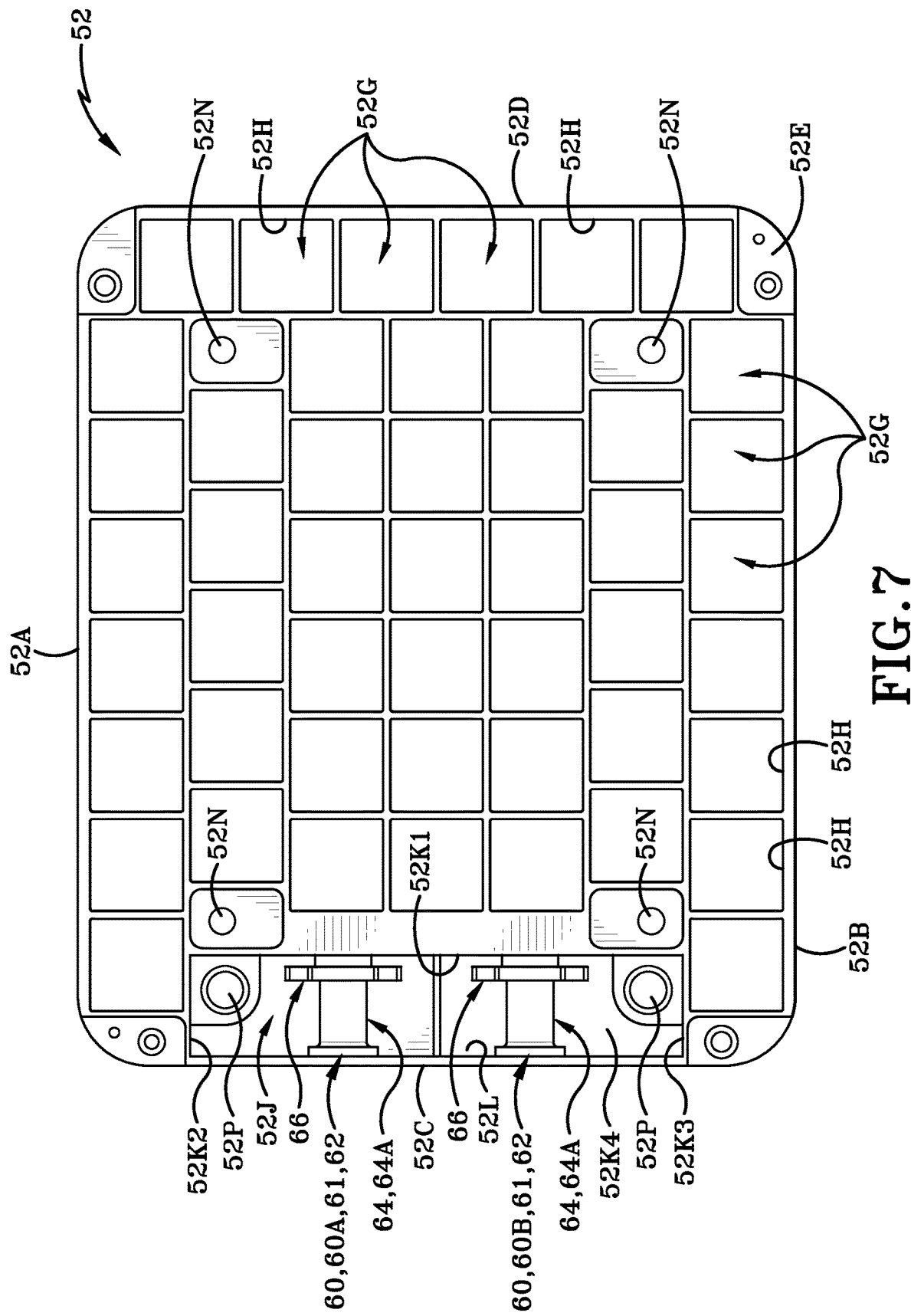
FIG. 7 is a rear elevation view of the magazine shown in FIG. 5.

Referring to FIG. 7, the magazine 52 also defines a side chamber 52J. The side chamber 52J extends longitudinally into the magazine 52 from the rear wall 52E and towards the front wall 52F. As best shown in FIG. 7, the side chamber 52J is collectively defined by the first side wall 52C, a first interior wall 52K1 transversely opposite to the first side wall 52C, a second interior wall 52K2 disposed between and vertically above the first side wall 52C and the first interior wall 52K1, a third interior wall 52K3 disposed between and vertically below the first side wall 52C and the first interior wall 52K1, and a fourth interior 52K4 longitudinally ahead of the first interior wall 52K1, the second interior wall 52K2, and the third interior wall 52K3. The side chamber 52J is also accessible at a rear opening 52L collectively defined at the rear wall 52E of the magazine 52 by the first side wall 52C, the first interior wall 52K1, the second interior wall 52K2, and the third interior wall 52K3. In the illustrated embodiment, the side chamber 52J is separate and spaced apart from the set of passageways 52G defined in the magazine 52.

Figure 6:
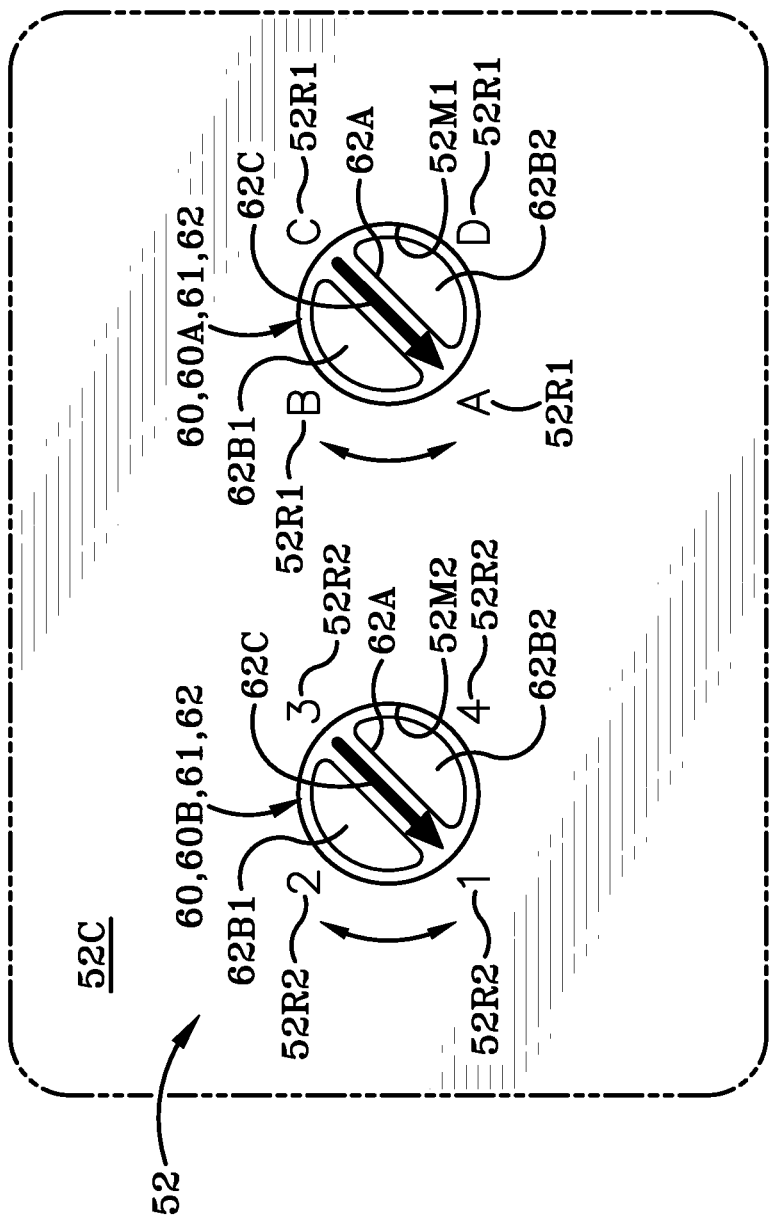
FIG. 6 is an enlarged view of a set of magazine identification switches (or MIS) of CMDS shown in FIG. 2.

Referring to FIG. 6, the magazine 52 also defines a first side opening 52M1 in the first side wall 52C. The first side opening 52M1 extends entirely through the first side wall 52C to provide fluid communication between the exterior environment of the magazine 52 and the side chamber 52J. Similarly, the magazine 52 also defines a second side opening 52M2 in the first side wall 52C defined vertically below the first side opening 52M1. The second side opening 52M2 also extends entirely through the first side wall 52C to provide fluid communication between the exterior environment of the magazine 52 and the side chamber 52J. Such use and purpose of the first side opening 52M1 and the second side opening 52M2 are described in more detail below.

Referring to FIG. 7, the magazine 52 may include a first set of attachment mounts 52N that extends longitudinally between the rear wall 52E and the front wall 52F. Each attachment mount of the first set of attachment mounts 52N is positioned between the set of passageways 52G to match the set of standoffs 22J provided in the legacy dispenser 22. The magazine 52 may also include a second set of attachment mounts 52P that are operably engaged with the magazine 52 inside of the side chamber 52J. More particularly, the second set of attachment mounts 52P may be operably engaged with at least one of the first side wall 52C, the first interior wall 52K1, the second interior wall 52K2, and the third interior wall 52K3 inside of the side chamber 52J. In the illustrated embodiment, at least one attachment mount of the second set of attachment mounts 52P is operably engaged with the first interior wall 52K1 and the second interior wall 52K2, and at least another attachment mount of the second set of attachment mounts 52P is operably engaged with the first interior wall 52K1 and the third interior wall 52K3. Such use and purpose of the first set of attachment mounts 52N and the second set of attachment mounts 52NP are described in more detail below.

Referring to FIG. 6, the magazine 52 also includes at least one set of indicia 52R that is positioned circumferentially about at least one of the first side opening 52M1 and the second side opening 52M2. In the illustrated embodiment, the magazine 52 includes a first indicia 52R1 that is positioned circumferentially about the first side opening 52M1 and a second indicia 52R2 that is positioned circumferentially about the first side opening 52M1. In the illustrated embodiment, the first indicia 52R1 includes four markings spaced equally apart from one another positioned radially about the first side opening 52M1. Similarly, the second indicia 52R2 also includes four markings spaced equally apart from one another positioned radially about the second side opening 52M2. In other exemplary embodiments, any suitable number of markings may be provided in each of a first indicia and a second indicia. Such uses and purposes of the first indicia 52R1 and the second indicia 52R2 is described in more detail below.

Referring back to FIG. 3B, the magazine assembly 50 may also include a set of connectors 54 that operably engages both the magazine 52 and the breechplate assembly with the dispenser 22. In the illustrated embodiment, the set of connectors 54 operably engages the magazine 52, via the first set of attachment mounts 52N, and the breechplate assembly 30, via the second set of through-holes 32E defined in the faceplate 32, with the set of standoffs 22J positioned inside of the chamber 22I of the dispenser 22. More particularly, the set of connectors 54 threadably engages both the magazine 52 and the breechplate assembly 30 to the legacy attachment points (i.e., the set of standoffs 22J) of the legacy dispenser 22 (e.g., the legacy AN/ALE-47 CMDS).

Referring to FIG. 3B, the magazine assembly 50 also includes a set of T-handle stow connectors 56 operably engaged with the magazine 52. More particularly, the set of T-handle stow connectors 56 operably engages with the magazine 52 via the second set of attachment mounts 52P positioned inside of the side chamber 52J. The set of T-handle stow connectors 56 provides an operator with a grip or handle mechanism to remove at least the magazine 52 from the dispenser 22 for maintenance or service operations. During operation, the T-handle stow connectors 56 may be provided in operating positions where a portion of each T-handle stow connectors 56 is extended from outside of the magazine 52 and gripped by the operator to remove at least the magazine 52 from the dispenser 22 for maintenance or service operations (see FIG. 36). In this position, the T-handle stow connectors 56 are configured to unseat the breechplate assembly 30 from the dispenser assembly 20 and controller 40, specifically socket 24B and connection socket 46. As such, the T-handle stow connectors 56 are configured to overcome the resistance of the socket 24B and connection socket 46 to extract the breechplate assembly 30 from the dispenser assembly 20 and controller 40. The T-handle stow connectors 56 may also be provided in stowed positions when the T-handle stow connectors 56 are stowed inside of the magazine 52 when the operator has no need or use of removing the magazine 52 from the dispenser 22 (see FIG. 3A).

Referring to FIG. 3B, the magazine assembly 50 may also include a retaining plate 58 that operably engages with the rear wall 52E of the magazine 52. The retaining plate 58 includes a front surface 58A facing the rear wall 52E of the magazine 52, a rear surface 58B facing the front surface 32A of the faceplate 32 and facing in an opposite direction of the front surface 58A. The retaining plate 58 also defines a first set of holes 58C extending entirely through the retaining plate 58 from the front surface 58A to the rear surface 58B. Upon assembly of CMDS 10, the first set of holes 58C defined in the retaining plate 58 is coaxial with the first set of through-holes 32D of the faceplate 32 to enable the set of firing pin mechanisms 34 to operably engage with impulse cartridges of countermeasure expendables loaded in the magazine 52. The retaining plate 58 also defines a second set of holes 58D extending entirely through the retaining plate 58 from the front surface 58A to the rear surface 58B in which the second set of holes 58D is separate and spaced apart from the first set of holes 58C. The second set of holes 58D enables the connectors 54 to pass through the second set of holes 58D to operably engage the magazine assembly 50 and the breechplate assembly 30 with the dispenser 22. The retaining plate 58 also defines a cutout 58E that is sized and configured to enable the circuit card 42 and the cover 43 of the controller assembly 40 to pass through the retaining plate 58 and be housed inside of the side chamber 52J upon assembly, which is described in more detail below.

Figure 8:
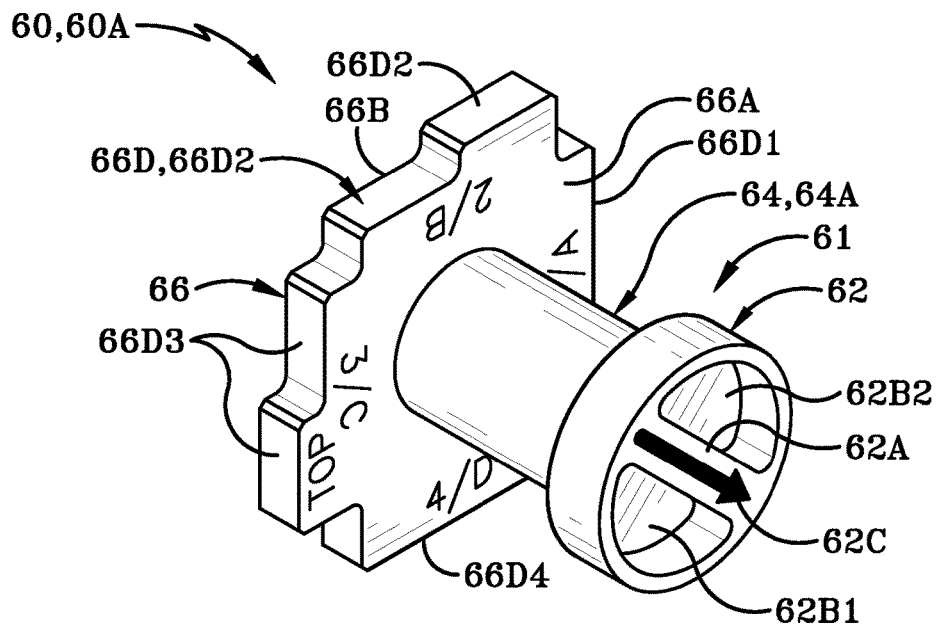
FIG. 8 is a front, top, second side isometric perspective view of a MIS from the set of MIS shown in FIG. 6.
Figure 8A:
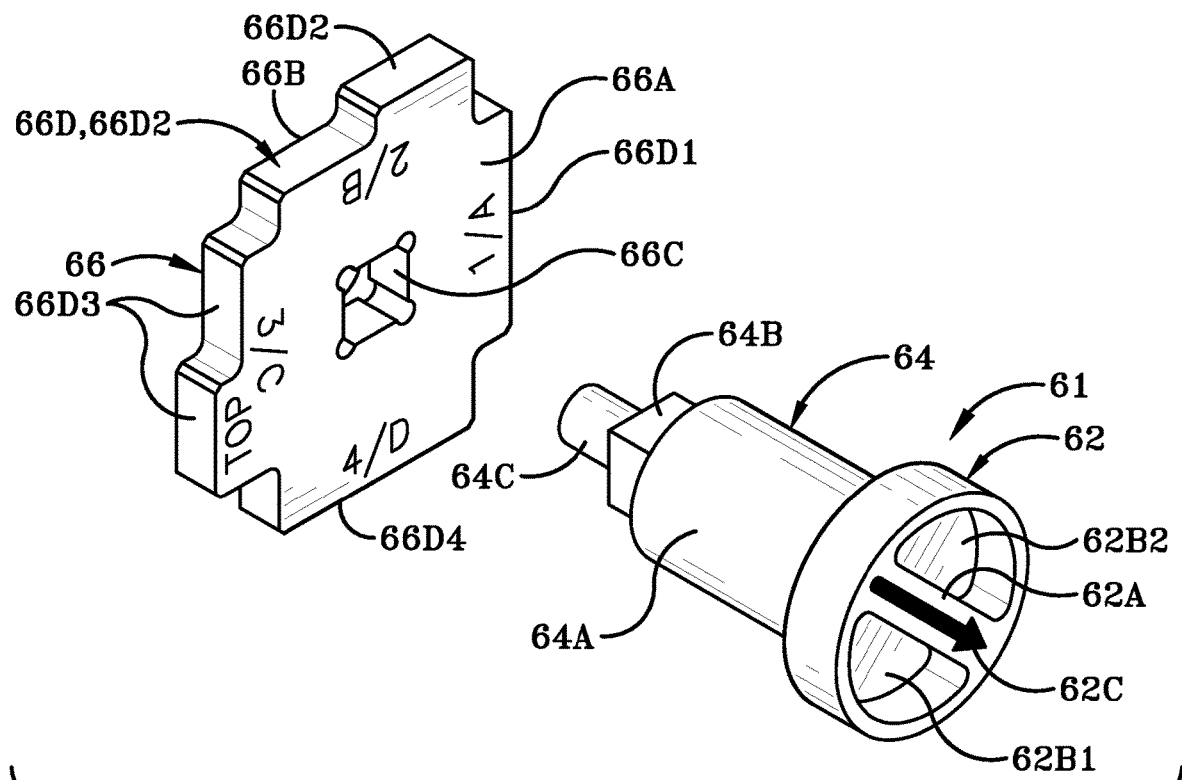
FIG. 8A is an exploded view of the MIS shown in FIG. 8.
Figure 10:
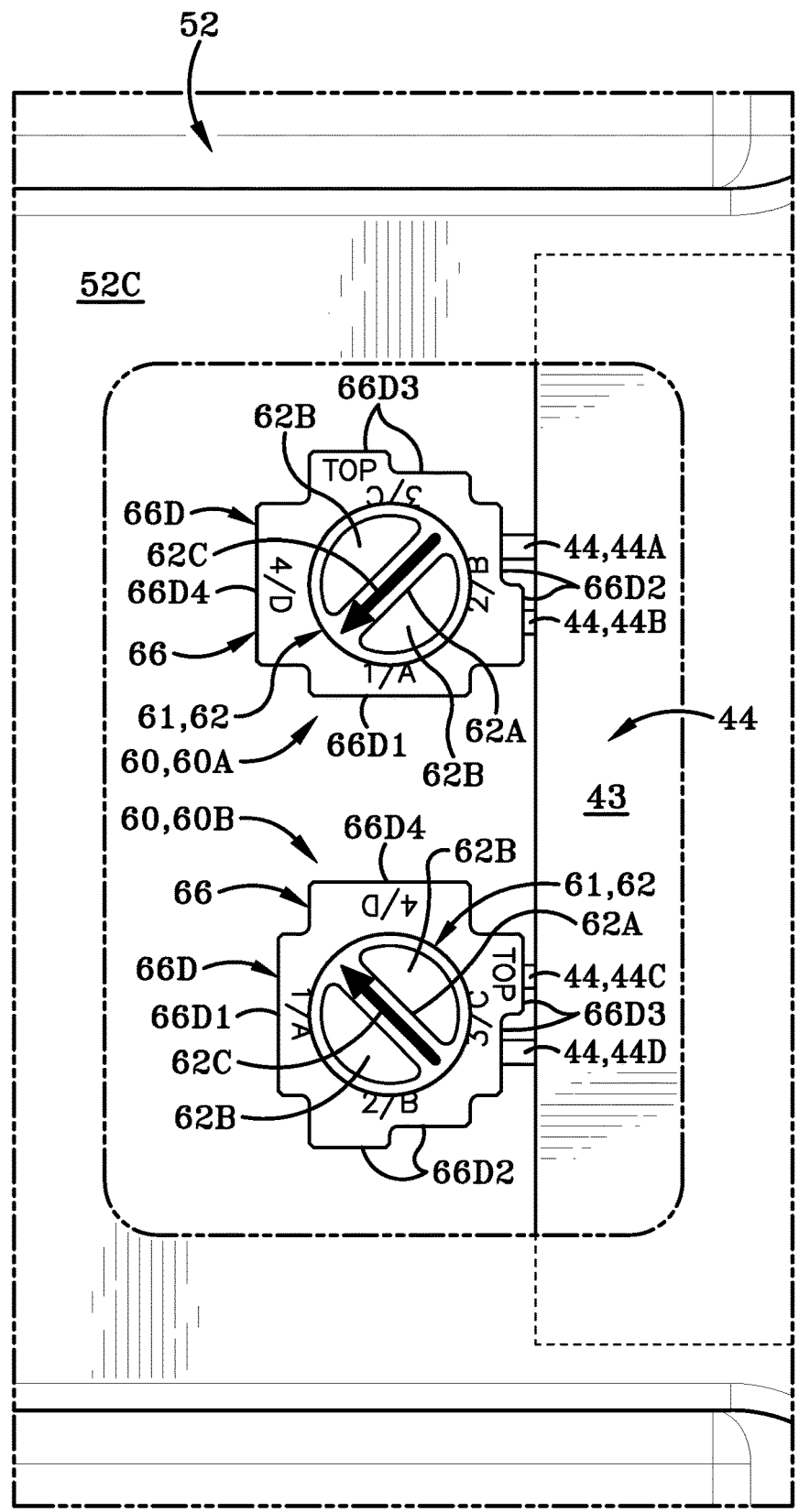
FIG. 10 is an operational view of the CMDS, wherein a set of magazine identification buttons (MIBs) is actuated by the set of MISs prior to be loaded into the dispenser of the dispense assembly.

Referring to FIGS. 8 and 8A, CMDS 10 also includes at least one magazine identification switch (MIS) 60 that operably engages with the magazine 52 (see FIGS. 3B, 6, and 10). Particularly, CMDS 10 includes a first MIS 60A that operably engages with the first side wall 52C of the magazine 52 via the first side opening 52M1. CMDS 10 also includes a second MIS 60B that operably engages with the first side wall 52C of the magazine 52 via the second side opening 52M2. The first MIS 60A and the second MIS 60B are substantially similar to one another and operably engage with the magazine 52 in the same orientation. Inasmuch as the first MIS 60A and the second MIS 60B are substantially similar, the following description will relate to the first MIS 60A. It should be understood, however, that the description of the first MIS 60A applies substantially similar to the second first MIS 60B.

As illustrated in FIGS. 8 and 8A, the first MIS 60A includes a knob 61 where the knob 61 includes a head 62 operably engaged with a shaft 64. The shaft 64 is also operably engaged with an engagement plate 66. The head 62 includes a grip 62A collectively defined by a pair of recesses 62B1, 62B2 extending downwardly into the head 62 towards the shaft 64. The head 62 also includes an indicator 62C defined on the head 62 positioned between the first recess 62B1 and the second recess 62B2. In the illustrated embodiment, the indicator 62C is represented as an arrow for indicating the position of the first MIS 60A relative to the first indicia 52R1 when actuating one or both of the first MIB 44A and the second MIB 44B, which is described in more detail below.

Still referring to FIGS. 8 and 8A, the shaft 64 operably engages the head 62 and the engagement plate 66 with one another. As illustrated, the shaft 64 includes a blanked portion 64A extending from the head 62, a coupling portion 64B extending from the blanked portion 64A, and an attachment portion 64C extending from the coupling portion 64C. In the illustrated embodiment, the engagement plate 66 is operably engaged with the shaft 64 via the coupling portion 64B; such engagement of the shaft 64 and the engagement plate 66 is described in more detail below. As illustrated in FIG. 7, the attachment portion 64C also operably engage with the first interior wall 52K1 inside of the side chamber 52J of the magazine 52 while the head 62 is operably engaged with the first side wall 52C of the magazine 52.

Still referring to FIGS. 8 and 8A, the engagement plate 66 defines a first surface 66A, a second surface 66B facing opposite to the first surface 66A, and a coupling opening 66C extending entirely through the engagement plate 66 from the first surface 66A to the second surface 66B. In the illustrated embodiment, the coupling opening 66C is square-shaped, which is complementary with the square-shaped coupling portion 64D of the shaft 64. As such, the engagement plate 66 is configured to mate with the shaft 64 via this complementary structural configuration between the coupling portion 64D and the coupling opening 66C.

Still referring to FIG. 8A, the engagement plate 66 may also include at least one engagement portion 66D that extends from the engagement plate 66 and positioned between the first surface 66A and the second surface 66B. The at least one engagement portion 66D may be configured to actuate at least one of the first MIB 44A and the second MIB 44B during operation or be free from actuating either the first MIB 44A or the second MIB 44B. In one instance, the engagement plate 66 includes a first engagement portion 66D1 that has a first structural configuration where the first engagement portion 66D1 is free from actuating either the first MIB 44A and the second MIB 44B. In another instance, the engagement plate 66 includes a second engagement portion 66D2 that has a second structural configuration different than the first engagement portion 66D1; the second engagement portion 66D2 is free from actuating the first MIB 44A while actuating the second MIB 44B. In another instance, the engagement plate 66 includes a third engagement portion 66D3 that has a third structural configuration different than the first engagement portion 66D1 and the second engagement portion 66D2; the third engagement portion 66D3 actuates the first MIB 44A while being free from actuating the second MIB 44B. In another instance, the engagement plate 66 includes a fourth engagement portion 66D4 that has a fourth structural configuration different than the first engagement portion 66D1, the second engagement portion 66D2, and the third engagement portion 66D3; the fourth engagement portion 66D4 actuates both the first MIB 44A and the second MIB 44B.

Upon assembly, the knobs 62 of the first MIS 60A and the second MIS 60B are positioned inside of the first side opening 52M1 and the second side opening 52M2 where the knobs 62 are flush and/or even with the first side wall 52C. The shafts 64 and the engagement plates 66 of the first MIS 60A and the second MIS 60B are also housed inside of the side chamber 52J. Additionally, the second ends 64B of the shafts 64 of the first MIS 60A and the second MIS 60B are mounted to the first interior wall 52K1 inside of the side chamber 52J. Once assembled, the knobs 62 of the first MIS 60A and the second MIS 60B are rotatable inside of the first side opening 52M1 and the second side opening 52M2 while the second ends 64B of the shafts 64 of the first MIS 60A and the second MIS 60B are rotatably secured with the first interior wall 52K1. As described in more detail below, the first MIS 60A and the second MIS 60B may actuate the set of MIBs 44 of the controller assembly 40 depending upon the orientation of the first MIS 60A and the second MIS 60B desired by the operator of the CMDS 10.

The first MIS 60A and the second MIS 60B provided in the CMDS 10 are considered advantageous at least because the first MIS 60A and the second MIS 60B enables an operator to set desired dispensing parameter to the CMDS 10 based on the interaction between the set of MIB 44, the first MIS 60A, the second MIS 60B. As such, the circuit card 42 and/or a sequencer operably engaged with the set of MIB 44 may store instructions or software code in at least one non-transitory computer readable storage medium when any one of the first MIB 44A, the second MIB 44B, the third MIB 44C, and the fourth MIB 44D is actuated by one of both of the first MIS 60A and the second MIS 60B. With such instructions, the controller assembly 40 and the sequencer provided on the platform 1 may output a set of commands and/or signals to one another for dispensing a specific and/or desired group of countermeasure expendables loaded in the magazine 52 when the first MIS 60A and the second MIS 60B are toggled to specific orientation to actuate and engage the set of MIB 44. In the illustrated embodiment, the first MIS 60A and the second MIS 60B may provide up to sixteen different combination of actuating and engaging the set of MIB 44 for dispensing a specific and/or desired group of countermeasure expendables loaded in the magazine 52. In other exemplary embodiments, a first MIS and a second MIB may provide any suitable number of combinations of actuating a set of MIB for dispensing a desired group of countermeasure expendables via a controller assembly and a sequencer provided on a platform.

Prior to loading the magazine assembly 50 into the dispensing 22, the operator may toggle and/or rotate a MIS (e.g., first MIS 60A or second MIS 60B) to a desired orientation to prevent actuation of a first MIB and a second MIB via an engagement plate of the MIS. In one instance, the operator may toggle and/or rotate the first MIS 60A to a desired orientation to prevent actuation of the first MIB 44A and the second MIB 44B via the engagement plate 66 of the first MIS 60A. In this example, the operator would toggle the first MIS 60A to a first position by aligning the indicator 62C with a first marking of the first indicia 52R1 in which the first engagement side 66D1 of the engagement plate 66 of the first MIS 60A would be selected. Since the first engagement side 66D1 is selected in this instance, the first engagement side 66D1 is configured to prevent actuation of the first MIB 44A and the second MIB 44B since the first engagement side 66D1 is free from engaging the first MIB 44A and the second MIB 44B. Such prevention of actuating the first and second MIBs 44A, 44B by the first MIS 60A applies substantially similar to preventing actuation of the third and fourth MIBs 44C, 44D by the second MIS 60B.

In other instances, the operator may toggle and/or rotate the first MIS 60A to another desired orientation to actuate one or both of the first MIB 44A and the second MIB 44B via the engagement plate 66 of the first MIS 60A (see FIG. 10). In one example, the operator may toggle the first MIS 60A from a first position to a second position by aligning the indicator 62C with a second marking of the first indicia 52R1 in which the second engagement side 66D2 of the engagement plate 66 of the first MIS 60A would be selected. Since the second engagement side 66D2 is selected in this instance, the second engagement side 66D2 is configured to actuate only the second MIB 44B since the second engagement side 66D2 is configured to engage with the second MIB 44B. In another example, the operator may toggle the first MIS 60A to a third position by aligning the indicator 62C with a third marking of the first indicia 52R1 in which the third engagement side 66D3 of the engagement plate 66 of the first MIS 60A would be selected. Since the third engagement side 66D3 is selected in this instance, the third engagement side 66D3 is configured to actuate only the first MIB 44A since the third engagement side 66D3 is configured to engage with the first MIB 44A; this toggling operation is illustrated in FIG. 10 showing the second MIS 60B actuating the third MIB 44C. In another example, the operator may toggle the first MIS 60A to a fourth position by aligning the indicator 62C with a fourth marking of the first indicia 52R1 in which the fourth engagement side 66D4 of the engagement plate 66 of the first MIS 60A would be selected. Since the fourth engagement side 66D4 is selected in this instance, the fourth engagement side 66D4 is configured to actuate both the first MIB 44A and the second MIB 44B since the fourth engagement side 66D4 is configured to engage both the first MIB 44A and the second MIB 44B. Such actuation of one or both of the first and second MIBs 44A, 44B by the first MIS 60A applies substantially similar to actuation of one or both of the third and fourth MIBs 44C, 44D by the second MIS 60B.

Having now described the assemblies and components of CMDS 10, methods of loading and using the CMDS 10 are described in more detail below.

Figure 11A:
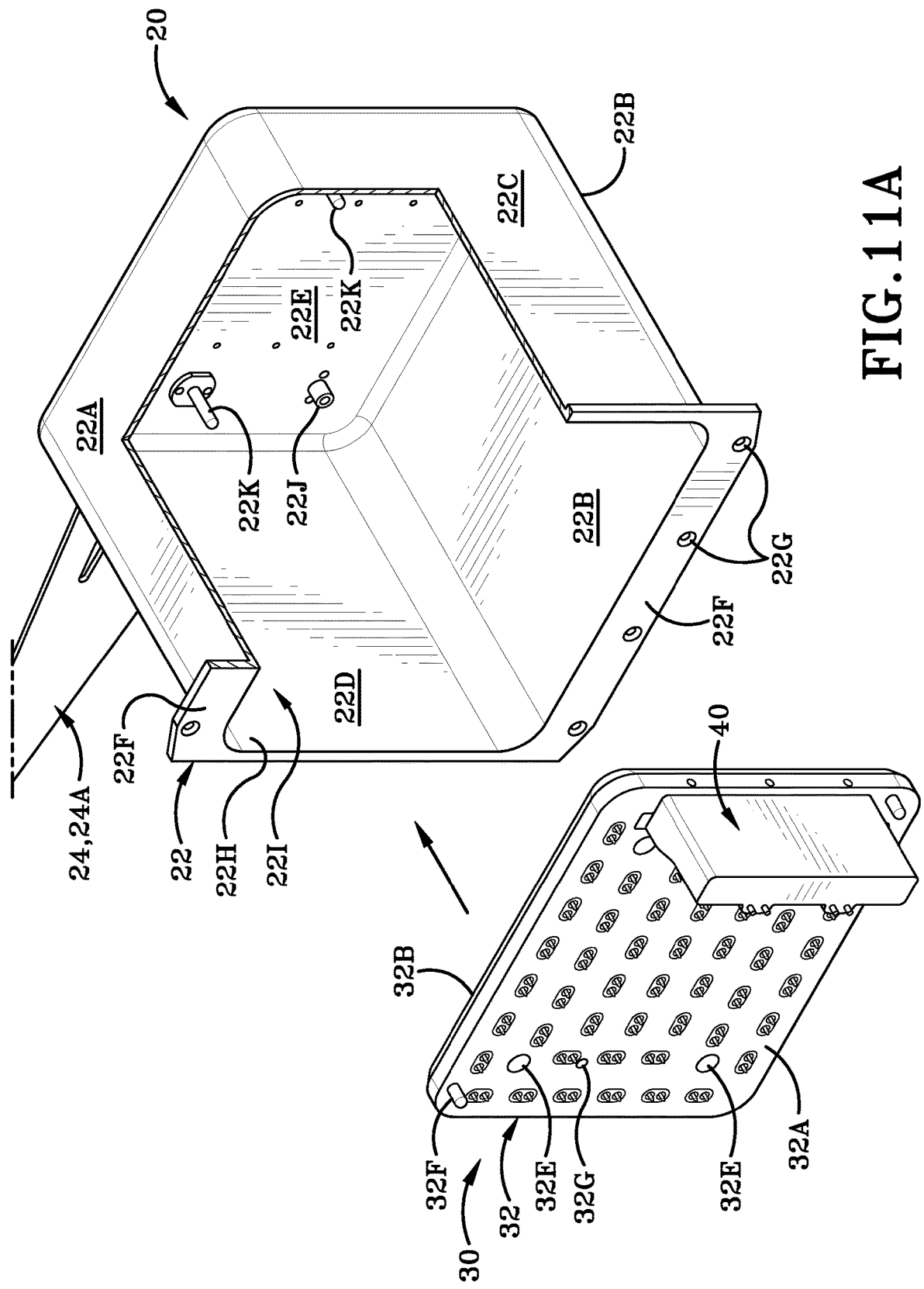
FIG. 11A is another operational view of CMDS, wherein the breechplate assembly and the controller assembly are loaded into the dispenser of the dispenser assembly.
Figure 11B:
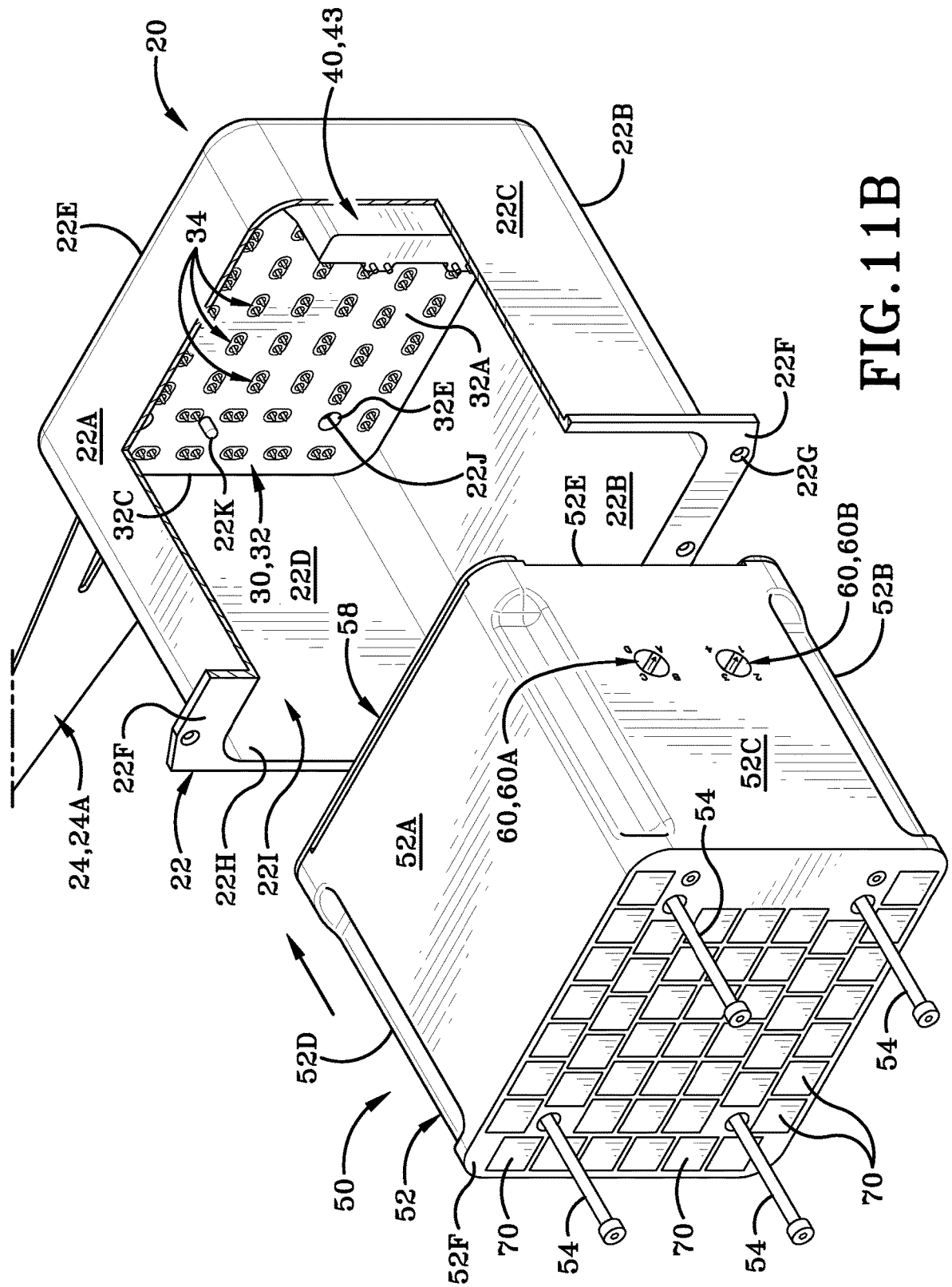
FIG. 11B is another operational view of CMDS, wherein the magazine assembly and the set of MISs are loaded into the dispenser of the dispenser assembly.

As illustrated in FIG. 11A, an operator of the CMDS 10 may begin to load the breechplate assembly 30, the controller assembly 40, and the magazine assembly 50 into the chamber 221 of the dispenser 22. First, the operator may load the breechplate assembly 30 and the controller assembly 40 into the chamber 221 of the dispenser 22. Once inside of the chamber 221, the operator may operably engage the connection socket 46 of the controller assembly 40 with the socket 24B of the dispenser 22. Such connection between the dispenser 22 and the controller assembly 40 enables the controller assembly 40 to communicate with a sequencer provided on the platform 1 via the A-Kit wiring 24. While not illustrated herein, the operator may then operably engage the breechplate assembly 30 with the dispenser 22 inside of the chamber 221 to maintain the breechplate assembly 30 inside of the dispenser 22.

Prior to loading the magazine assembly 50 into the dispenser 22 of the dispenser assembly 20, the magazine 52 is loaded with a set of countermeasure expendables 70 via the set of passageways 52G. Here, an operator of the CMDS 10 loads each countermeasure expendable of the set of countermeasure expendables 70 into the rear set of apertures 52H until each countermeasure expendable of the set of countermeasure expendables 70 is fully housed inside of a respective passageway of the set of passageways 52G. Once the set of countermeasure expendables 70 are loaded, the retaining plate 58 may be operably engaged with the rear wall 52E of the magazine 52 to prevent the set of countermeasure expendables 70 from falling out of the magazine 52 during loading stages.

Once the magazine 52 is loaded, the operator may then toggle each of the first MIS 60A and the second MIS 60B to a desired orientation for actuating the set of MIB 44. Such actuation of desired MIBs in the set of MIBs 44 enables the controller assembly 40 and a sequencer of the platform 1 to dispense specific and/or desired groups of countermeasure expendables of the set of countermeasure expendables 70 via the circuitry provided in the circuit card 42. In one instance, the operator may toggle and/or rotate the first MIS 60A to an orientation, via the knob 61 of the first MIS 60A, to prevent actuation and/or enable actuation of one or both of the first MIB 44A and the second MIB 44B. In another instance, the operator may also toggle and/or rotate the second MIS 60B to an orientation, via the knob 61 of the second MIS 60B, to prevent actuation and/or enable actuation of one or both of the third MIB 44C and the fourth MIB 44D. During this toggling operation, the operator may be assisted by the indicator 62C of the first MIS 60A and the first indicia 52R1 to correctly set the first MIS 60A to the desired orientation for preventing actuation and/or enabling actuation of the first MIB 44A and the second MIB 44B. Similarly, the operator may be assisted by the indicator 62C of the second MIS 60B and the second indicia 52R2 to correctly set the second MIS 60A to the desired orientation for preventing actuation and/or enabling actuation of the third MIB 44C and the fourth MIB 44D. Once the operator toggles and sets the first MIS 60A and the second MIS 60B to the desired orientation, the controller assembly 40 and the sequencer 80 will be enabled to dispense a specific group of countermeasure expendables from the set of countermeasure expendables 70.

Once the first MIS 60A and the second MIS 60B have been set by the operator, the operator may then introduce the magazine assembly 50 into the dispenser 22. As the magazine assembly 50 is introduced into the chamber 221 of the dispenser 22, the controller assembly 40 is passed into the side chamber 52J defined by the magazine 52 where the set of MIB 44 may or may not be actuated by the first MIS 60A and the second MIS 60B. The operator may keep inserting the magazine assembly 50 into the dispenser 22 until the rear surface 58B of the retaining plate 58 of the magazine assembly 50 is directly contacting the front surface 32A of the faceplate 32. Once the faceplate 32 and the retaining plate 58 directly contact one another, the operator may then operably engage both the breechplate assembly 30, the controller assembly 40, and the magazine assembly 50 with the dispenser 22 via the connectors 54. Here, the connectors 54 threadably engage with the set of standoffs 22J provided with the dispenser 22 and positioned inside of the chamber 221. Once the connectors 54 are operably engaged with the set of standoffs 22J, the breechplate assembly 30 and the magazine assembly 50 are operably engaged with the dispenser 22 in which the CMDS 10 is ready for military operation.

Upon completion of a military operation, an operator may remove the magazine assembly 50 from the dispenser 22 while leaving the breechplate assembly 30 and the controller assembly 40 inside of the dispenser 22. In this situation, the operator would threadably disengage the connectors 54 from the set of standoffs 22J until the magazine assembly 50 is disengaged from the dispenser 22. The magazine assembly 50 may then be removed from the dispenser 22 while the breechplate assembly 30 and the controller assembly 40 remain inside of the dispenser 22. The magazine assembly 50 may be removed for various reasons, including reloading the magazine 52 with additional countermeasure expendables for another military operation, repairing parts and/or components of the magazine assembly 50, and other various reasons of the like. In this situation, the original magazine assembly 50 or a new magazine assembly 50 may be reloaded into the dispenser 22 and operably engaged with the dispenser via the connectors 54.

In another exemplary embodiment, an operator of the CMDS 10 may also collectively load the breechplate assembly 30, the controller assembly 40, and the magazine assembly 50 into the chamber 22I of the dispenser 22 as a single unit as shown in FIG. 3A. First, the magazine 52 is loaded with the set of countermeasure expendables 70 by the operator inserting each countermeasure expendable of the set of countermeasure expendables 70 into the set of passageways 52G at the rear set of apertures 52H. Once the magazine 52 is loaded, the operator may then operably engage the retainer plate 58 with the magazine 54 to retain the set of countermeasure expendables 70 inside of the magazine 52.

In this exemplary embodiment, the operator may also toggle one or both of the first MIS 60A and the second MIS 60B to a desired orientation for actuating at least one or none of the first MIB 44A, second MIB 44B, third MIB 44C, and fourth MIB 44D; such toggling of one or both of the first MIS 60A and the second MIS 60B to a desired orientation for actuating at least one or none of the first MIB 44A, second MIB 44B, third MIB 44C, and fourth MIB 44D is described previously. Once the operator has toggled one or both of the first MIS 60A and the second MIS 60B to the desired orientation, the operator may then operably engage the remaining parts and components of the breechplate assembly 30 (i.e., faceplate 32, firing pin mechanism 34, rear cover plate 36) and the controller assembly 40 with the magazine 52. Once engaged, one or both of the first MIS 60A and the second MIS 60B may then actuate at least one or none of the first MIB 44A, second MIB 44B, third MIB 44C, and fourth MIB 44D. At this point, the operator may then collectively load the breechplate assembly 30, the controller assembly 40, and the magazine assembly 50 into the chamber 22I of the dispenser 22 as a single unit as shown in FIG. 3A.

To reload a new set of countermeasure expendables 70 into the magazine 52, the operator collectively removes the breechplate assembly 30, the controller assembly 40, and the magazine assembly 50 from the chamber 22I of the dispenser 22 as a single unit. In one instance, the operator performs the reverse steps of operation to operably disengage the breechplate assembly 30 and the controller assembly 40 from the magazines assembly 50 to load a new set of countermeasure expendables 70 into the magazine 52. In another instance, the operator may load a new breechplate assembly 30, a new controller assembly 40, and a new magazine assembly 50 loaded with a new set of countermeasure expendables 70 into the dispenser 22 that has been previously assembled based on the assembly steps described above.

FIGS. 12-17C illustrate another CMDS 100 that may operably engage with the platform 1 substantially similar to CMDS 10. CMDS 100 is similar to CMDS 10 described above and illustrated in FIGS. 2-11B, except as detailed below.

Figure 12:
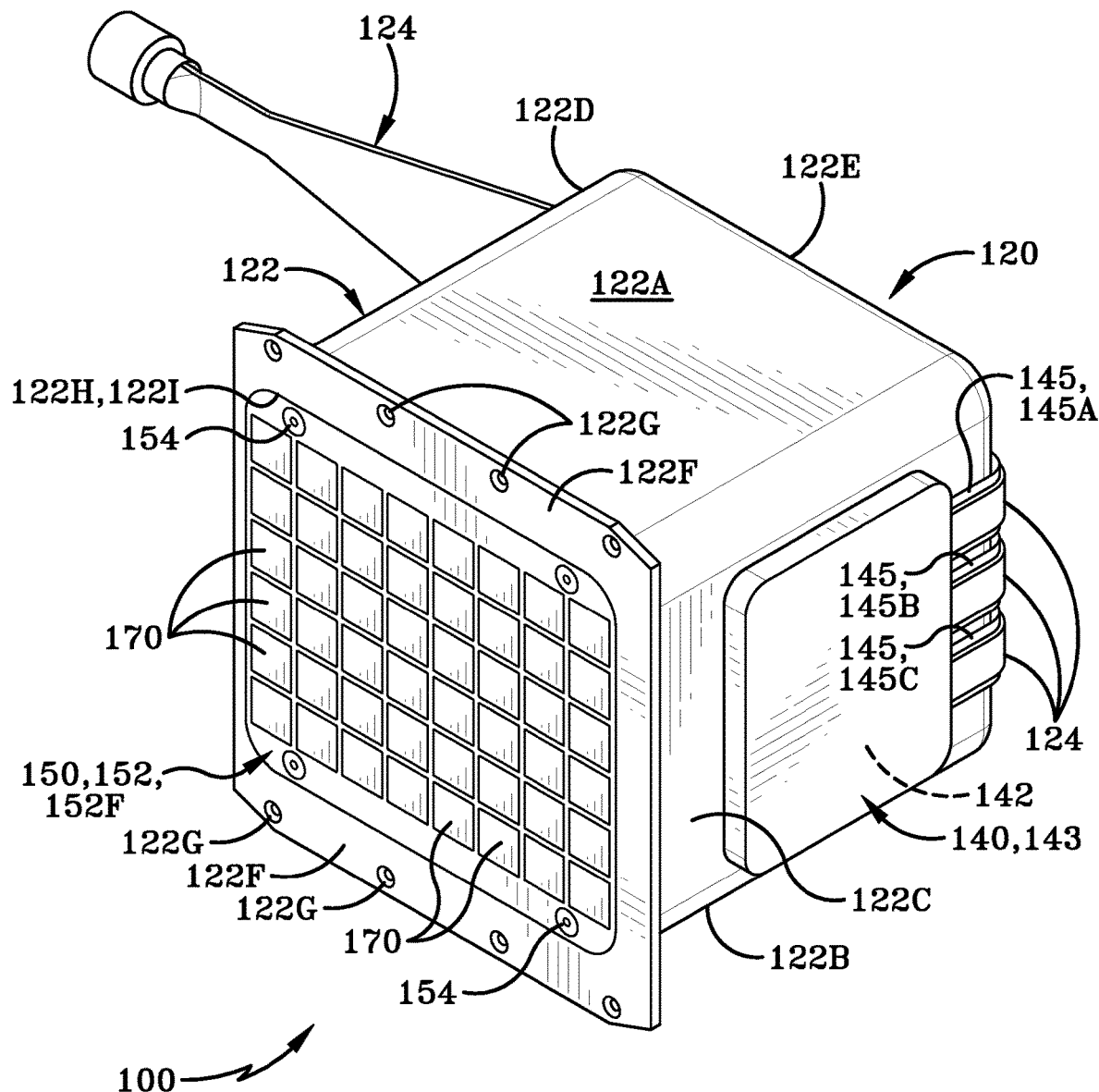
FIG. 12 is a front, top, first side isometric perspective view of another CMDS in accordance with the present disclosure.

Referring to FIG. 12, CMDS 100 includes a dispenser assembly 120 that operably engages with the platform 1. The dispenser assembly 120 includes a dispenser 122 that is similar to the dispenser 22 as described above, except as detailed below. The dispenser 122 includes a top wall 122A, a bottom wall 122B vertically opposite to the top wall 122A, and a vertical axis defined therebetween. The dispenser 122 also includes a pair of side walls (first side wall 122C and second side wall 122D) that are transversely opposite to the one another and define a transverse axis therebetween. The dispenser 122 also includes a rear wall 122E that is longitudinally behind the top wall 122A, the bottom wall 122B, the first side wall 122C, and the second side wall 122D, and a flange 122F that is longitudinally opposite to the rear wall 122E. As illustrated in FIG. 12, the flange 122F is also operably engaged with each of the top wall 122A, the bottom wall 122B, the first side wall 122C, and the second side wall 122D and extends away from top wall 122A, the bottom wall 122B, the first side wall 122C, and the second side wall 122D. The flange 122F also defines a set of front apertures 122G that extends entirely through the flange 122F. While not illustrated herein, the plurality of apertures 122G enables connectors (not illustrated) to operably engage the dispenser 122 with the aircraft 1 for maintaining the CMDS 100 with the aircraft 1.

Figure 17A:
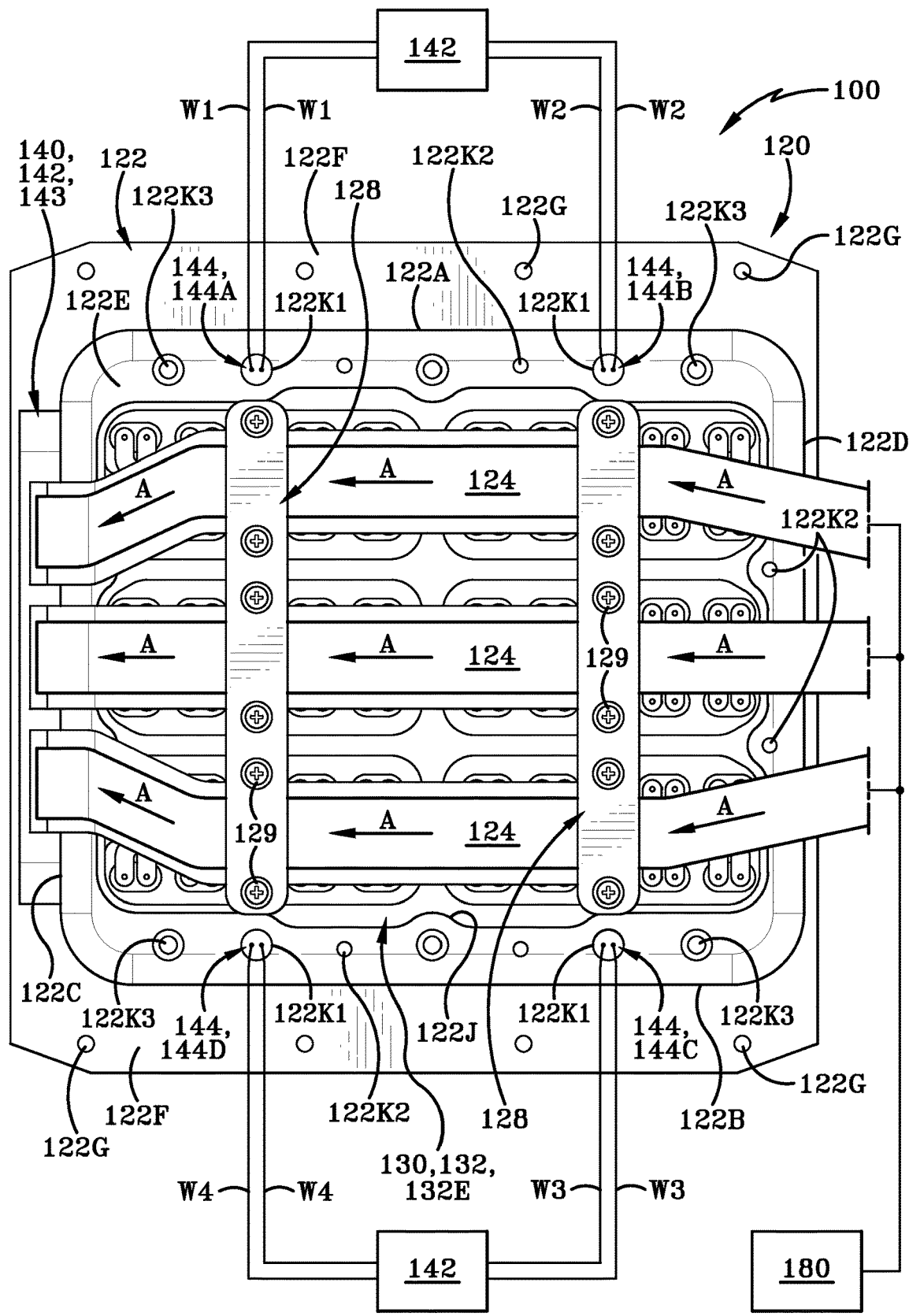
FIG. 17A is an operational view of a first signal outputted from a sequencer to a controller assembly of CMDS.

The dispenser 122 may also define a front opening 122H that is accesses into the passageway 122I where the passageway 122I extends entirely through the dispenser 122 between the rear wall 122E and the flange 122F. More particularly, each of the top wall 122A, the bottom wall 122B, the first side wall 122C, the second side wall 122D, and the rear wall 122E collectively define the passageway 122I. As best seen in FIG. 12, the passageway 122I is accessible via the front opening 122H collectively defined by each of the top wall 122A, the bottom wall 122B, the first side wall 122C, the second side wall 122D, the rear wall 122E proximate to the flange 122F. As best seen in FIG. 17A, the passageway 122I is also accessible via a rear opening 122J defined at the rear wall 122E of the dispenser 122.

The dispenser 122 may also define at least one set of rear apertures 122K in the rear wall 122E of the dispenser 122. As best seen in FIG. 17A, the dispenser 122 may define a first set of rear apertures 122K1 that extend entirely through the rear wall 122E in which the first set of rear apertures 122K1 is positioned proximate to the top wall 122A and the bottom wall 122B of the dispenser 122; such use and purpose of the first set of rear apertures 122K1 is described in more detail below. As best seen in FIG. 17A, the dispenser 122 may also define a second set of rear apertures 122K2 that extend entirely through the rear wall 122E in which the second set of rear apertures 122K2 is positioned proximate to the top wall 122A, the bottom wall 122B, the first side wall 122C, and the second side wall 122D of the dispenser 122; such use and purpose of the second set of rear apertures 122K2 is described in more detail below. As best seen in FIG. 17A, the dispenser 122 may also define a third set of rear apertures 122K3 that extend entirely through the rear wall 122E in which the third set of rear apertures 122K3 is positioned proximate to the top wall 122A and the bottom wall 122B of the dispenser 122; such use and purpose of the third set of rear apertures 122K3 is described in more detail below.

Referring to FIG. 12, the dispenser assembly 120 also includes a legacy A-Kit wiring harness 124 that is substantially similar to the A-Kit wiring 24 described above. As such, the A-Kit wiring harness 124 operably engages with a sequencer of the platform to electrically connect the CMDS 100 with the sequencer. Such communication between the CMDS 100 and a sequencer provided on the platform 1 is described in more detail below.

While not illustrated herein, the dispenser assembly 120 may also include a rear cover plate (not illustrated) operably engaged with the rear wall 122E of the dispenser 122. The rear cover plate is configured to cover the rear opening 122J of the dispenser 122 and prevent access into the passageway 122I at the rear opening 122J. The rear cover plate has been removed from the drawings for illustrative purposes and operational purposes, which are described in more detail below.

The dispenser assembly 120 may also include at least one retaining plates 128 that operably engages with one or both of the dispenser 122 and the rear cover plate. The dispenser assembly 120 includes two retaining plates 128 that are configured to retain and secure the A-Kit wiring harness 124 with the dispenser 122 at the rear wall 122E. The two retaining plates 128 may also be secured with connectors 129 that threadably engage with a set of terminal blocks provided in CMDS 100, which is described in more detail below.

Similar to CMDS 10, CMDS 100 also includes a breechplate assembly 130 that is configured similarly to the breechplate assembly 30, except as detail below. The breechplate assembly 130 includes a faceplate 132 that operably engages with the dispenser 122 inside of the passageway 122I. The faceplate 132 includes a front or first surface 132A, a rear or rear surface 132B opposite to the front surface 132A and facing away from the front surface 132A, and a circumferential wall 132C connecting the front surface 132A and the rear surface 132B.

Figure 16A:
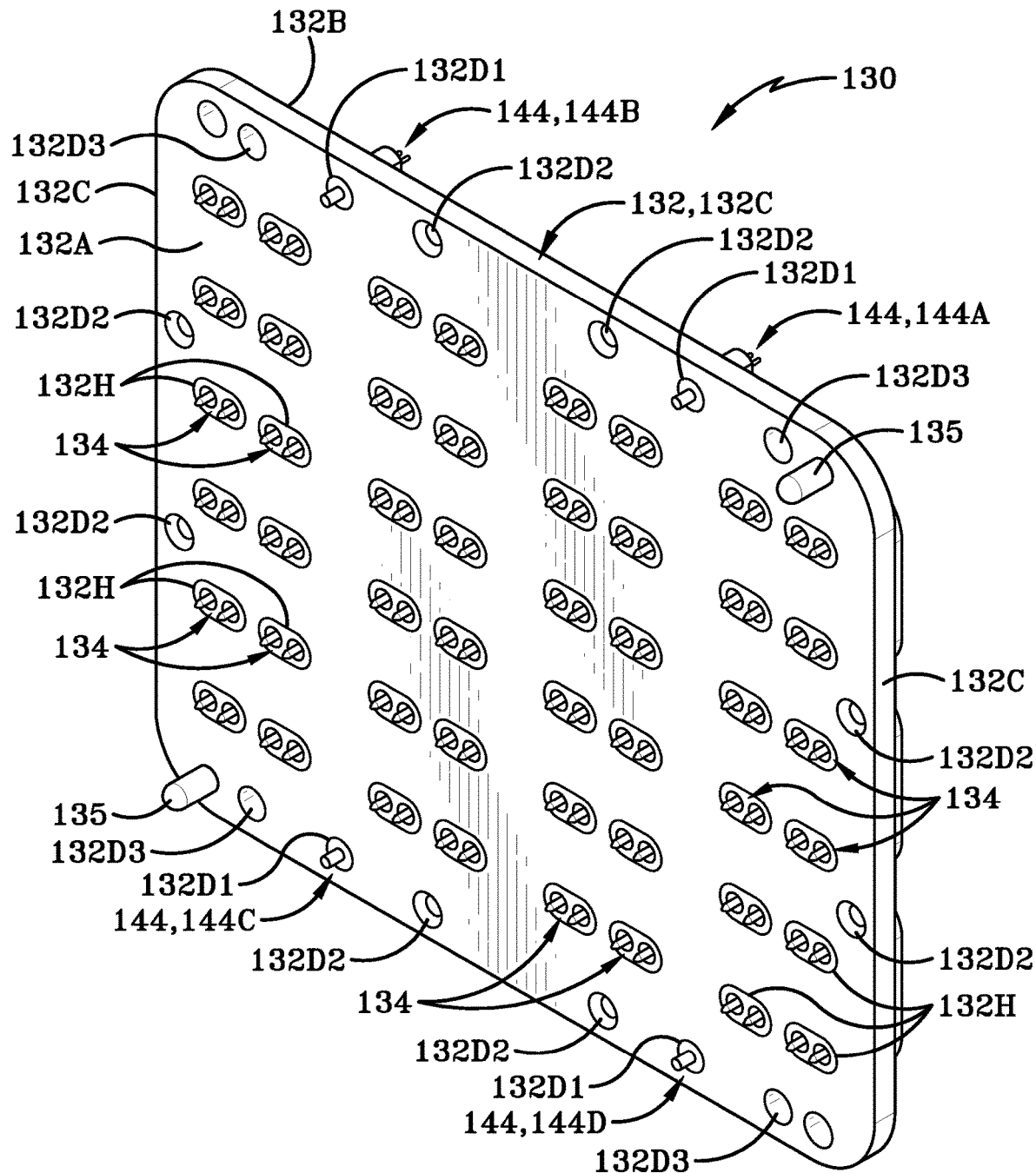
FIG. 16A is a front, top, first side isometric perspective view of the breechplate assembly of CMDS shown in FIG. 12, wherein a set of MIBs is operably engaged with the breechplate assembly.

Referring to FIG. 16A, the faceplate 132 also defines at least one set of attachment holes 132D that extends entirely through the faceplate 132 from the front surface 132A to the rear surface 132B in which the front surface 132A and the rear surface 132B are in fluid communication with one another. As best seen in FIG. 16A, the faceplate 132 defines a first set of attachment holes 132D1 that extends entirely through the faceplate 132 from the front surface 132A to the rear surface 132B in which the front surface 132A and the rear surface 132B are in fluid communication with one another. The first set of attachment holes 132D1 is aligned with the first set of rear apertures 122K1 defined in the dispenser 122 upon assembly of CMDS 100. The faceplate 132 also defines a second set of attachment holes 132D1 that extends entirely through the faceplate 132 from the front surface 132A to the rear surface 132B in which the front surface 132A and the rear surface 132B are in fluid communication with one another. The second set of attachment holes 132D2 is aligned with the second set of rear apertures 122K2 defined in the dispenser 122 upon assembly of CMDS 100. The faceplate 132 also defines a third set of attachment holes 132D3 that extends entirely through the faceplate 132 from the front surface 132A to the rear surface 132B in which the front surface 132A and the rear surface 132B are in fluid communication with one another. The third set of attachment holes 132D3 is aligned with the third set of rear apertures 122K3 defined in the dispenser 122 upon assembly of CMDS 100. Each of the first set of attachment holes 132D1, the second set of attachment holes 132D2, and the third set of attachment holes 132D3 is separate and spaced apart from one another on the faceplate 132. While not illustrated herein, fasteners (not illustrated) may be used to operably engage the faceplate 132, via the first set of attachment holes 132D, with the dispenser 122, via the second set of rear apertures 122K2.

Figure 16B:
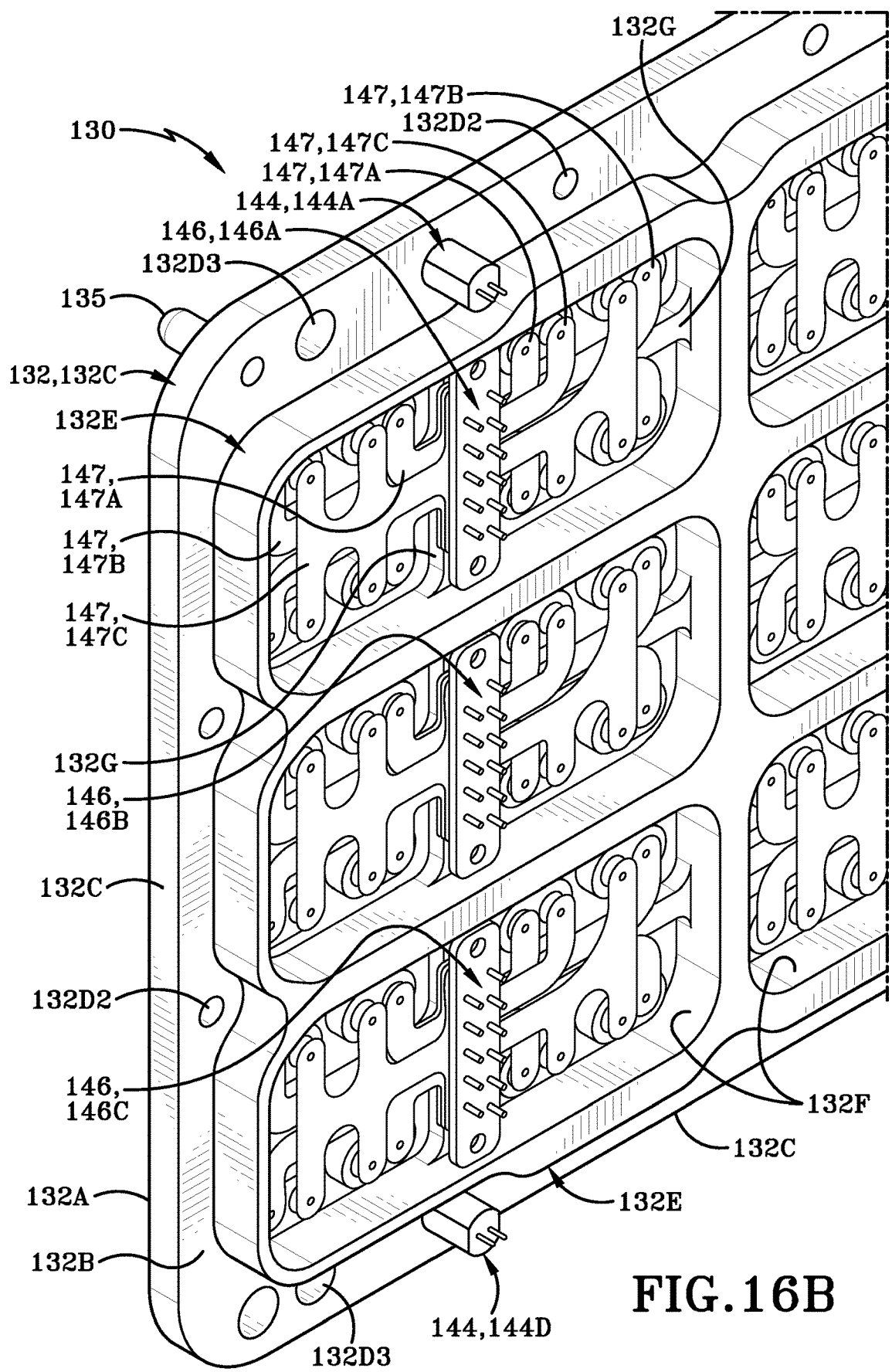
FIG. 16B is a partial rear, top, first side isometric perspective view of the breechplate assembly of CMDS shown in FIG. 12, wherein the set of MIBs is operably engaged with the breechplate assembly.

Referring to FIG. 16B, the faceplate 132 also has a set of upright walls 132E that operably engage with the rear surface 132B and extend upwardly away from the rear surface 132B. As illustrated, the set of upright walls 132E defines a set of cavities 132F where each cavity in the set of cavities 132F is oblong-shaped. As best seen in FIG. 16B, a pair of cross-members 132G is positioned inside each cavity of the set of cavities 132F where each pair of cross-members 132G engages with associated upright walls of the set of upright walls 132E defining the respective cavity of the set of cavities 132F. The pair of cross-members 132G also operably engages with the rear surface 132B and extend upwardly away from the rear surface 132B. The faceplate 132 also defines a set of through-holes 132H that extends entirely through the faceplate 132 from the front surface 132A to the rear surface 132B in which the front surface 132A and the rear surface 132B are in fluid communication with one another via the set of through-holes 132H (see FIG. 16A). In one example, at least four through-holes of the set of through-holes 132H are defined inside each cavity of the set of cavities 132F. Such use and purpose of the set of upright walls 132E, the set of cavities 132F, the pair of cross-members 132G positioned inside each cavity of the set of cavities 132F, and the set of through-holes 132H are described in more detail below.

Referring to FIGS. 16A-16B, the breechplate assembly 130 also includes a set of fire pin mechanisms 134 that operably engages with the faceplate 132, which are substantially similar to the fire pin mechanisms 34 of the breechplate assembly 30 described above. The set of fire pin mechanisms 134 is configured to operably engage with a set of countermeasure expendables once loaded into the CMDS 10, which is described in more detail below. The set of fire pin mechanisms 134 may be any suitable fire pin mechanisms 134 that are capable of initiating countermeasure expendables known in the art. In one exemplary embodiment, a set of fire pin mechanisms that may be used include fire pin mechanisms described in U.S. patent application Ser. No. 17/345,551. In the illustrated embodiment, each fire pin mechanism of the set of fire pin mechanism 134 is operably engaged with the faceplate 132 via the set of through-holes 132H positioned inside the set of cavities 132F.

Referring to FIGS. 12 and 16B-17C, CMDS 100 also includes a controller assembly or embedded fire select multiplexer (EFSM) 140 that operably engages with the dispenser assembly 120 and the breechplate assembly 130 substantially similar to the controller assembly 40 presented in CMDS 10, except as detailed below. Such components and parts that make up the controller assembly 40 are described in greater detail below.

In the illustrated embodiment, the controller assembly 140 includes a circuit card or board 142 that is protected by a cover 143 operably engaged with the first side wall 122C of the dispenser 122 exterior to the passageway 122I. The circuit card 142 also electrically connects with each firing pin mechanism of the set of fire pin mechanisms 134; such electrical connections between the circuit card and the set of fire pin mechanisms 134 are described in more detail below. In this embodiment, however, the controller assembly 140 operably engages with the first side wall 122C of the dispenser 122 exterior to the passageway 122I and electrically connects with each firing pin mechanism of the set of fire pin mechanism 134.

Similar to the combination of the firing pin mechanisms 34 along with the circuitry of the circuit card 42 of the controller assembly 40 described above, the combination of the firing pin mechanism 134 along with the circuitry of the circuit card 142 of the controller assembly 140 also expands the number of countermeasure expendables from thirty countermeasure expendables in legacy CMDSs (e.g., AN/ALE-47 systems) up to forty-eight countermeasure expendables while using legacy hardware and components (i.e., the A-Kit wiring harness 124 of the dispenser assembly 120 and legacy on-board countermeasure systems provided on the platform 1). In one example, the circuit card 142 may be substantially similar to the circuit card described and illustrated in U.S. patent application Ser. No. 17/345,551 for expanding the number of countermeasure expendables from thirty countermeasure expendables in legacy CMDSs (e.g., AN/ALE-47 systems) up to forty-eight countermeasure expendables while using legacy hardware and components. In this example, the controller assembly 140 may include substantially similar electrical components and devices needed to expand the number of countermeasure expendables from thirty countermeasure expendables in legacy CMDSs (e.g., AN/ALE-47 systems) up to at least forty-eight countermeasure expendables while using legacy hardware and components. In another example, any suitable controller assembly and/or EFSM may be used herein to expand the number of countermeasure expendables from thirty countermeasure expendables in legacy CMDSs (e.g., AN/ALE-47 systems) up to forty-eight countermeasure expendables while using legacy hardware and components.

Referring to FIGS. 16A-16B, the controller assembly 140 may also include at least one set of magazine identification switches (hereinafter "MIBs") generally referred to as 144 that operably engages with the circuit card 142. The at least one set of MIBs 144 may also be operably engaged with a sequencer provided on the platform 1 for communicating with the sequencer upon operation. As illustrated, the controller assembly 40 includes a single set of MIBs 144 having a first MIB 144A, a second MIB 44B, a third MIB 144C, and a fourth MIB 144D operably engaged with circuit card 142 and a sequencer provided on the platform 1. As illustrated, the first MIB 144A and the second MIB 144B are grouped with one another and are operably engaged with the rear wall 122E of the dispenser 122 via two rear apertures of the set of first rear apertures 122K1 defined proximate to the top wall 122A. Similarly, the third MIB 44C and the fourth MIB 44D are also grouped with one another and are operably engaged with the rear wall 122E of the dispenser 122 via another two rear apertures of the set of first rear apertures 122K1 defined proximate to the bottom wall 122B. In the illustrated embodiment, the first MIB 144A and the second MIB 144B are positioned vertically above the third MIB 144C and the fourth MIB 144D. During operation, each of the first MIB 144A, the second MIB 144B, the third MIB 144C, and the fourth MIB 144D may be actuated separately and independent from one another by components provided in the CMDS 100, which is described in more detail below.

Referring to FIG. 17A, the set of MIBS 144 may be electrically connected with the circuit board 142 of the controller assembly 140 along with a sequencer 180 for operation purposes, which are described in more detail below. As illustrated, a first set of wires W1 may operably engage the first MIB 144A with the circuit board 142, a second set of wire W2 may operably engage the second MIB 144B with the circuit board 142, a third set of wires W3 may operably engage the third MIB 144C with the circuit board 142, and a fourth set of wires W4 may operably engage the fourth MIB 144D with the circuit board 142. As described in more detail below, each of the first MIB 144A, the second MIB 144B, the third MIB 144C, and the fourth MIB 144D may also output a signal to the circuit board 142 when any one of the first MIB 144A, the second MIB 144B, the third MIB 144C, and the fourth MIB 144D is actuated upon a loading operation. Additionally, each of the first MIB 144A, the second MIB 144B, the third MIB 144C, and the fourth MIB 144D may also output a signal to the sequencer 180 in operation, via the controller assembly 140, to enable the sequencer 180 read the position of each of the MIB 144A, 144B, 144C, 144D and identify the loadout of the magazine 150.

Figure 17B:
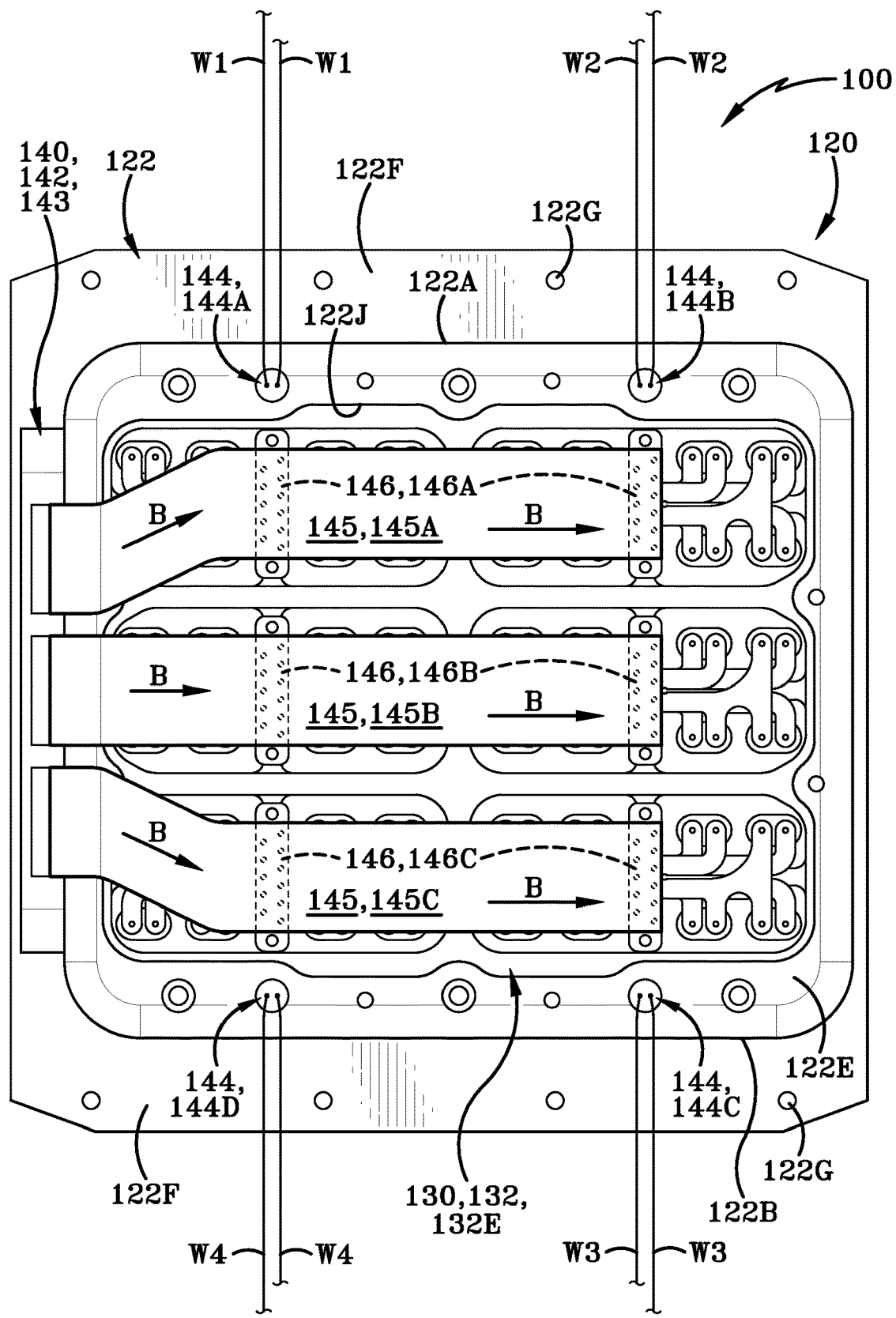
FIG. 17B is an operational view similar to FIG. 17A, but a second signal is outputted from the controller assembly to a set of terminal blocks of the breechplate assembly.

Referring to FIGS. 17A-17B, the controller assembly 140 also includes a set of first electrical connections 145 that operatively connects the circuit card 142 with a set of terminal blocks 146. In the illustrated embodiment, a first electrical connection 145A of the set of first electrical connections 145 electrically connects with a first pair of terminal blocks 146A of the set of terminal blocks 146. A second electrical connection 145B of the set of first electrical connections 145 also electrically connects with a second pair of terminal blocks 146B of the set of terminal blocks 146. A third electrical connection 145C of the set of first electrical connections 145 also electrically connects with a third pair of terminal blocks 146C of the set of terminal blocks 146. As described in more detail below, the electrical connection between the set of first electrical connections 145 and the set of terminal blocks 146 enables the circuit card 142 to transmits and/or output commands to specific fire pin mechanisms of the set of fire pin mechanisms 134 during military operations, which are described in more detail below.

Referring to FIG. 17A, the set of terminal blocks 146 are configured to threadably engage with the connectors 129 in order to operably engage the retaining plates 128 and the A-Kit wiring 124 with the set of terminal blocks 146. As illustrated, a first retaining plate 128 may be operably engaged with one terminal block from each of the first pair of terminal blocks 146A, the second pair of terminal blocks 146B, and the third pair of terminal blocks 146C via the connectors 129. Similarly, a second retaining plate 128 may be operably engaged with the other terminal block from each of the first pair of terminal blocks 146A, the second pair of terminal blocks 146B, and the third pair of terminal blocks 146C via the connectors 129.

Referring to FIGS. 16B and 17C, the controller assembly 140 also includes a set of second electrical connections 147 that operatively connects at least one terminal block of the set of terminal blocks 146 with a selected number of fire pin mechanism from the set of fire pin mechanisms 134. As best seen in FIG. 17C, an inside group of electrical connections 147A of the second set of electrical connection 147 operatively connect a first terminal block 146A1 of the first pair of terminal blocks 146A with a first group of fire pin mechanisms from the set of fire pin mechanisms 134. Similarly, an outside group of electrical connections 147B of the second set of electrical connection 147 operatively connects the first terminal block 146A1 of the first pair of terminal blocks 146A with a second group of fire pin mechanisms from the set of fire pin mechanisms 134. Similarly, a ground group of electrical connections 147C of the second set of electrical connection 147 operatively connects the first terminal block 146A1 of the first pair of terminal blocks 146A with a third group of fire pin mechanisms from the set of fire pin mechanisms 134. Such electrical connections between the set of second electrical connections 147 and the first terminal block 146A1 enables the circuit card 142 to output commands and/or signals to these fire pin mechanisms 134 for dispensing countermeasure material from selected countermeasure expendables. These electrical connections are also provided with a second terminal block 146A2 of the first pair of terminal blocks 146A along with the second pair of terminal blocks 146B and the third pair of terminal blocks 146C to enable the circuit card 142 to output commands and/or signals to these fire pin mechanisms 134 for dispensing countermeasure material from selected countermeasure expendables.

As illustrated in FIGS. 17A-17C, the breechplate assembly 130 and the controller assembly 140 may be operably engaged with the dispenser 122 of the dispenser assembly 120. Per this structural configuration, the breechplate assembly 130 and the controller 140 would remain operably engaged and/or fixed with the dispenser 122 during loading and reloading operations of CMDS 100, which is described in more detail below. In certain instance, the breechplate assembly 130 and the controller assembly 140 may only be removed from the dispenser 122 by an operator when parts or components of the breechplate assembly 130 and/or the controller assembly 140 need repaired or replaced. As such, the breechplate assembly 130 and the controller assembly 140 are semi-permanently engaged with the dispenser 122 to enable the operator to only remove a magazine assembly of CMDS 100 during reloading operations, which is described in more detail below.

Referring to FIG. 13-15C, CMDS 100 also includes a magazine assembly 150 that operably engages with the dispenser assembly 120 and the breechplate assembly 130. Once assembled, the magazine assembly 150 operably engages with the dispenser 122 and the breechplate assembly 130 and housed inside of the passageway 122I between the front opening 122I and the rear opening 122J. Such components and parts that make up the magazine assembly 50 are described in more detail below.

Figure 13:
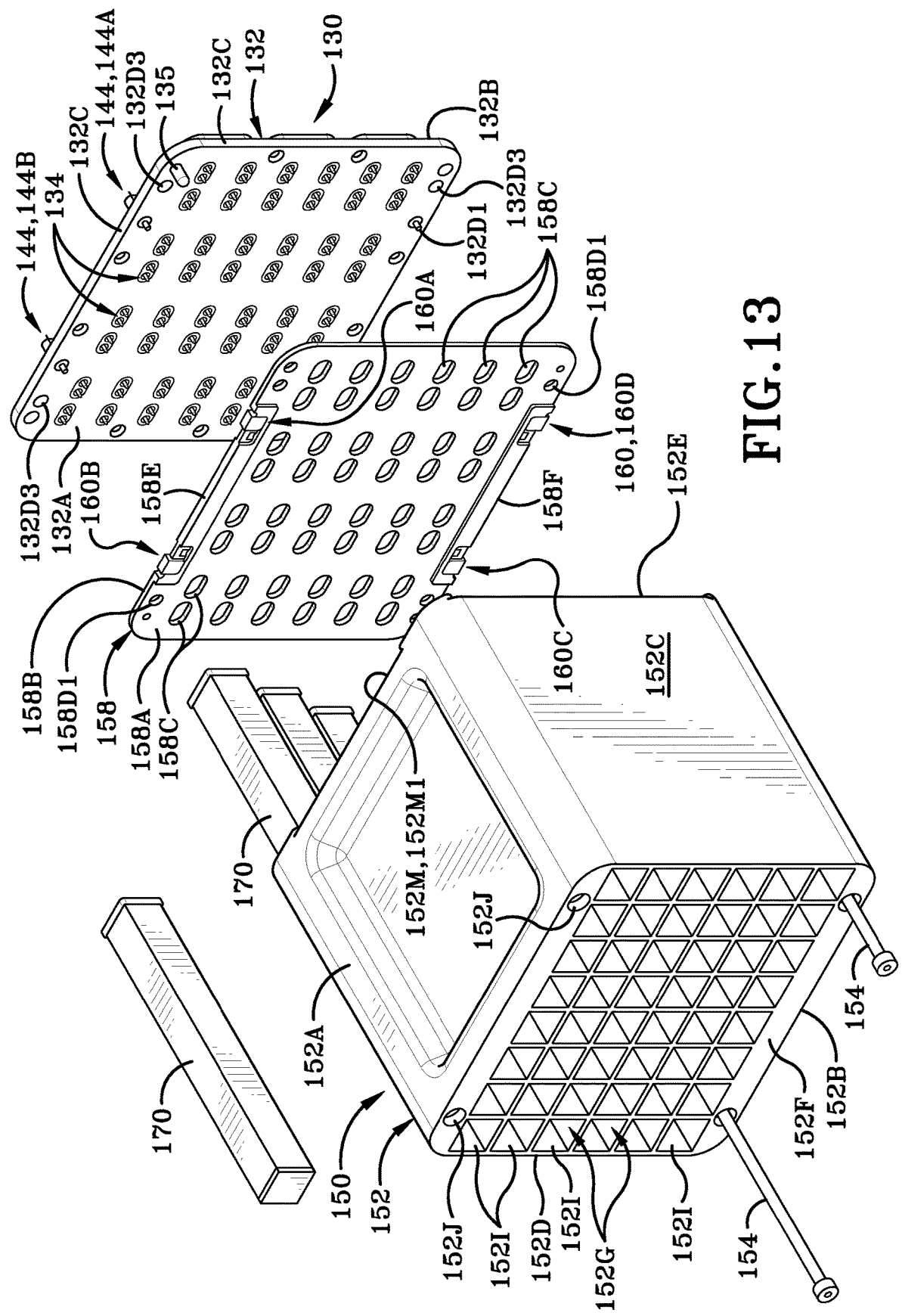
FIG. 13 is an exploded view of a breechplate assembly and a magazine assembly of CMDS shown in FIG. 12.

Referring to FIG. 13, the magazine assembly 150 includes a magazine 152. The magazine 152 includes a top wall 152A, a bottom wall 152B vertically opposite to the top wall 152A, and a vertical axis defined therebetween. The magazine 152 also includes a first side wall 152C positioned between the top wall 152A and the bottom wall 152B, a second side wall 152D positioned between the top wall 152A and the bottom wall 152B and transversely opposite to the first side wall 152C, and a transverse axis defined therebetween. The magazine 152 also includes a rear wall 152E that is longitudinally behind the top wall 152A, the bottom wall 152B, the first side wall 152C, and the second side wall 152D, a front wall 152F that is longitudinally ahead of the top wall 152A, the bottom wall 152B, the first side wall 152C, and the second side wall 152D and longitudinally opposite to the rear wall 52E, and a longitudinal axis defined therebetween.

Still referring to FIG. 13, the magazine 152 defines a set of passageways 152G that extends longitudinally between the rear wall 152E and the front wall 152F. As such, the rear wall 152E of the magazine 152 and the front wall 152F of the magazine 152 are in fluid communication with one another at each passageway of the set of passageways 152G. In the illustrated embodiment, the magazine 152 defines forty-eight passageways 152G to load and house forty-eight countermeasure expendables for CMDS 100. As described above, the breechplate assembly 130 and the controller assembly 140 enables CMDS 100 to accommodate and dispense forty-eight countermeasure expendables as compared to thirty countermeasure expendables currently allowed in conventional AN/ALE-47 CMDS. The set of passageways 152G are accessible via a rear set of apertures 152H defined at the rear wall 152E of the magazine 152 (see FIG. 14) and a front set of apertures 152I defined at the front wall 152F of the magazine 152. During operation, an operator is enabled to load each countermeasure expendable into the set of passageways 152G at the rear set of apertures 152H while the front set of apertures 152I enables each countermeasure expendable to dispense countermeasure material (e.g., flare material, chaff material, and other countermeasure material of the like) from the magazine 152.

Referring to FIG. 13, the magazine 152 may define a set of attachment mounts 152J that extends longitudinally between the rear wall 152E and the front wall 152F. Each attachment mount of the set of attachment mounts 152J is positioned outside of the set of passageways 152G to align with the third set of rear apertures 122K3 of the dispenser 122 for engagement purposes, which is described in more detail below. The magazine 152 may also define a set of rear alignment holes 152K that extend forwardly from the rear wall 152E towards the front wall 152F (see FIG. 14). The set of rear alignment holes 152K enables connectors (not illustrated) of the breechplate assembly 130 to pass into the set of rear alignment holes 152K to centrally align the magazine 152 with the faceplate 132 of the breechplate assembly 130. As such, the alignment pins 135 operably engage with the magazine 152 inside of the set of rear alignment holes 152K.

Referring to FIG. 14, the magazine 152 may also define at least one recessed portion 152M that extends longitudinally into the magazine 152 from the rear wall 152E towards the front wall 152F. In the illustrated embodiment, the magazine 152 may define a first recessed portion 152M1 that extends longitudinally into the magazine 152 from the rear wall 152E towards the front wall 152F. The first recessed portion 152M1 is also defined at the top wall 152A vertically above the set of passageways 152G. The magazine 152 may also define a second recessed portion 152M2 that extends longitudinally into the magazine 152 from the rear wall 152E towards the front wall 152F. The second recessed portion 152M2 is also defined at the bottom wall 152B vertically below the set of passageways 152G and vertically below the first recessed portion 152M1. Such uses and purposes of the first recessed portion 152M1 and the second recessed portion 152M2 are described in more detail below.

Referring to FIG. 13, the magazine assembly 150 may also include a set of connectors 154 that operably engages the magazine 152 with the dispenser 122 and the faceplate 132 of the breechplate assembly 130. In the illustrated embodiment, the set of connectors 154 operably engages the magazine 152, via the set of attachment mounts 152J, with the breechplate assembly 130, via the third set of attachment openings 132D3 defined in the faceplate 132, and the third set of rear apertures 122K3 defined in the dispenser 122. As such, the set of connectors 154 operably engages the magazine 152 with the dispenser 122, via the third set of rear apertures 122K3, to releasably secure the magazine assembly 150 with the breechplate assembly 130 and the dispenser 122 inside of the passageway 122I.

Referring to FIGS. 13 and 15A-15C, the magazine assembly 150 may also include a retaining plate 158 that operably engages with the rear wall 152E of the magazine 152. The retaining plate 158 includes a front surface 158A facing the rear wall 152E of the magazine 152, a rear surface 158B facing towards the rear opening 122J of the dispenser 122 and facing in an opposite direction of the front surface 158A. The retaining plate 158 defines a set of fire pin mechanism holes 158C extending entirely through the retaining plate 158 from the front surface 158A to the rear surface 158B. Upon assembly of CMDS 100, the set of fire pin mechanism holes 158C defined in the retaining plate 158 is coaxial with the set of through-holes 132H of the faceplate 132 to enable the set of firing pin mechanisms 134 to operably engage with primers of countermeasure expendables loaded in the magazine 152.

Referring to FIGS. 13 and 15A-15C, the retaining plate 158 also defines a first set of through-holes 158D1 and a second set of through-holes 158D extending entirely through the retaining plate 158 from the front surface 158A to the rear surface 158B in which the first set of through-holes 158D1 and the second set of through-holes 158D are separate and spaced apart from one another. The first set of through-holes 158D1 aligns with the attachment mounts 152J of the magazine 152, the third set of attachment openings 132D3 defined in the faceplate 132, and third set of rear apertures 122K3 defined in the dispenser 122. Such alignment enables the connectors 154 to pass through retaining plate 158 to operably engage the magazine assembly 150 and the breechplate assembly 130 with the dispenser 122. The second set of through-holes 158D2 is aligned with the rear alignment holes 152K of the magazine 152 and configured to enable alignment pins 135 to pass through the retaining plate 158 to operably engage with the magazine 152.

Figure 15A:
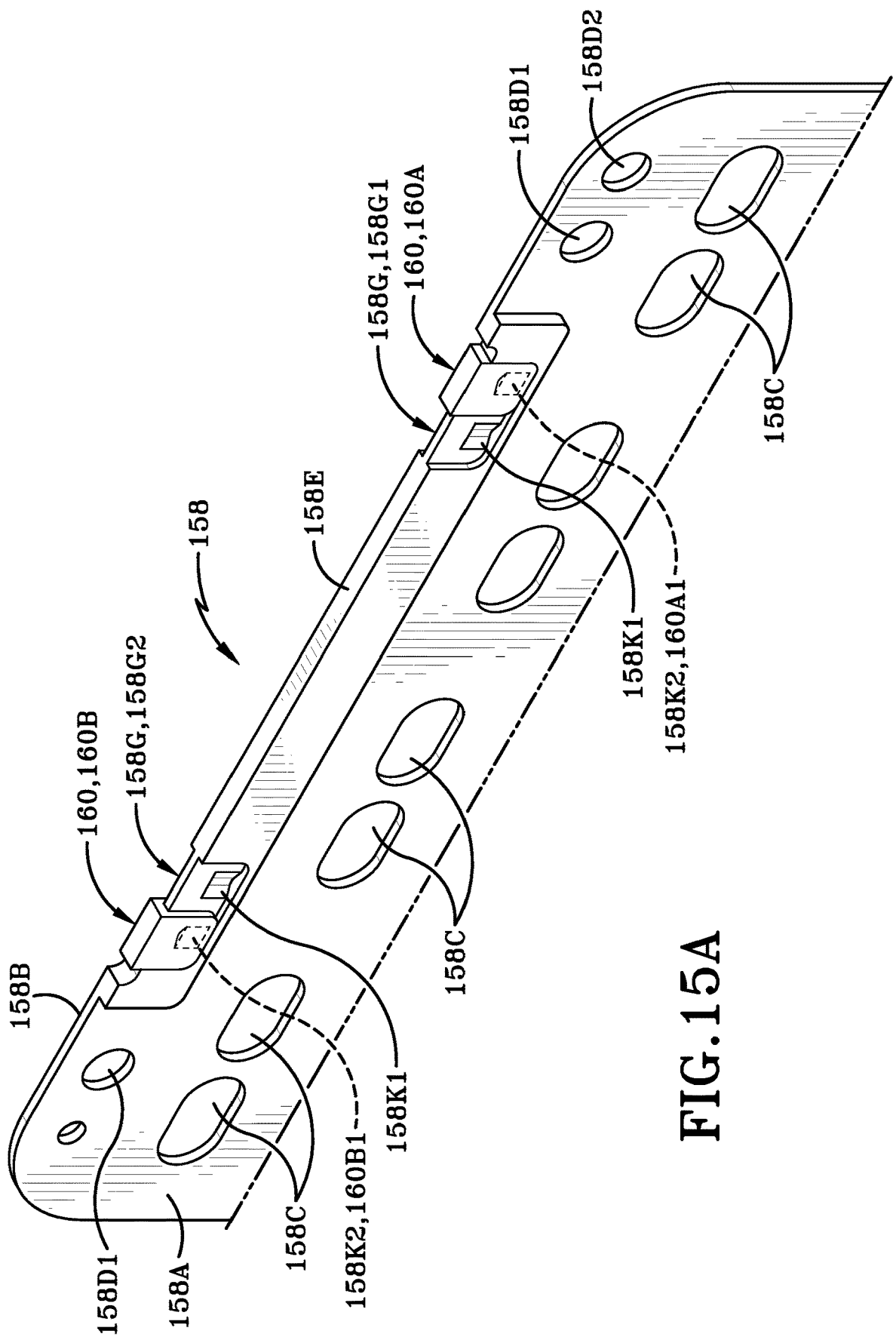
FIG. 15A is a partial front, top, first side isometric perspective view of a retaining plate of the magazine assembly of CMDS shown in FIG. 12, wherein two MISs of a set of MISs of CMDS are provided in a first position relative to the retaining plate.
Figure 15B:
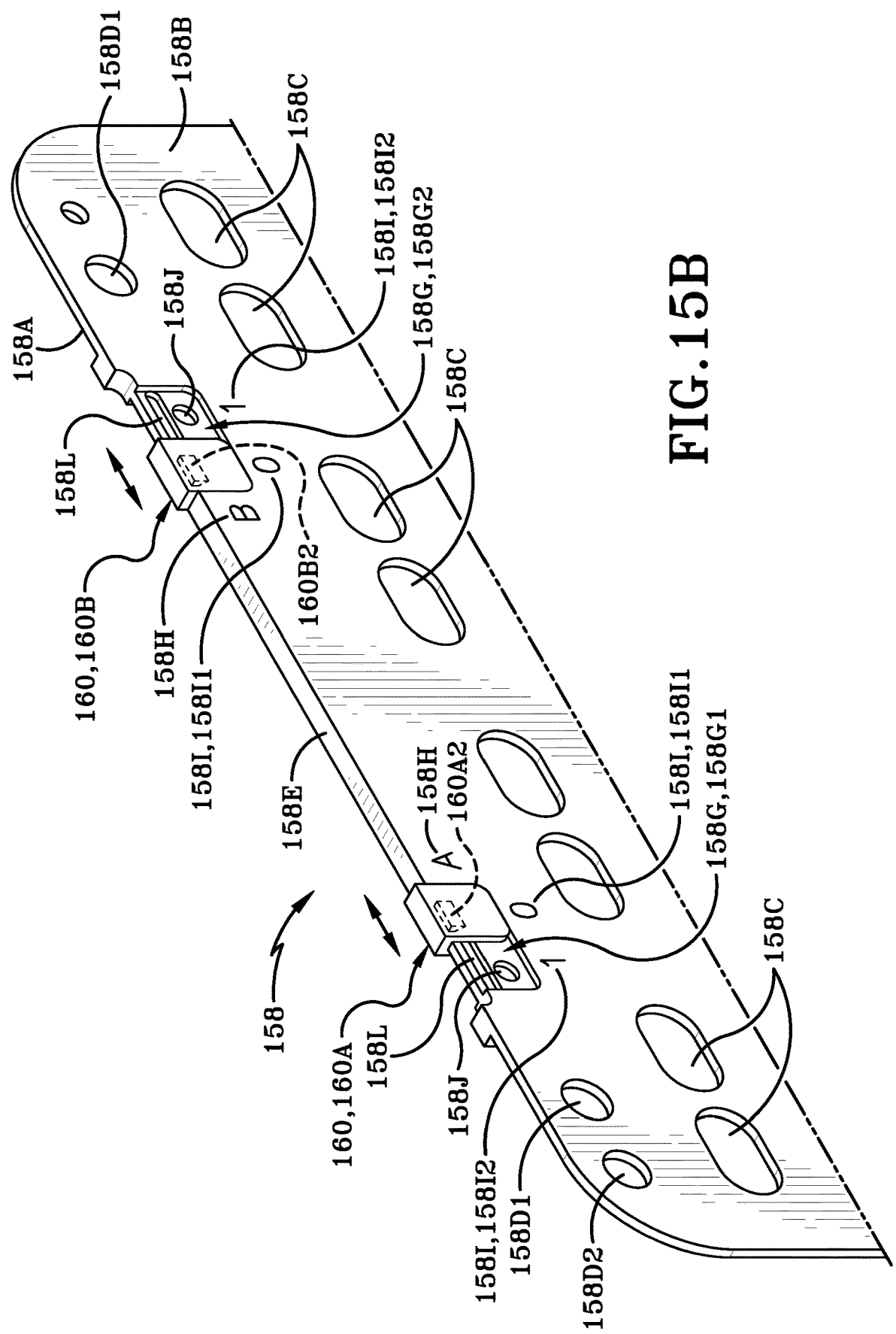
FIG. 15B is a partial rear, top, first side isometric perspective view of the retaining plate of the magazine assembly of CMDS shown in FIG. 12, wherein the two MISs of the set of MIS of CMDS are provided in a second position relative to the retaining plate.
Figure 15C:
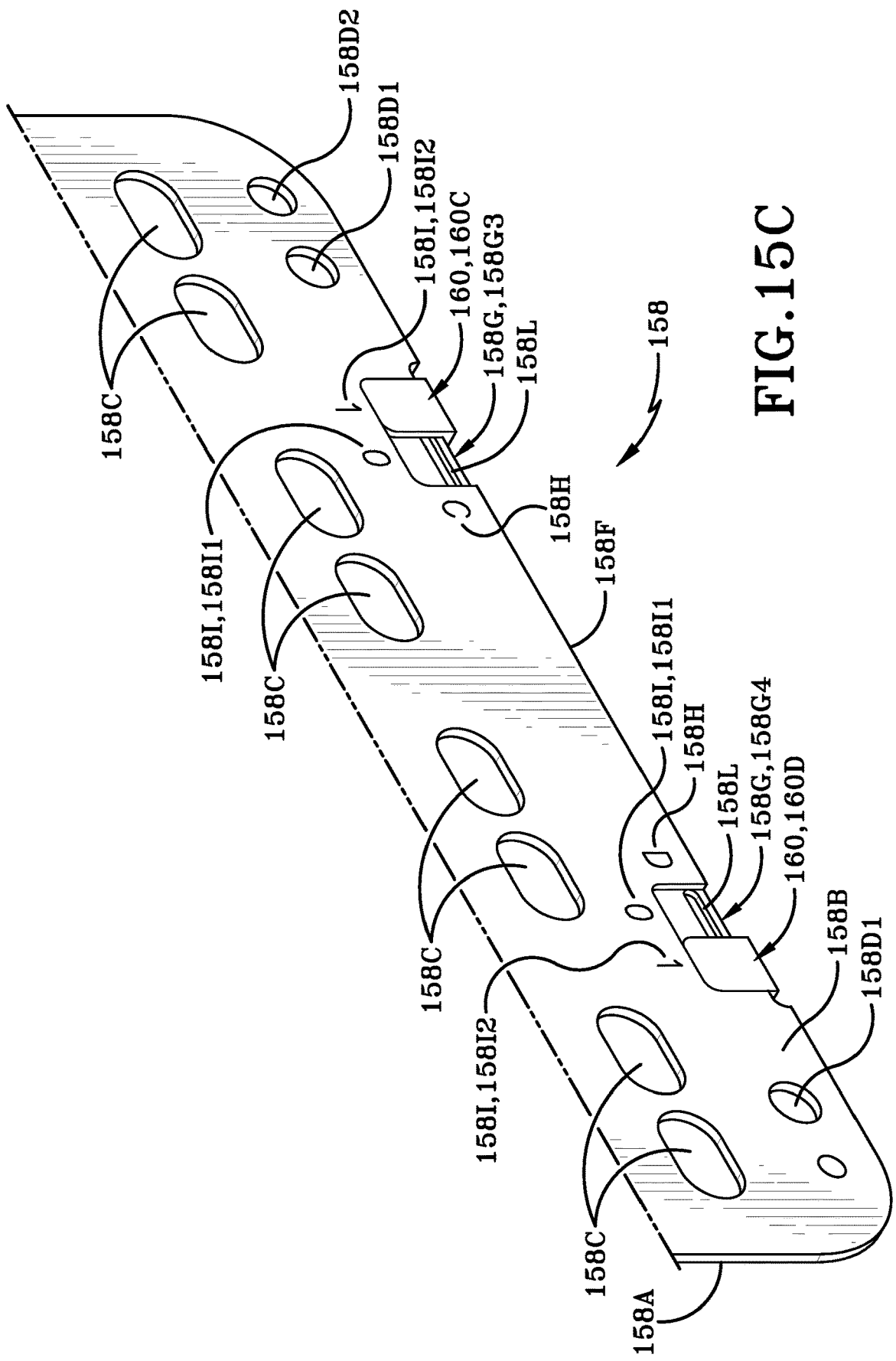
FIG. 15C is a partial rear, bottom, first side isometric perspective view of the retaining plate of the magazine assembly of CMDS shown in FIG. 12, wherein another two MISs of the set of MISs of CMDS are provide in a first position relative to the retaining plate.

Referring to FIGS. 15A and 15B the retaining plate 158 also includes an upper edge 158E that is positioned between the front surface 158A and the rear surface 158B. Referring to FIG. 15C, the retaining plate 158 also includes a lower edge 158F that is positioned between the front surface 158A and the rear surface 158B and positioned vertically opposite to the upper edge 158E. The retaining plate 158 also defines a set of slotted portions 158G that is defined at one or both of the upper edge 158E and the lower edge 158F. As best seen in FIG. 15A, the retaining plate 158 defines a first slotted portion 158G1 of the set of slotted portions 158G at the upper edge 158E of the retaining plate 158. As best seen in FIG. 15A, the retaining plate 158 also defines a second slotted portion 158G2 of the set of slotted portions 158G at the upper edge 158E of the retaining plate 158 adjacent to the first slotted portion 158G1. In the illustrated embodiment, the first slotted portion 158G1 and the second slotted portion 158G2 are aligned with one another along the upper edge 158E of the retaining plate 158. Similarly, the retaining plate 158 defines a third slotted portion 158G3 of the set of slotted portions 158G at the lower edge 158F of the retaining plate 158 (see FIG. 15C). The retaining plate 158 also defines a four slotted portion 158G4 of the set of slotted portions 158G at the lower edge 158F of the retaining plate 158 adjacent to the third slotted portion 158G3 (see FIG. 15C). In the illustrated embodiment, the third slotted portion 158G3 and the fourth slotted portion 158G4 are aligned with one another along the lower edge 158F of the retaining plate 158. Additionally, the first slotted portion 158G1 may be positioned directly above the fourth slotted portion 158G4, and the second slotted portion 158G2 may be positioned directly above the third slotted portion 158G3.

Still referring to FIGS. 15A-15C, the retaining plate 158 may also include switch indicia 158H positioned at each of the first slotted portion 158G1, the second slotted portion 158G2, the third slotted portion 158G3, and the fourth slotted portion 158G4 on the rear surface 158B of the retaining plate 158. The switch indicia 158H specifically labels and identifies each of the first slotted portion 158G1, the second slotted portion 158G2, the third slotted portion 158G3, and the fourth slotted portion 158G4 that is considered useful during loading operations, which is described in more detail below. Still referring to FIGS. 15A-15C, the retaining plate 158 also includes position indicia 158I at each of the first slotted portion 158G1, the second slotted portion 158G2, the third slotted portion 158G3, and the fourth slotted portion 158G4. Each position indicia 158I indicates a first position marking 158I1 and a second position marking 158I2 to accurately position a magazine identification switch on the retaining plate 158, which is described in more detail below.

Referring to FIG. 15B, the retaining plate 158 defines at least one opening 158J inside each of the first slotted portion 158G1, the second slotted portion 158G2, the third slotted portion 158G3, and the fourth slotted portion 158G4. Each opening 158J that is positioned inside each of the first slotted portion 158G1, the second slotted portion 158G2, the third slotted portion 158G3, and the fourth slotted portion 158G4 is also aligned with the first position marking 158I1 of the position indicia 158I for loading purposes, which is also described in more detail below. Upon assembly of the CMDS 100, pins of the set of MIBs 144 pass through the openings 158J defined in the first slotted portion 158G1, the second slotted portion 158G2, the third slotted portion 158G3, and the fourth slotted portion 158G4 to enable actuation of the first MIB 144A, the second MIB 144B, the third MIB 144C, and/or the fourth MIB 144D by a set of magazine identification switches of CMDS 100; such actuation of the set of MIBs 144 is described in more detail below.

Referring to FIG. 15A, the retaining plate 158 defines a pair of depressions 158K inside each of the first slotted portion 158G1, the second slotted portion 158G2, the third slotted portion 158G3, and the fourth slotted portion 158G4. Each depression of the pair of depressions 158K also extends rearwardly into the retaining plate 158 from the front surface 158A towards the rear surface 158B. As best seen in FIG. 15A, a first depression of each pair of depressions 158K is defined about the opening 158J defined in each of the first slotted portion 158G1, the second slotted portion 158G2, the third slotted portion 158G3, and the fourth slotted portion 158G4. Additionally, a second depression of each pair of depressions 158K is defined adjacent to the opening 158J defined in each of the first slotted portion 158G1, the second slotted portion 158G2, the third slotted portion 158G3, and the fourth slotted portion 158G4. Such use and purpose of these pairs of depressions 158K is described in more detail below.

Referring to FIG. 15B, the retaining plate 158 also defines a groove 158L inside each of the first slotted portion 158G1, the second slotted portion 158G2, the third slotted portion 158G3, and the fourth slotted portion 158G4. The groove 158L is defined vertically above the securement opening inside each of the first slotted portion 158G1, the second slotted portion 158G2, the third slotted portion 158G3, and the fourth slotted portion 158G4 and extends longitudinally along the entirely length of each of the first slotted portion 158G1, the second slotted portion 158G2, the third slotted portion 158G3, and the fourth slotted portion 158G4. Such use and purpose of these grooves 158L is described in more detail below.

Referring to FIGS. 15A-15C, CMDS 100 also includes at least one magazine identification switch (MIS) 160 that operably engages with the retaining plate 158 of the magazine assembly. Particularly, CMDS 100 includes a first MIS 160A that operably engages with the retaining plate 158 inside of the first slotted portion 158G1 and is positioned along the upper edge 158E of the retaining plate 158. CMDS 100 also includes a second MIS 160B that operably engages with the retaining plate 158 inside of the second slotted portion 158G2 and is positioned along the upper edge 158E of the retaining plate 158. CMDS 100 also includes a third MIS 160C that operably engages with the retaining plate 158 inside of the third slotted portion 158G3 and is positioned along the lower edge 158F of the retaining plate 158. CMDS 100 also includes a fourth MIS 160D that operably engages with the retaining plate 158 inside of the fourth slotted portion 158G4 and is positioned along the lower edge 158F of the retaining plate 158. In the illustrated embodiment, the first MIS 160A, the second MIS 160B, the third MIS 160C, and the fourth MIS 160D are substantially similar to one another and operably engage with the retaining plate 158 in substantially similar configurations.

In the illustrated embodiment, each of the first MIS 160A, the second MIS 160B, the third MIS 160C, and the fourth MIS 160D may define a locking arm. As best seen in FIG. 15A, the first MIS 160A includes a locking arm 160A1 that extends from the first MIS 160A. The locking arm 160A1 is configured to operably engage the first MIS 160A retaining plate 158 inside either a first depression 158K1 or the second depression 158K2 of the pair of depressions 158K defined inside the first slotted portion 158G1. Such engagement between the locking arm 160A1 and the retaining plate 158 via the pair of depressions 158K secures and maintains the first MIS 160A at a desired position on the retaining plate 158 for actuating the first MIB 144A or preventing actuation of the first MIB 144A. Similarly, as best seen in FIG. 15A, the second MIS 160B includes a locking arm 160B1 that extends from the second MIS 160B. The locking arm 160B1 is also configured to operably engage the second MIS 160B with the retaining plate 158 inside either a first depression 158K1 or the second depression 158K2 of the pair of depressions 158K defined inside the second slotted portion 158G2. Such engagement between the locking arm 160B1 and the retaining plate 158 via the pair of depressions 158K secures and maintains the second MIS 160B at a desired position on the retaining plate 158 for actuating the second MIB 144B or preventing actuating of second MIB 144B. Such locking arms may be included in the third MIS 160C and the fourth MIS 160D to secure and maintain the third MIS 160C and fourth MIS 160D at a desired position on the retaining plate 158 for actuating the third MIB 144C and/or fourth MIB 144D or preventing actuating of the third MIB 144C and/or fourth MIB 144D.

In the illustrated embodiment, each of the first MIS 160A, the second MIS 160B, the third MIS 160C, and the fourth MIS 160D may define a rail positioned opposite to the locking arm. As best seen in FIG. 15B, the first MIS 160A includes a rail 160A2 that extends from the first MIS 160A and positioned opposite to the locking arm 160A1. The rail 160A2 is configured to operably engage the first MIS 160A with the retaining plate 158 inside the groove 158L defined inside the first slotted portion 158G1. Such engagement between the rail 160A2 and the retaining plate 158 via the groove 158L enables the first MIS 160A to slide along the retaining plate 158 inside the first slotted portion 158G1 without disengaging the retaining plate 158. Similarly, as best seen in FIG. 15B, the second MIS 160B includes a rail 160B2 that extends from the second MIS 160B and positioned opposite to the locking arm 160B1. The rail 160B2 is configured to operably engage the second MIS 160B with the retaining plate 158 inside the groove 158L defined inside the second slotted portion 158G2. Such engagement between the rail 160B2 and the retaining plate 158 via the groove 158L enables the second MIS 160B to slide along the retaining plate 158 inside the second slotted portion 158G2 without disengaging the retaining plate 158. Such rails may be included in the third MIS 160C and the fourth MIS 160D to operably engage the third MIS 160C and the fourth MIS 160D with the retaining plate 158 inside the grooves 158L defined inside the third slotted portion 158G3 and the fourth slotted portion 158G4.

During operation, the first MIS 160A, the second MIS 160B, the third MIS 160C, and the fourth MIS 160D are slideably engaged with the retaining plate 158 inside the first slotted portion 158G1, the second slotted portion 158G2, the third slotted portion 158G3, and the fourth slotted portion 158G4. In one instance, an operator may slide at least one of the first MIS 160A, the second MIS 160B, the third MIS 160C, and the fourth MIS 160D to actuate at least one of the first MIB 144A, the second MIB 144B, the third MIB 144C, and the fourth MIB 144D. In another instance, an operator may not slide or move any of the first MIS 160A, the second MIS 160B, the third MIS 160C, and the fourth MIS 160D to actuate none of the first MIB 144A, the second MIB 144B, the third MIB 144C, and the fourth MIB 144D. As described previously in CMDS 10, actuation of the set of MIBs 144 sends a signal to the circuit card 142 and/or a sequencer operatively engaged with the set of MIBs 144 to enable the CMDS 100 to dispense specific countermeasure expendables of the set of countermeasure expendables loaded into the magazine 152. Additionally, each of the first MIS 160A, the second MIS 160B, the third MIS 160C, and the fourth MIS 160D may be secured at a desired position inside the set of slotted portions 158G due to the pair of depressions 158K enabling the first MIS 160A, the second MIS 160B, the third MIS 160C, and the fourth MIS 160D to be releasably secured inside one of the depressions of the pair of depressions 158K.

Having now described the components and assemblies of CMDS 100, operations of loading and using the CMDS 100 with a platform 1 are described in more detail below.

Prior to loading the magazine assembly 150 into the dispenser 122 of the dispenser assembly 120, the magazine 152 is loaded with a set of countermeasure expendables 170 via the set of passageways 152G. Here, an operator of the CMDS 100 loads each countermeasure expendable of the set of countermeasure expendables 170 into the rear set of apertures 152I until each countermeasure expendable of the set of countermeasure expendables 170 is fully housed inside of a respective passageway of the set of passageways 152G. Once the set of countermeasure expendables 170 is loaded, the retaining plate 158 may be operably engaged with the rear wall 152E of the magazine 152 to prevent the set of countermeasure expendables 170 from falling out of the magazine 152 during loading stages.

Once the magazine 152 is loaded, the operator may then toggle none or at least one of the first MIS 160A, the second MIS 160B, the third MIS 160C, and the fourth MIS 160D to a desired position on the retaining plate 158 for actuating the set of MIB 144. Such actuation of desired MIBs in the set of MIBs 144 enables the controller assembly 140 and a sequencer 180 of the platform 1 to dispense specific and/or desired groups of countermeasure expendables of the set of countermeasure expendables 170 via the circuitry provided in the circuit card 142. In one instance, the operator may toggle and/or slide the first MIS 160A from a first position (aligned with first marking 158I1 of the position indicia 158I) to a second position (aligned with second marking 158I2 of the position indicia 158I) to enable actuation of the first MIB 44A. In another instance, the operator may toggle and/or slide the first MIS 160A from the second position (aligned with second marking 158I2 of the position indicia 158I) to the first position (aligned with second marking 158I2 of the position indicia 158I) to prevention actuation of the first MIB 144A. The operator may toggle and/or slide at least one or all of the second MIS 160B, the third MIS 160C, and the fourth MIS 160D to actuate at least one or all of the second MIB 144B, the third MIB 144C, and the fourth MIB 144D. Once the operator toggles and sets the set of MIS 160 to desired positions (see FIGS. 15B-15C), the controller assembly 140 and the sequencer 180 will be enabled to dispense a specific group of countermeasure expendables from the set of countermeasure expendables 170. Once the set of MIS 160 have been set by the operator, the operator may then introduce the magazine assembly 150 into the dispenser 122 along with the breechplate assembly 130 that is already operably engaged with the dispenser 122.

During military operation, the sequencer 180 may output a first signal to the controller assembly 140 upon detecting an incoming threat to the platform 1. The first signal is sent from the sequencer 180 to the controller assembly 140 via the A-Kit wiring harness 124 operably engaged with the circuit card 142. The first signal outputted from the sequencer 180 to the circuit card 142 is denoted by arrows labeled "A" in FIG. 17A. Once the first signal is received, the circuit card 142 is configured to output a second signal to a predetermined group of fire pin mechanisms of the fire pin mechanisms 134 to dispense a predetermined group of countermeasure expendables in the set of countermeasure expendables 170. This second signal is outputted to the set of terminal blocks 146 via the set of first electrical connections 145 operatively connecting the circuit card 142 and the set of terminal blocks 146 with one another. The second signal outputted from the circuit card 142 to the set of terminal blocks 146 is denoted by arrows labeled "B" in FIG. 17B. Once the second signal is received, the second signal is then outputted to the set of fire pin mechanisms 134 via the set of second electrical connections 147. At this point, the set of fire pin mechanisms 134 initiate dispensing of the predetermined group of countermeasure expendables in the set of countermeasure expendables 170.

In other examples, a second signal may be outputted to a specific pair of terminal blocks of the set of terminal blocks 146 for specific countermeasure purposes (e.g., conserving countermeasure material, dispensing different types of countermeasure material, dispensing different size of countermeasure material, and other countermeasure purposes of the like). In other examples, any suitable number of signals may be outputted by the sequencer 180 and the circuit card 142 to initiate dispensing of specific groups of countermeasure expendables in the set of countermeasure expendables 170 for specific countermeasure purposes (e.g., conserving countermeasure material, dispensing different types of countermeasure material, dispensing different size of countermeasure material, and other countermeasure purposes of the like).

Figure 18:
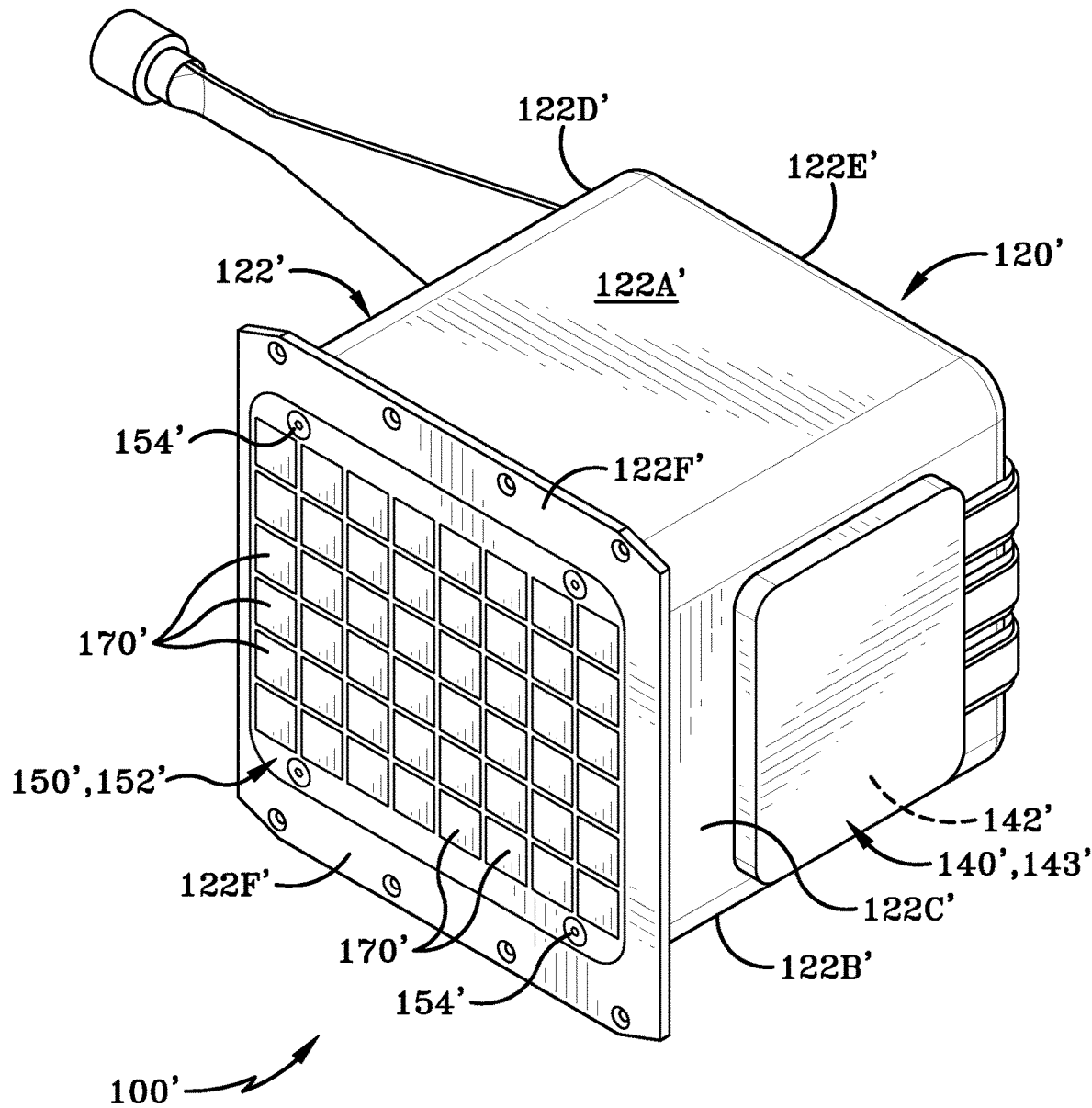
FIG. 18 is a top, front, right side isometric perspective view of an alternative CMDS of CMDS illustrated in FIGS. 12-17C.
Figure 19:
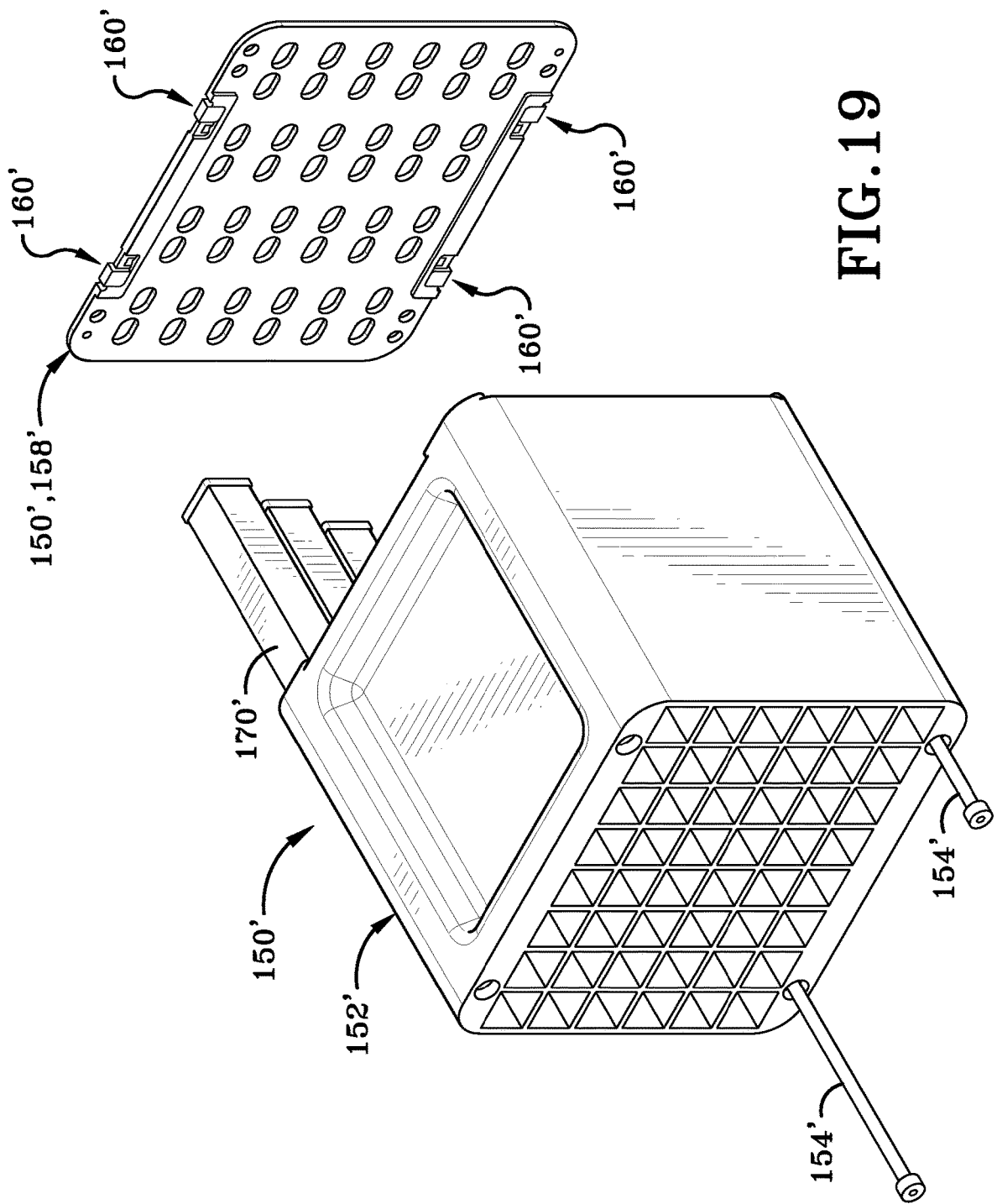
FIG. 19 is an exploded view of a magazine assembly of the CMDS shown in FIG. 18.
Figure 20:
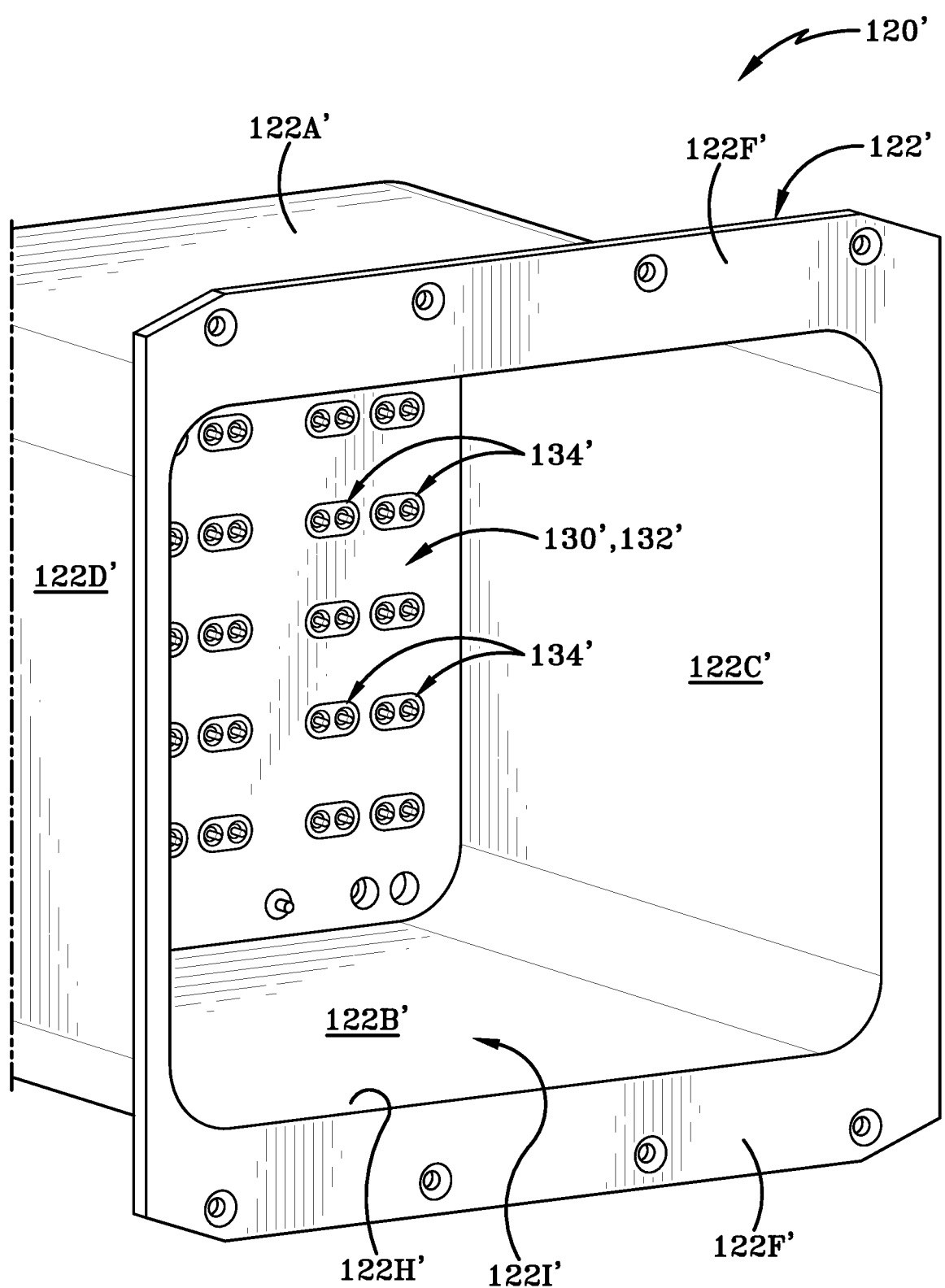
FIG. 20 is a front, top, second side isometric perspective view of a dispenser assembly and a breechplate assembly of CMDS shown in FIG. 19, wherein a dispenser of the dispenser assembly and a faceplate of the breechplate assembly form a single, monolithic member.

FIGS. 18-20 illustrate another CMDS 100' that operably engages with the platform 1. CMDS 100' is substantially similar to CMDS 100 described above and illustrated in FIGS. 12-17C. As described in more detail below, CMDS 100' includes a dispenser assembly 120', a breechplate assembly 130', a controller assembly 140', a magazine assembly 150' including a magazine 152', connectors 154, and a retaining plate 158', a set of magazine identification switches (or MIS) 160', and a set of countermeasure expendables 170' loaded into the magazine assembly 150'

Referring to FIG. 20, the dispenser assembly 120' includes a dispenser 122' that is similar to the dispenser 122 as described above, except as detailed below. The dispenser 122' includes a top wall 122A', a bottom wall 122B' vertically opposite to the top wall 122A', and a vertical axis defined therebetween. The dispenser 122' also includes a pair of side walls (first side wall 122C' and second side wall 122D') that are transversely opposite to the one another and define a transverse axis therebetween. The dispenser 122' also includes a rear wall 122E' that is longitudinally behind the top wall 122A', the bottom wall 122B', the first side wall 122C', and the second side wall 122D', and a flange 122F' that is longitudinally opposite to the rear wall 122E'. As illustrated in FIG. 20, the flange 122F' is also operably engaged with each of the top wall 122A', the bottom wall 122B', the first side wall 122C', and the second side wall 122D' and extends away from top wall 122A', the bottom wall 122B', the first side wall 122C', and the second side wall 122D'. While not illustrated herein, flange 122F' enables connectors (not illustrated) to operably engage the dispenser 122' with the aircraft 1 for maintaining the CMDS 100' with the aircraft 1.

Similar to CMDS 100, CMDS 100' also includes a breechplate assembly 130' that is configured similarly to the breechplate assembly 30, except as detail below. In this illustrated embodiment, however, the breechplate assembly 130' includes a faceplate 132' that is integral with the dispenser 122'. Stated differently, the dispenser 122' and the faceplate 132' form a single, monolithic component where the faceplate 132' is defined in the dispenser 122'. More particularly, the faceplate 132' positioned at the rear wall 122E' of the dispenser 122'. The faceplate 132' is substantially similar to the faceplate 132 described previously and illustrated in FIGS. 12-17C. The faceplate 132' is also configured to operably engage with a set of fire pin mechanisms 134', which is substantially similar to the set of fire pin mechanisms 134 described above and illustrated in FIGS. 12-17C.

Additionally, the controller assembly 140' is substantially similar to the controller assembly 140 in which the circuit card 142' and the cover 143' are operably engaged with the first side wall 122C' of the dispenser 122' exterior to a passageway 122I' defined by the dispenser 122'. The magazine 152' and the retaining plate 158' are operably engaged with the dispenser 122' and the faceplate 132' of the breechplate assembly 130' via the connectors 154' threadably engaging with the dispenser 122' and/or the faceplate 132'. Such structural configuration of CMDS 100' is different than the structural configuration of CMDS 100 given that the magazine assembly 150 is operably engaged with the dispenser 120 via the connectors 154 threadably engaging with the dispenser 122.

Figure 21:
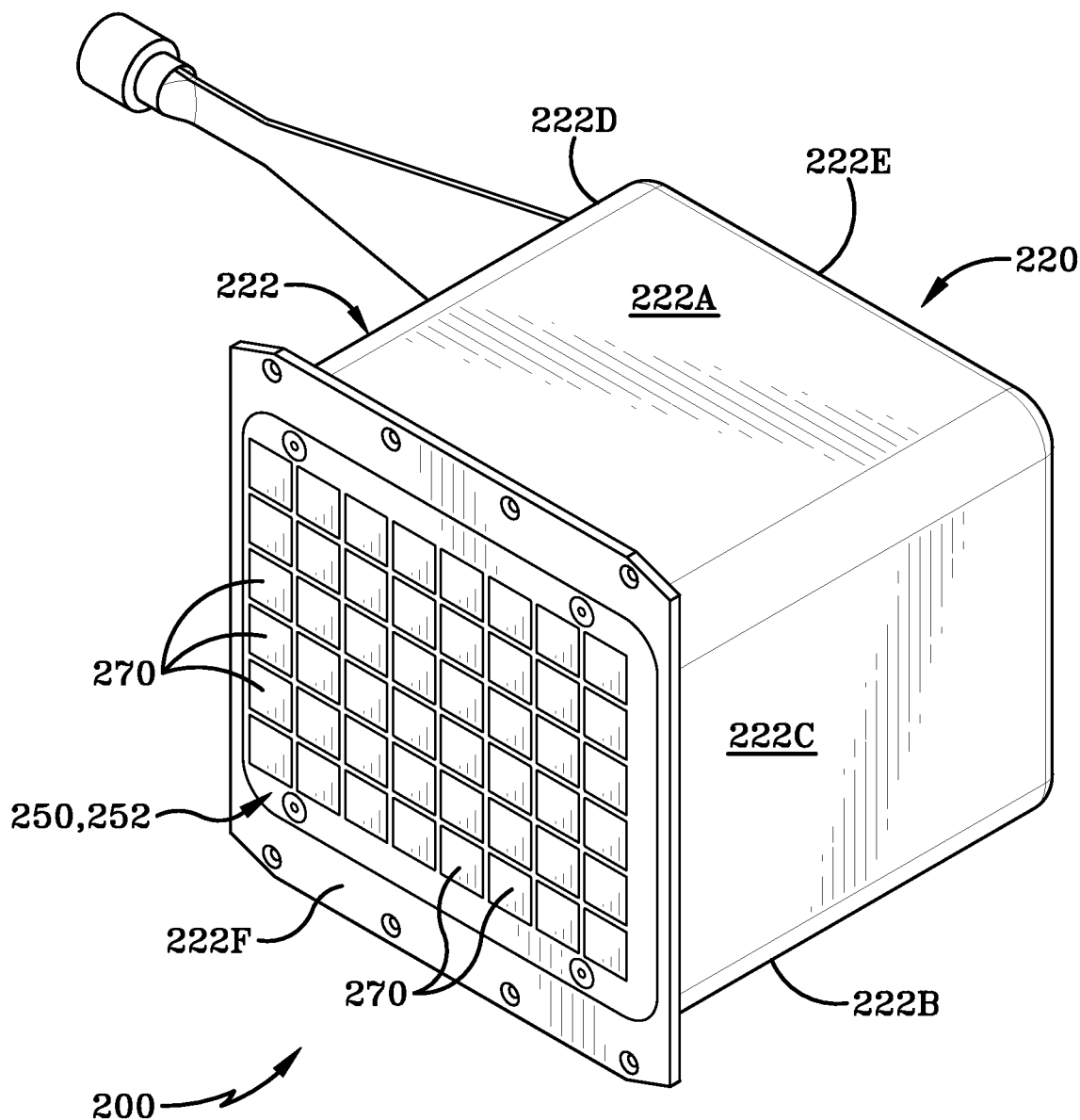
FIG. 21 is a front, top, first side isometric perspective view of another CMDS in accordance with the present disclosure.
Figure 22:
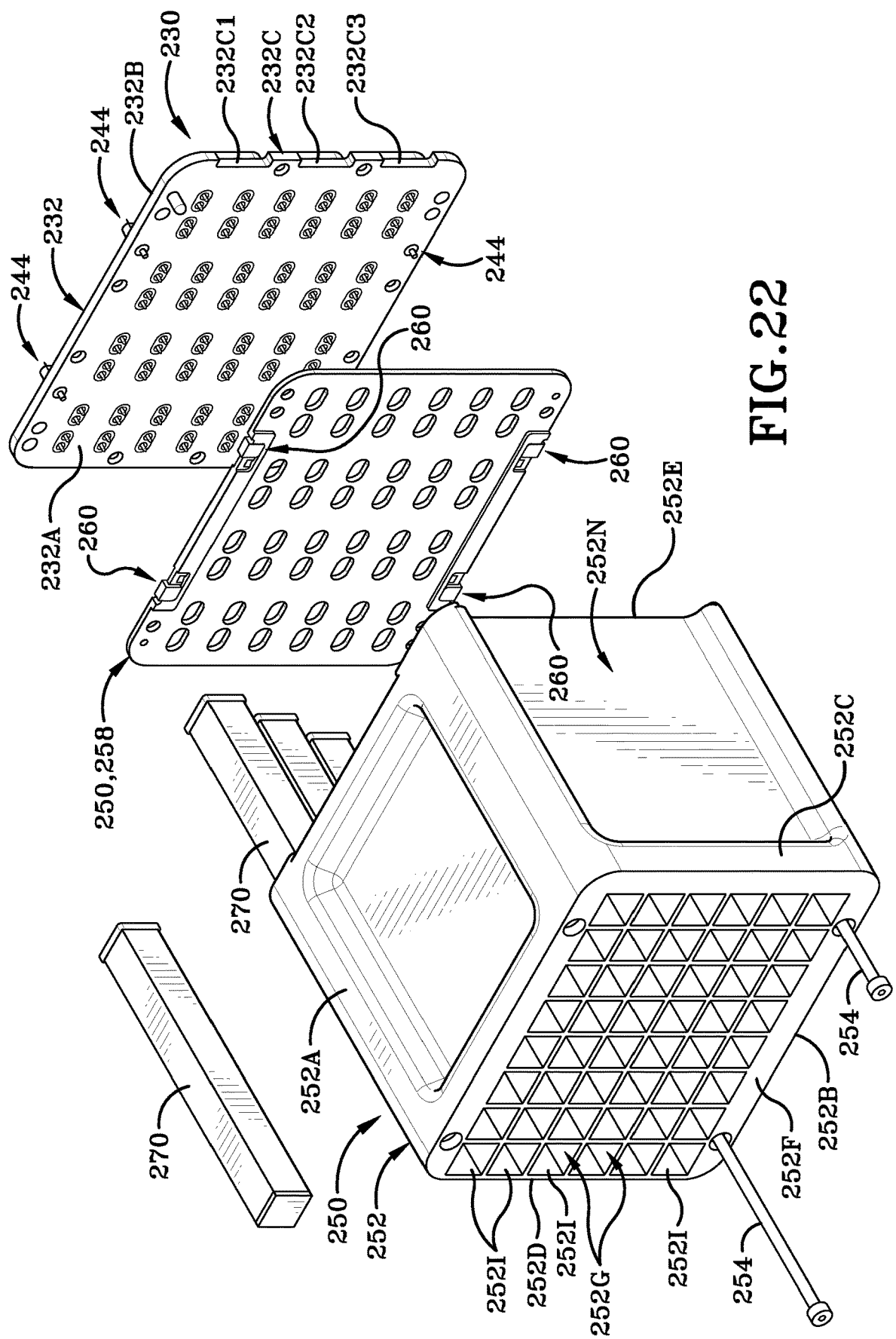
FIG. 22 is an exploded view of a magazine assembly and a breechplate assembly of CMDS shown in FIG. 21.
Figure 23:
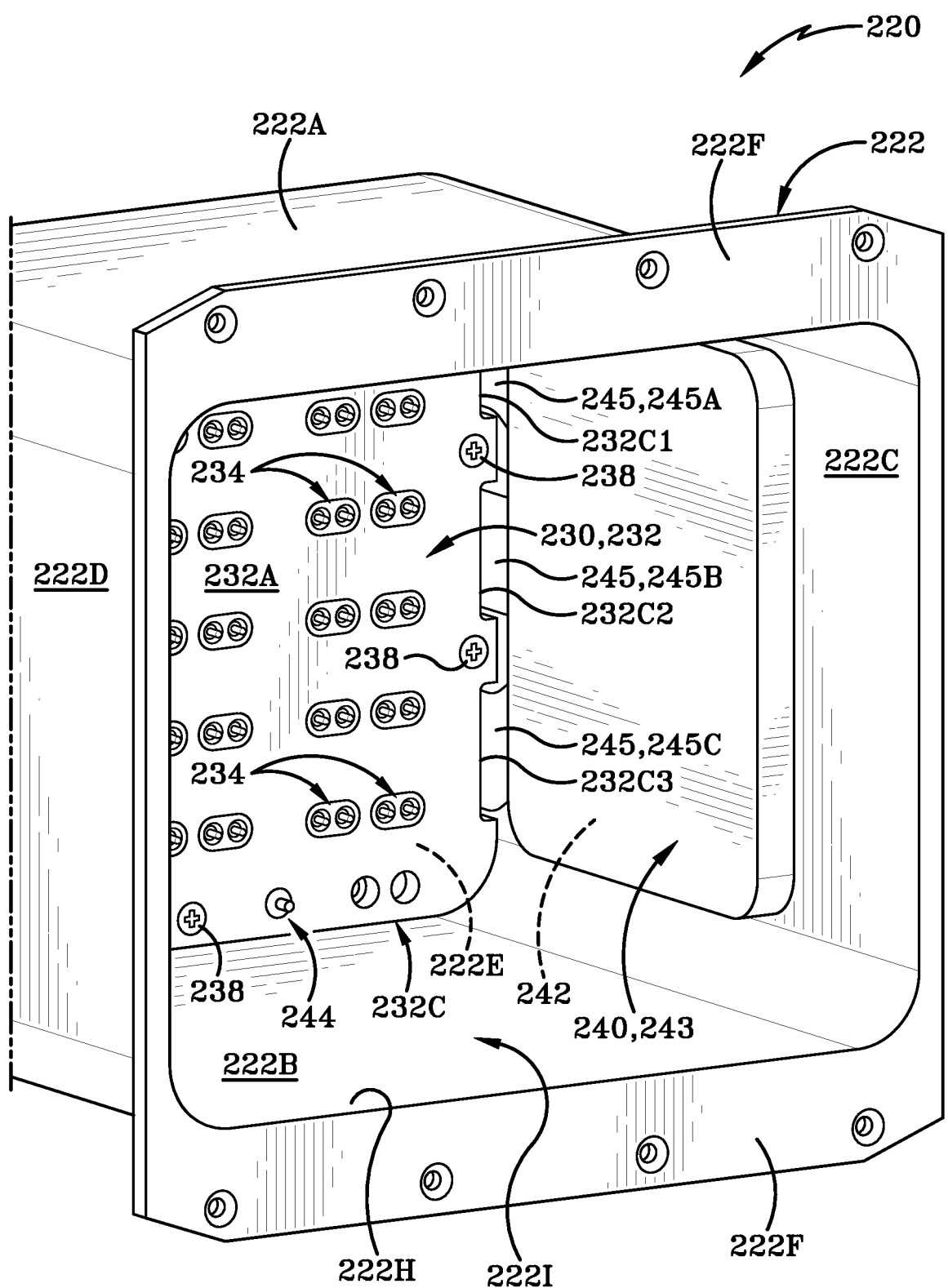
FIG. 23 is a front, top, second side isometric perspective view of a dispenser assembly of CMDS shown in FIG. 19, wherein a controller assembly of CMDS is disposed inside of a dispenser of the dispenser assembly.

FIGS. 21-23 illustrate another CMDS 200 that operably engages with the platform 1. CMDS 200 is substantially similar to CMDS 100 described above and illustrated in FIGS. 12-17C, except as detailed below. As described in more detail below, CMDS 200 includes a dispenser assembly 220, a breechplate assembly 230, a controller assembly 240, a magazine assembly 250, a set of magazine identification switches (or MIS) 260, and a set of countermeasure expendables 270 loaded into the magazine assembly 250.

Referring to FIG. 23, the dispenser assembly 220 includes a dispenser 222 that is similar to the dispenser 122 as described above, except as detailed below. The dispenser 222 includes a top wall 222A, a bottom wall 222B vertically opposite to the top wall 222A, and a vertical axis defined therebetween. The dispenser 222 also includes a pair of side walls (first side wall 222C and second side wall 222D) that are transversely opposite to the one another and define a transverse axis therebetween. The dispenser 222 also includes a rear wall 222E that is longitudinally behind the top wall 222A, the bottom wall 222B, the first side wall 222C2, and the second side wall 222D, and a flange 222F that is longitudinally opposite to the rear wall 222E. As illustrated in FIG. 23, the flange 222F is also operably engaged with each of the top wall 222A, the bottom wall 222B, the first side wall 222C, and the second side wall 222D and extends away from top wall 222A, the bottom wall 222B, the first side wall 222C, and the second side wall 222D. While not illustrated herein, flange 222F enables connectors (not illustrated) to operably engage the dispenser 222 with the aircraft 1 for maintaining the CMDS 200 with the aircraft 1. The dispenser 222 also defines a passageway 222I that is substantially similar to the passageway 122I defined in the dispenser 122 described above.

Referring to FIG. 22, the breechplate assembly 230 includes a faceplate 232 that operably engages with the dispenser 222 inside of the passageway 222I. The faceplate 232 includes a front or first surface 232A, a rear or second surface 232B opposite to the front surface 232A and facing away from the front surface 232A, and a circumferential wall 232C intermediate to the front surface 232A and the second surface 232. The faceplate 232 also defines a first notch 232C1 that extends into the circumferential wall 232, a second notch 232C2 that extends into the circumferential wall 232 and is positioned vertically below the first notch 232C2, and a third notch 232C3 that extends into the circumferential wall 232 and is positioned vertically below the second notch 232C3. The faceplate 232 may also be operably engaged with the rear wall 222E of the dispenser 222 via connectors 238 (see FIG. 23).

Referring to FIG. 23, a circuit card 242 and a cover 243 of the controller assembly 240 are operably engaged with the first side wall 222C of the dispenser 222 inside to passageway 222I defined by the dispenser 222. Any suitable engagement may be used to operably engage the circuit card 242 and the cover 243 with the first side wall 222C inside of the dispenser 222. Additionally, a first set of electrical connections 245 of the controller assembly 240 are received by the notches 232C1, 232C2, 232C3 where a first electrical connection 245A is received by the first notch 232C1, a second electrical connection 245B is received by the second notch 232C2, and a third electrical connection 245C is received by the third notch 232C3. The set of electrical connections 245 also operably engages the circuit card 242 with the set of fire pin mechanisms 234 and may be operably engaged with a set of magazine identification buttons (MIB) 244'.

Referring to FIG. 22, the magazine assembly 250 includes a magazine 252 that is substantially similar to magazine 152, except as detailed below. The magazine 252 includes a top wall 252A, a bottom wall 252B vertically opposite to the top wall 252A, and a vertical axis defined therebetween. The magazine 252 also includes a first side wall 252C positioned between the top wall 252A and the bottom wall 252B, a second side wall 252D positioned between the top wall 252A and the bottom wall 252B and transversely opposite to the first side wall 252C, and a transverse axis defined therebetween. The magazine 252 also includes a rear wall 252E that is longitudinally behind the top wall 252A, the bottom wall 252B, the first side wall 252C, and the second side wall 252D, a front wall 252F that is longitudinally ahead of the top wall 252A, the bottom wall 252B, the first side wall 252C, and the second side wall 252D and longitudinally opposite to the rear wall 252E, and a longitudinal axis defined therebetween.

Still referring to FIG. 22, the magazine 252 defines a set of passageways 252G that extend longitudinally between the rear wall 252E and the front wall 252F. As such, the rear wall 252E of the magazine 252 and the front wall 252F of the magazine 252 are in fluid communication with one another at each passageway of the set of passageways 252G. In the illustrated embodiment, the magazine 252 defines forty-eight passageways 252G to load and house forty-eight countermeasure expendables 270 for CMDS 200. As described above, the breechplate assembly 230 and the controller assembly 240 enables CMDS 200 to accommodate and dispense forty-eight countermeasure expendables as compared to thirty countermeasure expendables currently allowed in conventional AN/ALE-47 CMDS. The set of passageways 252G are accessible via a rear set of apertures (not illustrated) defined at the rear end 252E of the magazine 252 and a front set of apertures 252I defined at the front wall 252F of the magazine 252. During operation, an operator is enabled to load each countermeasure expendable into the set of passageways 252G at the rear set of apertures (not illustrated) while the front set of apertures 252I enables each countermeasure expendable to dispense countermeasure material (e.g., flare material, chaff material, and other countermeasure material of the like) from the magazine 252.

Referring to FIG. 22, the magazine 252 also defines at least one indentation 252N that extends into the magazine at at least one of the top wall 252A, the bottom wall 252B, the first side wall 252C, and the second side wall 252D. In the illustrated embodiment, the magazine 252 defines an indentation 252N that extends transversely into the magazine 252 from the first side wall 252C towards the second side wall 252D. With such indentation 252N, the magazine 252 is configured to operably engage the controller assembly 240 inside a portion of the magazine 252. More particularly, the circuit card 242 and the cover 243 of the controller assembly 240 are housed inside of the indentation 252N of the magazine 252. Such positioning of the controller assembly 240 inside of the indentation 252N enables the controller assembly 240 to be housed inside of the magazine 252 while be operably engaged with the dispenser 222 of the dispenser assembly 220. As such, the controller assembly 240 is positioned intermediate to the dispenser 222 and the magazine 252 in CMDS 200.

Figure 24:
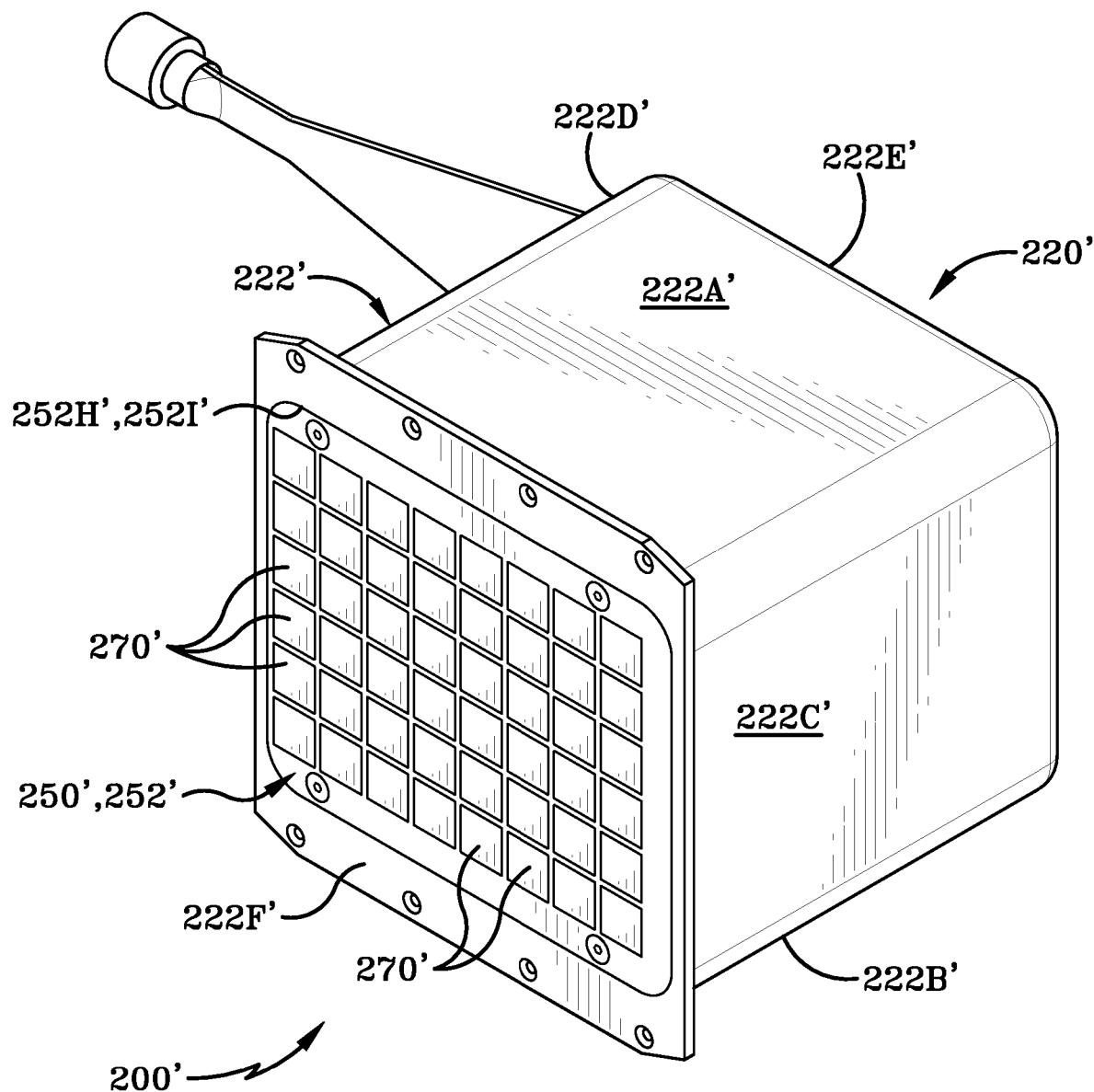
FIG. 24 is a front, top, first side isometric perspective view of alternative CMDS of CMDS shown in FIGS. 21-23.
Figure 25:
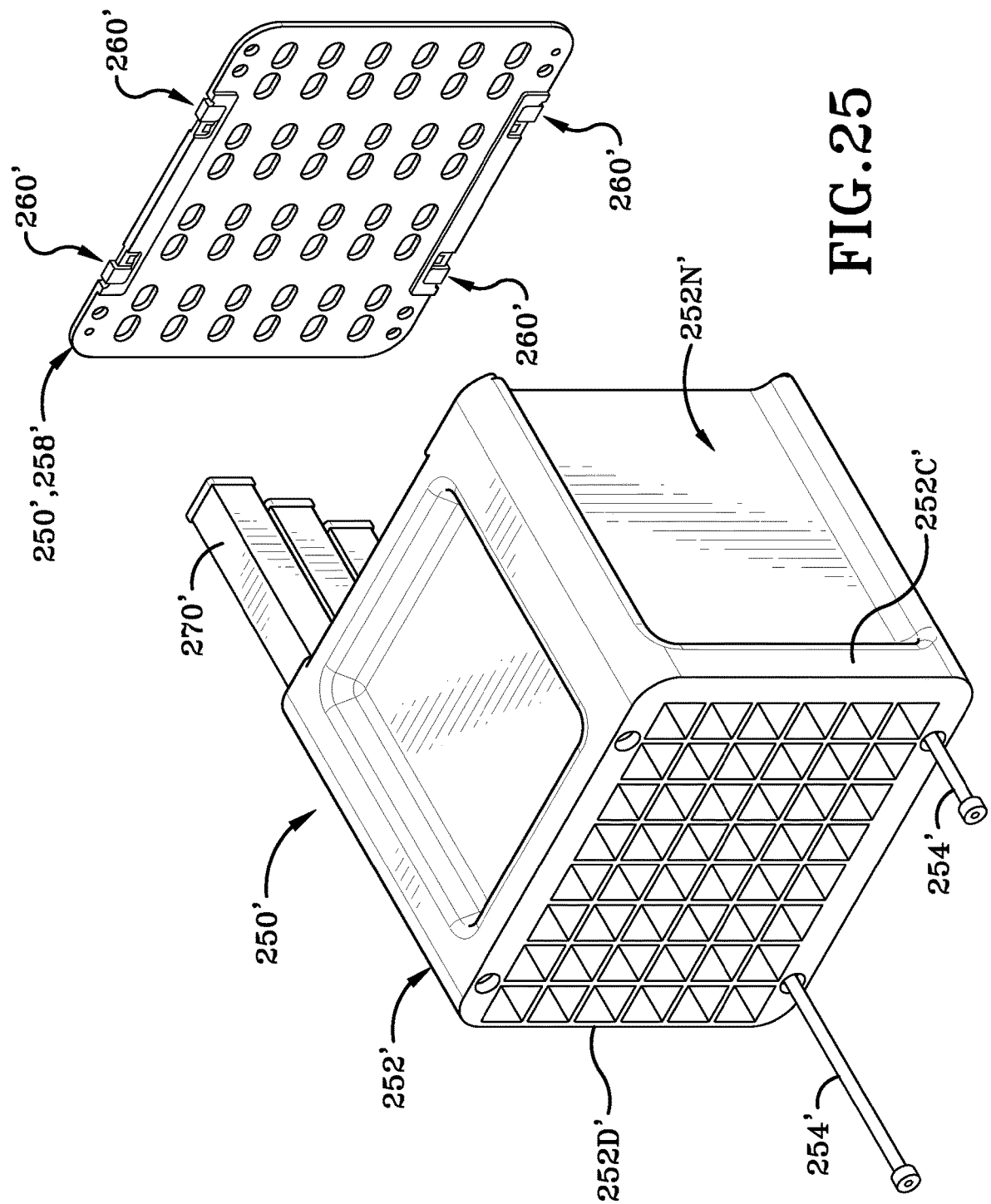
FIG. 25 is an exploded view of a magazine assembly of CMDS shown in FIG. 24.
Figure 26:
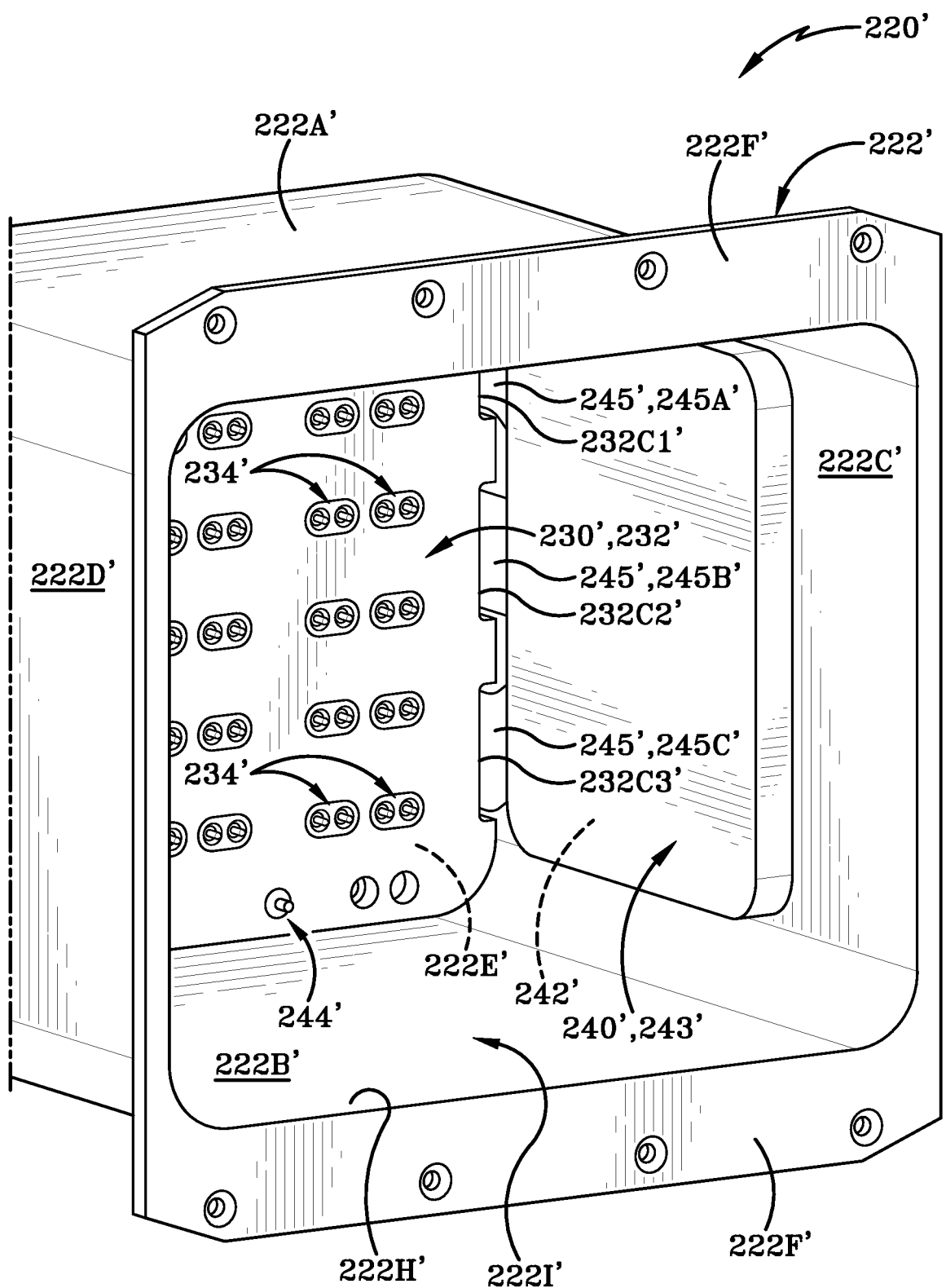
FIG. 26 is a front, top, second side isometric perspective view of a dispenser assembly and a breechplate assembly of CMDS shown in FIG. 24, wherein a dispenser of the dispenser assembly and a faceplate of the breechplate assembly form a single, monolithic member

FIGS. 24-26 illustrates another CMDS 200' that operably engages with the platform 1. CMDS 200' is substantially similar to CMDS 200 described above and illustrated in FIGS. 21-23, except as detailed below. As described in more detail below, CMDS 200' includes a dispenser assembly 220', a breechplate assembly 230', a controller assembly 240', a magazine assembly 250', a set of magazine identification switches (or MIS) 260, and a set of countermeasure expendables 270' loaded into the magazine assembly 250'.

Referring to FIG. 26, the dispenser assembly 220' includes a dispenser 222' that is similar to the dispenser 222 as described above, except as detailed below. The dispenser 222' includes a top wall 222A', a bottom wall 222B' vertically opposite to the top wall 222A' and a vertical axis defined therebetween. The dispenser 222' also includes a pair of side walls (first side wall 222C' and second side wall 222D') that are transversely opposite to the one another and define a transverse axis therebetween. The dispenser 222' also includes a rear wall 222E' that is longitudinally behind the top wall 222A', the bottom wall 222B', the first side wall 222C', and the second side wall 222D', and a flange 222F' that is longitudinally opposite to the rear wall 222E'. The flange 222F' is also operably engaged with each of the top wall 222A', the bottom wall 222B', the first side wall 222C', and the second side wall 222D' and extends away from top wall 222A', the bottom wall 222B', the first side wall 222C', and the second side wall 222D'. While not illustrated herein, the flange 222F' enables connectors (not illustrated) to operably engage the dispenser 222' with the aircraft 1 for maintaining the CMDS 100' with the aircraft 1.

Similar to CMDS 200, CMDS 200' also includes the breechplate assembly 230' that is configured similarly to the breechplate assemblies 130, 230, except as detail below. In this illustrated embodiment, however, the breechplate assembly 230' includes a faceplate 232' that is integral with the dispenser 222'. Stated differently, the dispenser 222' and the faceplate 232' form a single, monolithic component where the faceplate 232' is defined in the dispenser 222'. More particularly, the faceplate 232' positioned at the rear wall 222E' of the dispenser 222'. The faceplate 232' is substantially similar to the faceplate 232 described previously and illustrated in FIGS. 12-17C. The faceplate 232' is also configured to operably engage with a set of fire pin mechanisms 234', which is substantially similar to the set of fire pin mechanisms 134 described above and illustrated in FIGS. 12-17C.

Referring to FIG. 26, a circuit card 242' and a cover 243' of the controller assembly 240' are operably engaged with the first side wall 222C' of the dispenser 222' inside a chamber 222I' defined in the dispenser 222'. Any suitable engagement may be used to operably engage the circuit card 242' and the cover 243' with the first side wall 222C' inside of the dispenser 222'. Additionally, a first set of electrical connections 245' of the controller assembly 240' are received by notches 232C1', 232C2', 232C3' where a first electrical connection 245A' is received by a first notch 232C1', a second electrical connection 245B' is received by a second notch 232C2', and a third electrical connection 245C' is received by a third notch 232C3'. The set of electrical connections 245' also operably engages the circuit card 242' with the set of fire pin mechanisms 234' and may be operably engaged with a set of magazine identification buttons (MIB) 244'.

Referring to FIG. 25, the magazine 252' also defines at least one indentation 252N that extends into the magazine 252'. In the illustrated embodiment, the magazine 252 defines an indentation 252N' that extends transversely into the magazine 252' from a first side wall 252C' towards a second side wall 252D'. With such indentation 252N', the magazine 252' is configured to operably engage the controller assembly 240' inside a portion of the magazine 252'. More particularly, the circuit card 242' and the cover 243' of the controller assembly 240' are housed inside of the indentation 252N' of the magazine 252'. Such positioning of the controller assembly 240' inside of the indentation 252N' enables the controller assembly 240' to be housed inside of the magazine 252' while be operably engaged with the dispenser 222' of the dispenser assembly 220'. As such, the circuit card 242' and the cover 243' are positioned intermediate to the dispenser 222' and the magazine 252 in CMDS 200.

While not illustrated herein, the magazine 252' and a retaining plate 258' are operably engaged with the dispenser 222' and the faceplate 232' of the breechplate assembly 230' via the connectors 254' threadably engaging with the dispenser 222' and/or the faceplate 232'. Such structural configuration of CMDS 200' is different than the structural configuration of CMDS 200 given that the magazine assembly 250 and the breechplate assembly 230 are operably engaged with the dispenser 220 via the connectors 254 threadably engaging with the dispenser 222.

Figure 27:
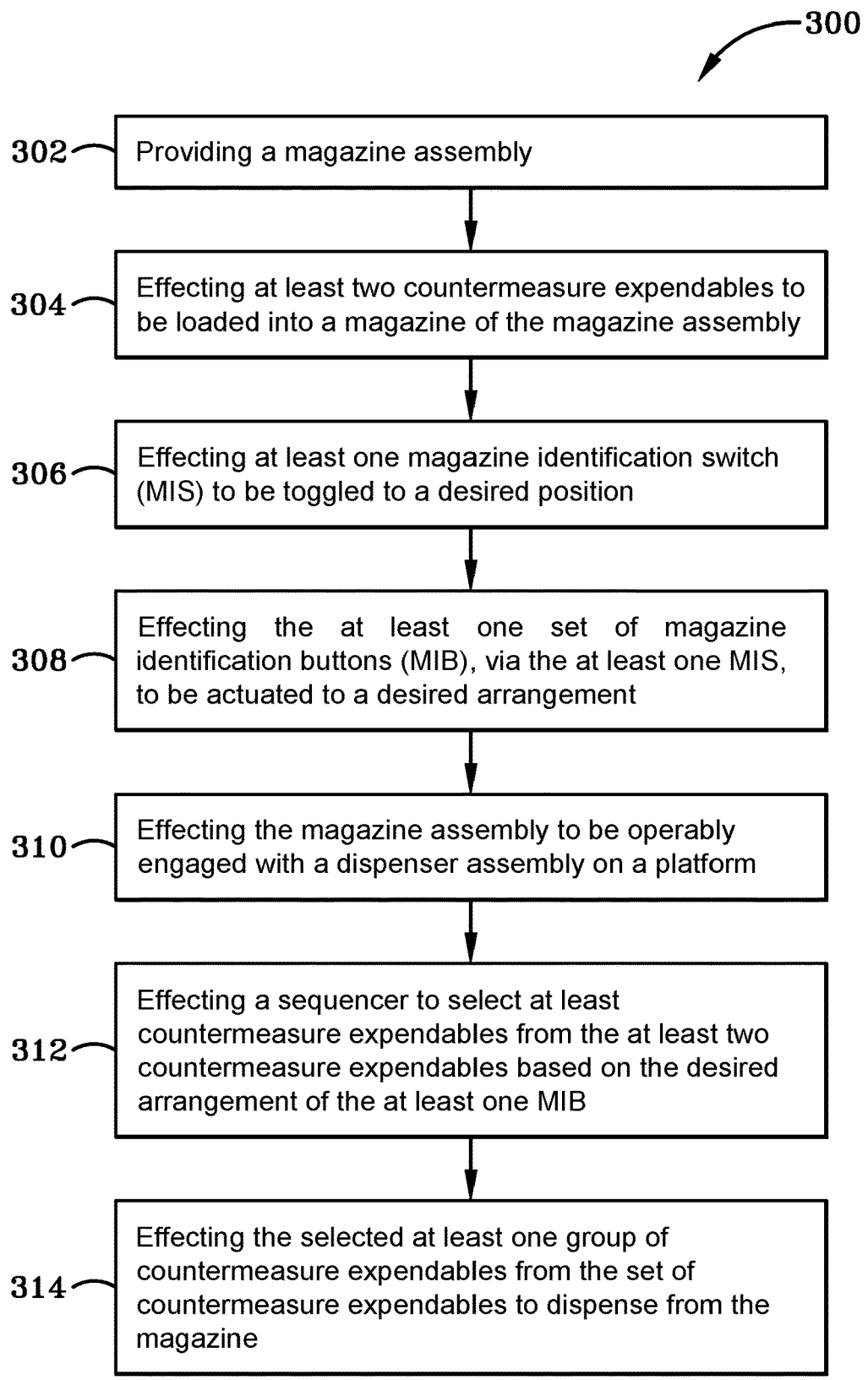
FIG. 27 is an exemplary method flowchart.

FIG. 27 illustrates a flowchart of method 300. An initial step 302 of method 300 may include providing a magazine assembly. Another step 304 of method 300 may include effecting at least two countermeasure expendables to be loaded into a magazine of the magazine assembly. Another step 306 of method 300 may include effecting at least one magazine identification switch (MIS) to be toggled to a desired position. Another step 308 of method 300 may include effecting the at least one set of magazine identification buttons (MIB), via the at least one MIS, to be actuated to a desired arrangement Another step 310 of method 300 may include effecting the magazine assembly to be operably engaged with a dispenser assembly on a platform. Another step 312 of method 300 may include effecting a sequencer to select at least countermeasure expendables from the at least two countermeasure expendables based on the desired arrangement of the at least one MIB. Another step 314 of method 300 may include effecting the selected at least one countermeasure expendables from the at least two countermeasure expendables to dispense from the magazine.

In other exemplary embodiments, method 300 may include additional and/or optional steps. Optional steps may further include that the step of effecting the magazine assembly to be operably engaged with the dispenser assembly further comprises: engaging a breechplate assembly of the magazine assembly with a dispenser of the dispenser assembly; and engaging the magazine with the breechplate assembly and the dispenser, wherein the breechplate assembly is positioned between the magazine and the dispenser. Another optional step may further include that the step of effecting the magazine assembly to be operably engaged with the dispenser assembly further comprises: engaging the magazine with a breechplate assembly and the dispenser. Another optional step may further include positioning a controller assembly outside a chamber defined by a dispenser of the dispenser assembly and remote from the magazine or inside the chamber defined by the dispenser; wherein when the controller assembly is positioned inside of the chamber, the controller assembly is positioned between of the dispenser and the magazine. Another optional step may further include that the step of effecting the magazine assembly to be operably engaged with the dispenser assembly further comprises: engaging the magazine with a breechplate assembly and the dispenser. Another optional step may further include that the step of effecting the magazine assembly to be operably engaged with the dispenser assembly further includes that the dispenser assembly preexists with the platform. Another optional step may further include positioning a controller assembly outside a chamber defined by a dispenser of the dispenser assembly and remote from the magazine. Optional steps may further include positioning a controller assembly inside a chamber defined by a dispenser of the dispenser assembly; and positioning the controller assembly inside an indentation defined in the magazine; wherein the controller assembly is positioned intermediate of the dispenser and the magazine. An optional step may further include that the step of effecting the magazine assembly to be operably engaged with the dispenser assembly further includes that the dispenser assembly is distinct from the platform.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A countermeasure dispensing system, comprising:
   a dispenser assembly configured to operably engage with a platform;
   at least one electrical connection adapted to provide electrical communication between the dispenser assembly and a sequencer;
   a magazine assembly operably engaged with the dispenser assembly, wherein the magazine assembly comprises a magazine configured to hold at least two countermeasure expendables;
   a breechplate assembly operably engaged with the magazine assembly and adapted to dispense the at least two countermeasure expendables;
   at least one magazine identification switch (MIS) operably engaged with the magazine assembly and the breechplate assembly;
   wherein the at least one MIS is configured to enable the sequencer and the breechplate assembly to selectively dispense at least one countermeasure expendable from the at least two countermeasure expendables;
   a faceplate of the breechplate assembly operably engaged with the magazine;
   a set of fire pin mechanisms of the breechplate assembly operably engaged with the faceplate;
   a controller assembly operably engaged with the faceplate and the set of fire pin mechanisms;
   at least one set of magazine identification buttons (MIB) of the breechplate assembly in electrical communication with the at least one MIS to enable the sequencer and the breechplate assembly to selectively dispense the at least one countermeasure expendable from the at least two countermeasure expendables;
a rear wall of the magazine;
a front wall of the magazine longitudinally opposite to the rear wall; and
a side chamber defined in the magazine extending from the rear wall of the magazine towards the front wall of the magazine;
wherein the side chamber is configured to house the controller assembly, the at least one MIS, and the at least one set of MIB.

2. The countermeasure dispensing system of claim 1, wherein the faceplate, the set of fire pin mechanisms, the controller assembly, the at least one set of MIB, and the magazine are collectively positioned inside a chamber of a legacy countermeasure dispensing system.

3. The countermeasure dispensing system of claim 1, wherein the at least one MIS comprises:
a knob operably engaged with the magazine;
a shaft operably engaged with the knob; and
an engagement plate operably engaged with the knob via the shaft having a set of engagement portions configured to engage the at least one set of MIB;
wherein each engagement portion of the set of engagement portions is configured to actuate the at least one set of MIB in a preconfigured arrangement to enable the sequencer and the breechplate assembly to selectively dispense the at least one countermeasure expendable from the at least two countermeasure expendables.

4. The countermeasure dispensing system of claim 1, further comprising:
a set of standoffs provided in the dispenser assembly;
a set of attachment mounts defined in the magazine and aligned with the set of standoffs; and
a set of through-holes defined in the faceplate and aligned with the set of set of standoffs and the set of attachment mounts.

5. The countermeasure dispensing system of claim 4, wherein the controller assembly is positioned exterior to the chamber and positioned remote from the magazine.

6. The countermeasure dispensing system of claim 4, wherein the controller assembly is positioned interior to the chamber and positioned between the magazine and the dispenser assembly.

7. The countermeasure dispensing system of claim 4, wherein each of the faceplate and the dispenser assembly are separate and independent from one another.

8. The countermeasure dispensing system of claim 4, further comprising:
a retaining plate of the breechplate assembly operably engaged with the magazine and the faceplate and positioned intermediate of the magazine and the faceplate;
wherein the retaining plate is configured to retain the set of countermeasure expendables inside of the magazine and engage with the at least one MIS.

9. The countermeasure dispensing system of claim 8, wherein the retaining plate comprises:
at least one recessed portion formed at one of an upper edge of the retaining plate and a lower edge of the retaining plate;
a first depression formed at one of the upper edge and the lower edge inside of the at least one recessed portion for securing the at least one MIS at a first position; and
a second depression formed at one of the upper edge and the lower edge inside of the at least one recessed portion for securing the at least one MIS at a second position different than the first position.

10. The countermeasure dispensing system of claim 9, wherein when the at least one MIS is secured at the first position, the at least one MIS actuates a first MIB of the at least one set of MIB; and
wherein when the at least one MIS is secured at the second position, the at least one MIS prevents actuation of the first MIB of the at least one set of MIB.

11. A countermeasure dispensing system, comprising:
a dispenser assembly configured to operably engage with a platform;
at least one electrical connection adapted to provide electrical communication between the dispenser assembly and a sequencer;
a magazine assembly operably engaged with the dispenser assembly, wherein the magazine assembly comprises a magazine configured to hold at least two countermeasure expendables;
a breechplate assembly operably engaged with the magazine assembly and adapted to dispense the at least two countermeasure expendables;
at least one magazine identification switch (MIS) operably engaged with the magazine assembly and the breechplate assembly;
wherein the at least one MIS is configured to enable the sequencer and the breechplate assembly to selectively dispense at least one countermeasure expendable from the at least two countermeasure expendables;
wherein the dispensing assembly and the breechplate assembly are one of integrally formed together and distinct from one another;
a faceplate of the breechplate assembly operably engaged with the magazine;
a set of fire pin mechanisms of the breechplate assembly operably engaged with the faceplate;
a controller assembly operably engaged with the faceplate and the set of fire pin mechanisms;
at least one set of magazine identification buttons (MIB) of the breechplate assembly in electrical communication with the at least one MIS to enable the sequencer and the breechplate assembly to selectively dispense the at least one countermeasure expendable from the at least two countermeasure expendables;
a rear wall of the magazine;
a front wall of the magazine longitudinally opposite to the rear wall; and
a side chamber defined in the magazine extending from the rear wall of the magazine towards the front wall of the magazine;
wherein the side chamber is configured to house the controller assembly, the at least one MIS, and the at least one set of MIB.

12. The countermeasure dispensing system of claim 11, further comprising:
a faceplate of the breechplate assembly operably engaged with the magazine;
a set of fire pin mechanisms of the breechplate assembly operably engaged with the faceplate;
a controller assembly in electrical communication with the faceplate and the set of fire pin mechanisms; and
at least one set of magazine identification buttons (MIB) of the breechplate assembly operably engaged with the at least one MIS to enable the sequencer and the breechplate assembly to selectively dispense the at least one countermeasure expendable from the at least two countermeasure expendables.

13. The countermeasure dispensing system of claim 12, wherein the faceplate, the set of fire pin mechanisms, the at least one set of MIB, and the magazine are positioned inside a chamber of a legacy countermeasure dispensing system.

\* \* \* \* \*